United States Patent
Tsukagoshi et al.

(10) Patent No.: US 9,640,335 B2
(45) Date of Patent: *May 2, 2017

(54) ELECTRODE AND ELECTRICITY STORAGE DEVICE

(75) Inventors: Takafumi Tsukagoshi, Osaka (JP); Yu Ohtsuka, Osaka (JP); Nobuhiko Hojo, Osaka (JP); Takakazu Yamamoto, Kanagawa (JP); Hiroki Fukumoto, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 1002 days.

This patent is subject to a terminal disclaimer.

(21) Appl. No.: 13/516,162

(22) PCT Filed: Dec. 24, 2010

(86) PCT No.: PCT/JP2010/007527
§ 371 (c)(1),
(2), (4) Date: Sep. 4, 2012

(87) PCT Pub. No.: WO2011/077754
PCT Pub. Date: Jun. 30, 2011

(65) Prior Publication Data
US 2012/0328944 A1    Dec. 27, 2012

(30) Foreign Application Priority Data
Dec. 24, 2009 (JP) ................................. 2009-292972

(51) Int. Cl.
*H01M 10/52* (2006.01)
*H01G 11/48* (2013.01)
(Continued)

(52) U.S. Cl.
CPC ............. *H01G 11/48* (2013.01); *H01G 11/06* (2013.01); *H01G 11/26* (2013.01); *H01G 11/86* (2013.01);
(Continued)

(58) Field of Classification Search
None
See application file for complete search history.

(56) References Cited

U.S. PATENT DOCUMENTS

| 5,900,336 A | 5/1999 | Kabata et al. |
| 8,530,086 B2 * | 9/2013 | Hojo ..................... H01M 4/131 429/213 |

(Continued)

FOREIGN PATENT DOCUMENTS

| CN | 101443933 A | 5/2009 |
| JP | 60-014762 | 1/1985 |

(Continued)

OTHER PUBLICATIONS

TTF Chemistry, Fundamentals and Applications of Tetrathiafulvalene.
(Continued)

*Primary Examiner* — Tracy Dove
(74) *Attorney, Agent, or Firm* — McDermott Will & Emery LLP

(57) ABSTRACT

An electrode of the present invention includes: an electrically conductive support (11); and an active material layer (12) provided on the electrically conductive support (11), containing an electrode active material (13) and an electrical conductivity assistant (14), wherein: the electrode active material (13) includes at least one of a first polymer compound having a tetrachalcogenofulvalene structure in a repetition unit of a main chain, and a second polymer compound which is a copolymer between a first unit which
(Continued)

has the tetrachalcogenofulvalene structure in a side chain and a second unit which does not have the tetrachalcogenofulvalene structure in the side chain; and in active material layer (13), the electrode active material (13) does not form particles but covers at least a portion of a surface of the electrical conductivity assistant (14).

20 Claims, 13 Drawing Sheets

(51) Int. Cl.

| | |
|---|---|
| H01M 4/137 | (2010.01) |
| H01M 4/1399 | (2010.01) |
| H01M 4/36 | (2006.01) |
| H01M 4/60 | (2006.01) |
| H01M 4/62 | (2006.01) |
| H01M 10/052 | (2010.01) |
| H01G 11/06 | (2013.01) |
| H01G 11/86 | (2013.01) |
| H01G 11/26 | (2013.01) |
| H01M 2/02 | (2006.01) |
| H01M 4/02 | (2006.01) |
| H01G 11/28 | (2013.01) |

(52) U.S. Cl.
CPC ......... *H01M 4/137* (2013.01); *H01M 4/1399* (2013.01); *H01M 4/366* (2013.01); *H01M 4/60* (2013.01); *H01M 4/608* (2013.01); *H01M 4/625* (2013.01); *H01M 10/052* (2013.01); *H01G 11/28* (2013.01); *H01M 2/0222* (2013.01); *H01M 2004/021* (2013.01); *Y02E 60/13* (2013.01); *Y02P 70/54* (2015.11); *Y02T 10/7011* (2013.01); *Y02T 10/7022* (2013.01); *Y10T 29/49108* (2015.01)

(56) References Cited

U.S. PATENT DOCUMENTS

| | | | |
|---|---|---|---|
| 8,551,652 B2* | 10/2013 | Tsukagoshi | H01M 4/60 429/213 |
| 2004/0045818 A1 | 3/2004 | Inatomi et al. | |
| 2005/0008934 A1* | 1/2005 | Oyama | H01G 9/155 429/213 |
| 2006/0147802 A1 | 7/2006 | Yasuda et al. | |
| 2009/0094822 A1 | 4/2009 | Ohtsuka et al. | |
| 2009/0111030 A1 | 4/2009 | Hojo et al. | |
| 2011/0091767 A1 | 4/2011 | Hojo et al. | |

FOREIGN PATENT DOCUMENTS

| | | |
|---|---|---|
| JP | 06-150909 | 5/1994 |
| JP | 2002-117852 | 4/2002 |
| JP | 2004-047487 A | 2/2004 |
| JP | 2004-111374 A | 4/2004 |
| JP | 2007-265712 A | 10/2007 |
| JP | 2007-305461 | 11/2007 |
| JP | 2009-163918 | 7/2009 |
| JP | 2009-295397 | 12/2009 |
| WO | WO 2008/099557 A1 | 8/2008 |
| WO | 2009/157206 A1 | 12/2009 |
| WO | WO 2010/013491 A1 | 2/2010 |

OTHER PUBLICATIONS

International Search Report issued in International Patent Application No. PCT/JP2010/007527 dated. Mar. 22, 2011.
Takimiya, K. "New Hybrid Tetrachalcogenofulvalenes: Diselenaditellurafulvalene and Its Dimethyl Derivative". Chem. Commun. 1997. pp. 1925-1926.
Engler, E.M. et al. "Ionization Potentials and Donor Properties of Selenium Analogs of Tetrathiafulvalene". May 14, 1975. Journal of the American Chemical Society. 97:10. pp. 2921-2922.
Chinese Search Report issued in Chinese Application No. 201080056752X dated Mar. 4, 2014, with English Translation.
Partial Supplementary European Search Report issued in European Application No. 10838992.5, dated Feb. 19, 2015.

* cited by examiner (a)

ACTIVE MATERIAL LAYER (90 μm)
CURRENT COLLECTOR (b)

ACTIVE MATERIAL LAYER (90 μm)

(a)

(b)

(c)

(a)

ACTIVE MATERIAL LAYER (90 μm)

CURRENT COLLECTOR (b)

ACTIVE MATERIAL LAYER (90 μm)

(a)

(b)

(c)

ELECTRODE AND ELECTRICITY STORAGE DEVICE

RELATED APPLICATIONS

This application is the U.S. National Phase under 35 U.S.C. §371 of International Application No. PCT/JP2010/007527, filed on Dec. 24, 2010, which in turn claims the benefit of Japanese Application Nos. 2009-292972 filed on Dec. 24,2009, 2009-292973 filed on Dec. 24, 2009, 2009-292974 filed on Dec. 24, 2009, 2010-018965 filed on Jan. 29, 2010, and 2010-248210 filed on Nov. 5, 2010, the disclosures of which Applications are incorporated by reference herein.

TECHNICAL FIELD

The present invention relates to an electrode and an electricity storage device in which the same is used.

BACKGROUND ART

In recent years, portable electronic devices such as portable audio devices, mobile phones, and laptop computers are widely prevalent. From an energy saving standpoint, or from a standpoint of reducing the discharged amount of carbon dioxide, among automobiles incorporating conventional internal combustion engines, hybrid vehicles are gaining prevalence in which an electricity-based driving force is also utilized. As these become prevalent, there is an increasing demand for enhancing the performance of electricity storage devices used as power supplies. Specifically, there is a demand for electricity storage devices having a high output power, a high capacity, and excellent cyclic characteristics.

Various attempts are being made for enhancing the performance of electricity storage devices. Since these performances of electricity storage devices are greatly dependent on the positive electrode material and the negative electrode material, positive electrode materials and negative electrode materials are being actively researched. In conventional secondary batteries, metal oxides, carbon and inorganic compounds have been used as positive electrode materials and negative electrode materials.

On the other hand, Patent Document No. 1 and Patent Document No. 2 propose using conductive organic complexes and radical compounds as electrode active materials of high-voltage and long-life batteries.

Patent Document No. 3 proposes an electricity storage device having a π electron conjugated cloud as an electrode active material that allows for high-speed charging-discharging.

Patent Document No. 3 proposes an electricity storage device including an electrode active material having a π electron conjugated cloud as an electrode active material that allows for high-speed charging-discharging. Specifically, it is proposed to use tetrathiafulvalene (hereinafter denoted as TTF) having a structure shown in formula (2) below, for example, as an electrode active material.

[FORMULA 1]

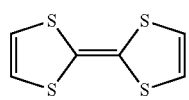

(2)

Patent Document No. 3 proposes using, as an electrode active material of an electricity storage device, a polymer compound which includes a plurality of organic compound sites having a π electron conjugated cloud. For example, it discloses a polymer compound which is obtained by allowing an organic compound site having a π electron conjugated cloud to bind to a polymer compound having a polyacetylene or polymethylmethacrylate chain as a main chain. It also discloses a polymer compound which is obtained through dehydration condensation of a side chain having carboxytetrathiafulvalene onto a main chain of polyvinyl alcohol.

Various methods have been proposed as a method for manufacturing an electricity storage device using an organic compound as an active material, particularly a method for manufacturing an electrode of an electricity storage device. As a method for manufacturing an electricity storage device using, as an active material, an organic compound having a πelectron conjugated cloud such as TTF, Patent Document No. 3 discloses a dry technique in which an active material, an electrical conductivity assistant and a binder agent are mixed together to produce an active material mixture, and the obtained active material mixture is crimped onto an electrically conductive support, whereby an electrode of an electricity storage device is produced, and Patent Document No. 4 discloses a wet technique in which an active material is mixed and dispersed in a solvent; the resultant paste is applied on an electrically conductive support; and the solvent is removed, whereby an electrode of an electricity storage device is produced.

Patent Document No. 5 discloses a method in which an organic sulfur compound monomer is dissolved in an organic solvent; the resultant solution and an electrically conductive substance are mixed together; and then the monomer in the mixture is polymerized, whereby a polymer electrode is produced.

Patent Document No. 6 discloses a method in which a slurry is produced including a mixture of an organic radical polymer and an electrical conductivity-imparting agent obtained by mixing and drying an organic radical polymer and an electrical conductivity-imparting agent in the form of a sol produced by mixing it with a solvent; the produced slurry is applied on a current collector; and then the solvent is removed, whereby an electrode is manufactured.

CITATION LIST

Patent Literature

Patent Document No. 1: Japanese Laid-Open Patent Publication No. 60-14762
Patent Document No. 2: Japanese Laid-Open Patent Publication No. 2002-117852
Patent Document No. 3: Japanese Laid-Open Patent Publication No. 2004-111374
Patent Document No. 4: Japanese Laid-Open Patent Publication No. 2007-305461
Patent Document No. 5: Japanese Laid-Open Patent Publication No. 6-150909
Patent Document No. 6: WO2008/099557

SUMMARY OF INVENTION

Technical Problem

One of the demands for an electricity storage device is an increase in the output power. For an increase in the output power of an electricity storage device, it is necessary to improve the operating voltage and to improve the current density of the electricity storage device. Typically, an increase in the current density entails a decrease in the operating voltage due to a resistive component involved in the electricity storage device. The resistive component involved in the electricity storage device can be divided into positive-electrode active material reaction resistance, positive-electrode electric conductivity resistance, positive-electrode ion conductivity resistance, negative-electrode active material reaction resistance, negative-electrode plate electron conductivity resistance, negative-electrode plate ion conductivity resistance, positive current collector electron conductivity resistance, negative current collector electron conductivity resistance, electrolyte ion conductivity resistance, and electron conductivity resistance of the case or the lead. Among others, the active material reaction resistance of the positive electrode and that of the negative electrode account for a significant proportion of the internal resistance. Therefore, for an increase in the output power of an electricity storage device, it is necessary to reduce the active material reaction resistance.

Although patent Document No. 3 and Patent Document No. 4 disclose a method for manufacturing an electrode using an organic compound, there is no disclosure as to a method for manufacturing an electrode of an electricity storage device having a high output power.

The present invention solves the problems of such conventional techniques, and aims to provide an electrode being capable of reducing the active material reaction resistance and realizing a high capacity, excellent cyclic characteristics and a high output power, and an electricity storage device in which the same is used.

Solution to Problem

An electrode of the present invention is an electrode including: an electrically conductive support; and an active material layer provided on the electrically conductive support, containing an electrode active material and an electrical conductivity assistant, wherein: the electrode active material includes at least one of a first polymer compound having a tetrachalcogenofulvalene structure in a repetition unit of a main chain, and a second polymer compound which is a copolymer between a first unit which has the tetrachalcogenofulvalene structure in a side chain and a second unit which does not have the tetrachalcogenofulvalene structure in the side chain; and in the active material layer, the electrode active material does not form particles but covers at least a portion of a surface of the electrical conductivity assistant.

In a preferred embodiment, the chalcogenofulvalene structure is represented by general formula (1) below; in general formula (1), the four X's are, independently, an oxygen atom, a sulfur atom, a selenium atom or a tellurium atom; one or two selected from R1 to R4 represents a bonding hand for a main chain or an adjacent repetition unit of the first polymer compound or the second polymer compound; the other three or two are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group or a nitroso group and an alkylthio group; and the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom, a phosphorus atom and a boron atom.

[FORMULA 2]

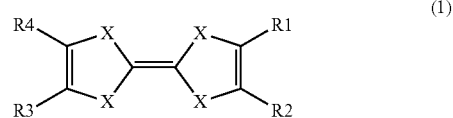

In a preferred embodiment, in the active material layer, a weight percentage of the electrode active material included in the active material layer is 30 wt % or more.

In a preferred embodiment, the electrical conductivity assistant is carbon black.

In a preferred embodiment, a specific surface of the electrical conductivity assistant is 800 $m^2/g$ or more.

In a preferred embodiment, the electrically conductive support includes a surface layer having a surface in contact with the active material layer; and a surface of the surface layer has surface irregularities.

In a preferred embodiment, the surface layer is an electrolytically-etched aluminum layer.

In a preferred embodiment, the first polymer compound and the second polymer compound each have a degree of polymerization of four or more.

In a preferred embodiment, the second polymer compound has a structure represented by general formula (37) below; in general formula (37), R31 and R32 constitute a main chain of the second polymer compound; R31 and R32 are trivalent residues containing, independently, at least one selected from the group consisting of a carbon atom, an oxygen atom, a nitrogen atom and a sulfur atom; and at least one substituent selected from the group consisting of saturated aliphatic group and unsaturated aliphatic groups having a carbon number of 1 to 10 or at least one hydrogen atom; L1 is an ester group, an ether group, a carbonyl group, a cyano group, a nitro group, a nitroxyl group, an alkyl group, a phenyl group, an alkylthio group, a sulfone group or a sulfoxide group that is bound to R31; R33 is a divalent residue including at least one selected from the group consisting of a substituted or unsubstituted alkylene, alkenylene, arylene, ester, amide, and ether having a carbon number of 1 to 4 are bound to R32 and M1; M1 is general formula (1), and is bound to R33 via the aforementioned bonding hand, where n and m are integers reperesenting the numbers of times of repeating the monomer units; and a constituent ratio m/n of the number m of the second units with respect to the number n of the first units of the second polymer compound is greater than zero and five or less.

[FORMULA 3]

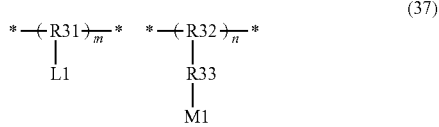

In a preferred embodiment, L1 includes at least one kind selected from an ester group, an ether group and a carbonyl group.

In a preferred embodiment, the active material layer is formed by applying a mixture, which contains an aprotic solvent with the electrode active material dissolved therein and the electrical conductivity assistant, onto the electrically conductive support, and removing the aprotic solvent therefrom.

In a preferred embodiment, the aprotic solvent is N-methylpyrrolidone, 1,3-dimethyl-2-imidazolidinone, toluene, dimethylacetamide, dimethylformamide, dimethyl sulfoxide, tetrahydrofuran, or chloroform.

An electrochemical element according to the present invention includes a positive electrode, a negative electrode, and an electrolyte solution, wherein at least one of the positive electrode and the negative electrode is one of the electrodes set forth above.

In a preferred embodiment, the electrolyte solution contains a salt of quaternary ammonium cations and anions.

An electricity storage device according to the present invention includes: a positive electrode including one of the electrodes set forth above; a negative electrode containing a negative-electrode active material capable of occluding and releasing lithium ions; and an electrolyte solution containing a salt of lithium ions and anions, the electrolyte solution filling between the positive electrode and the negative electrode.

A portable electronic device according to the present invention includes the above electricity storage device.

A vehicle according to the present invention includes the above electricity storage device.

A method for manufacturing an electrode according to the present invention is a manufacturing method for one of the electrodes set forth above, including the steps of: preparing a mixture of an aprotic solvent with an electrode active material dissolved therein, and an electrical conductivity assistant; and removing the aprotic solvent from the mixture.

A method for manufacturing an electricity storage device according to the present invention is a method for manufacturing an electricity storage device including: a positive electrode which is one of the electrodes set forth above; a negative electrode containing a negative-electrode active material capable of occluding and releasing lithium ions; and an electrolyte solution containing a salt of lithium ions and anions, the electrolyte solution filling between the positive electrode and the negative electrode, the method including the steps of: preparing a mixture of an aprotic solvent with the electrode active material dissolved therein, and an electrical conductivity assistant; and removing the aprotic solvent from the mixture.

In a preferred embodiment, the active material layer has a gap between the electrode active materials covering the electrical conductivity assistant.

In a preferred embodiment, the active material layer further contains a binder agent.

In a preferred embodiment, at least a portion of a surface of the electrical conductivity assistant is covered by a mixture of the electrode active material and the binder agent.

In a preferred embodiment, the binder agent is a fluoroplastic.

In a preferred embodiment, a side chain of the second unit includes a functional group having affinity with a nonaqueous solvent.

In a preferred embodiment, a side chain of the second unit includes at least one kind selected from the group consisting of an ester group, an ether group, a carbonyl group, a cyano group, a nitro group, a nitroxyl group, an alkyl group, a phenyl group, an alkylthio group, a sulfone group, and a sulfoxide group.

In a preferred embodiment, the second polymer compound is represented by formula (38) below; in general formula (38), R36 is a divalent residue including at least one selected from the group consisting of a substituted or unsubstituted alkylene, alkenylene, arylene, ester, amide, and ether having a carbon number from 1 to 4; R34 and R35 are, independently, one selected from the group consisting of a saturated aliphatic group having a carbon number of 1 to 4 and a phenyl group, or a hydrogen atom; and R37 to R39 are, independently, an acyclic aliphatic group, a cyclic aliphatic group, a hydrogen atom, a hydroxyl group, a cyano group, an amino group, a nitro group, a nitroso group, or an alkylthio group, wherein R38 and R39 may bind to each other to form a ring. L1 is an ester group, an ether group, a carbonyl group, a cyano group, a nitro group, a nitroxyl group, an alkyl group, a phenyl group, an alkylthio group, a sulfone group, or a sulfoxide group; and n and m are integers representing a number of times of repeating monomer units.

[FORMULA 4]

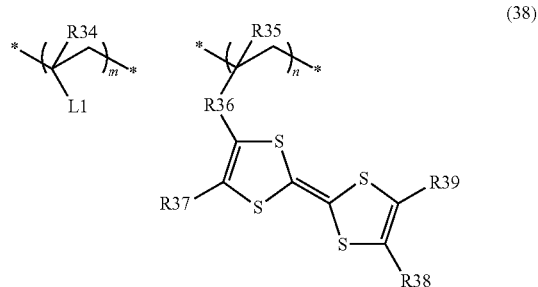

(38)

In a preferred embodiment, L1 includes at least one kind selected from the group consisting of an ester group, an ether group, and a carbonyl group.

In a preferred embodiment, the second polymer compound has a structure represented by formula (39) below, and in formula (39), n and m are integers representing a number of times of repeating monomer units.

[FORMULA 5]

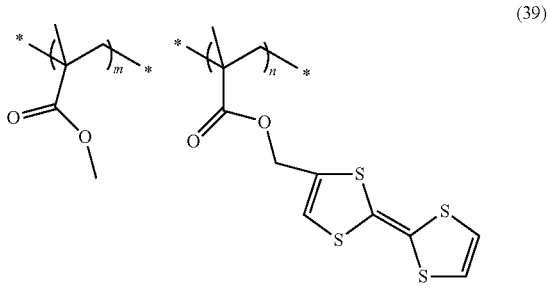

(39)

In a preferred embodiment, a constituent ratio m/n of the number n of first units composing the copolymer compound to the number m of second units is greater than 0 and equal to or less than 5.

In a preferred embodiment, the aprotic solvent is an aprotic polar solvent.

In a preferred embodiment, the mixture further contains a binder agent, and the binder agent is dissolved in the aprotic solvent.

In a preferred embodiment, the binder agent is a fluoroplastic.

In a preferred embodiment, an average particle diameter of the carbon black is 50 nm or less.

In a preferred embodiment, a degree of polymerization of the copolymer compound is 4 or more.

In a preferred embodiment, at least a portion of a surface of the electrical conductivity assistant is covered by a mixture of the electrode active material and the binder agent.

In a preferred embodiment, the first polymer compound is a copolymer including repetition units represented by general formulae (3) and (4) below; in general formulae (3) and (4), the four X's are, independently, an oxygen atom, a sulfur atom, a selenium atom or a tellurium atom; R5 to R8 are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom; and the combination between R5 and R6 is different from the combination between R7 and R8.

[FORMULA 6]

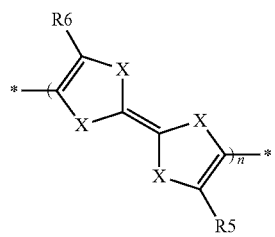

(3)

[FORMULA 7]

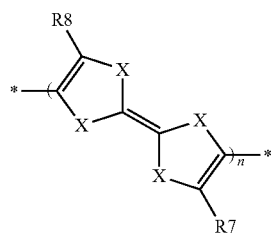

(4)

In a preferred embodiment, the first polymer compound is represented by general formula (6) below; in general formula (6), the four X's are, independently, an oxygen atom, a sulfur atom, a selenium atom or a tellurium atom; R5 and R6 are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom; and R9 is an acyclic unsaturated hydrocarbon group or a cyclic unsaturated hydrocarbon group including an acetylene structure or a thiophene structure, and includes at least one kind selected from the group consisting of a carbon atom, an oxygen atom, a nitrogen atom, a sulfur atom and a silicon atom.

[FORMULA 8]

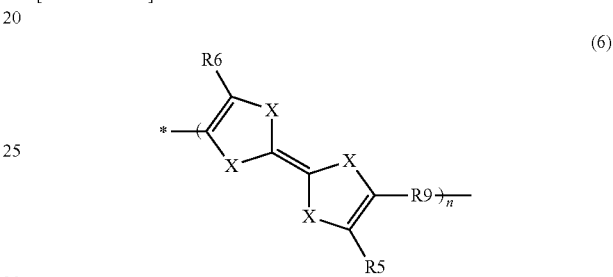

(6)

In a preferred embodiment, R9 includes at least one of an acetylene structure and a thiophene structure.

In a preferred embodiment, X is a sulfur element, and R5 and R6 are each $CH_3$, $SC_6H_{13}$, $C_{10}H_{21}$ or $C_6H_5$.

In a preferred embodiment, R9 has a structure shown in any of general formulae (9-a), (9-b) and (9-c) below; in general formulae (9-a), (9-b) and (9-c), R10 to R14 include, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; and the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom.

[FORMULA 9]

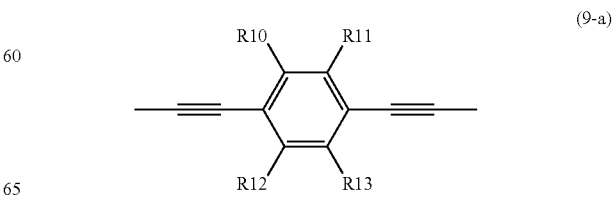

(9-a)

[FORMULA 10]

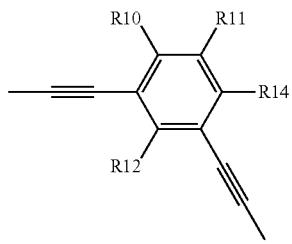

(9-b)

[FORMULA 11]

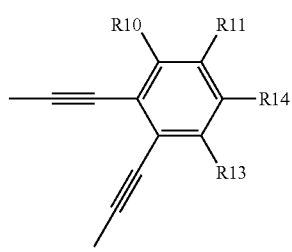

(9-c)

In a preferred embodiment, the first polymer compound is represented by general formula (11) below; in general formula (11), the four X's are, independently, an oxygen atom, a sulfur atom, a selenium atom, or a tellurium atom; and R5, R6, R10 to R12, and R14 include, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group. The acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom.

[FORMULA 12]

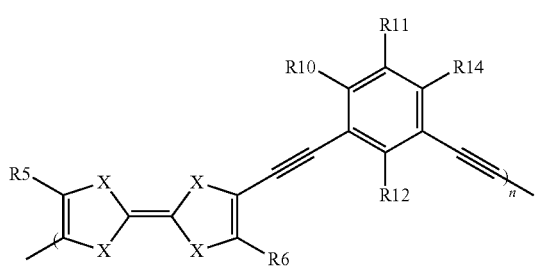

(11)

In a preferred embodiment, R5 and R6 are each a phenyl group, an alkylthio group or a saturated hydrocarbon group.

In a preferred embodiment, R5 and R6 are each a methyl group.

In a preferred embodiment, the first polymer compound is represented by general formula (31) below; in general formula (31), the four X's are, independently, an oxygen atom, a sulfur atom, a selenium atom or a tellurium atom; R15 and R16 are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom; and R27 is an acyclic unsaturated hydrocarbon group or a cyclic unsaturated hydrocarbon group including at least one of an acetylene structure and a thiophene structure, and includes at least one kind selected from the group consisting of a carbon atom, an oxygen atom, a nitrogen atom, a sulfur atom and a silicon atom.

[FORMULA 13]

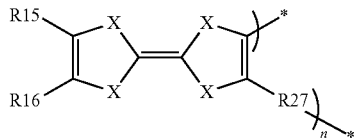

(31)

In a preferred embodiment, the first polymer compound is represented by general formula (8) below; in general formula (8), the four X's are, independently, an oxygen atom, a sulfur atom, a selenium atom or a tellurium atom; R15, R16, R23 and R24 are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom; and R22 and R25 are, independently, an acyclic unsaturated hydrocarbon group or a cyclic unsaturated hydrocarbon group including at least one of an acetylene structure and a thiophene structure, and include at least one kind selected from the group consisting of a carbon atom, an oxygen atom, a nitrogen atom, a sulfur atom and a silicon atom.

[FORMULA 14]

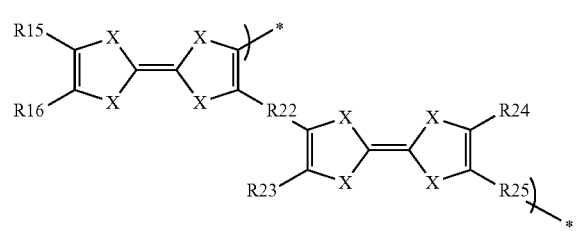

(8)

In a preferred embodiment, the active material layer is formed by applying a mixture, which contains an aprotic solvent with the electrode active material dissolved therein and the electrical conductivity assistant, onto the electrically conductive support, and removing the aprotic solvent therefrom.

In a preferred embodiment, the aprotic solvent is N-methylpyrrolidone, 1,3-dimethyl-2-imidazolidinone, toluene, dimethylacetamide, dimethylformamide, dimethyl sulfoxide, tetrahydrofuran, or chloroform.

Advantageous Effects of Invention

The electrode of the present invention contains, as an electrode active material, a polymer compound having a tetrachalcogenofulvalene structure in the repetition unit, and can therefore allow oxidation-reduction reactions to repetitively occur in a stable manner. In the active material layer, the electrode active material is present covering at least a portion of the surface of the electrical conductivity assistant. Therefore, the contact area between the electrode active material and the electrical conductivity assistant is large, whereby electrons travel smoothly between the electrode active material and the electrical conductivity assistant. Since the electrode active material can be present as a thin film on the surface of the electrical conductivity assistant, the traveling distance of the counter-ion from the electrolyte solution to oxidation-reduction reaction portions in the electrode active material becomes shorter, thereby allowing for a reduction in the resistance due to diffusion of the counter-ion. As a result, it is possible to reduce the resistance in the electrode during oxidation-reduction reactions.

Therefore, by using the electrode of the present invention, it is possible to realize an electricity storage device having excellent cyclic characteristics, a large capacity, and a high output power.

DESCRIPTION OF EMBODIMENTS

Hereinafter, an electrode and an electricity storage device in which the same is used according to the present invention will be described with reference to a lithium secondary battery as an example. However, the present invention is not limited to a lithium secondary battery or an electrode of a lithium secondary battery, but is also suitably used for electrochemical devices such as capacitors utilizing chemical reactions.

(First Embodiment)

Hereinafter, a first embodiment of an electrode of the present invention and an electricity storage device in which the same is used will be described.

Figure 1:
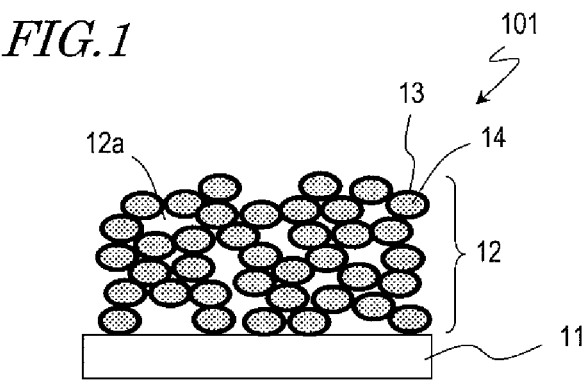
FIG. 1 A schematic cross-sectional view showing a first embodiment of an electrode according to the present invention.

FIG. 1 schematically shows the cross-sectional structure of the first embodiment of an electrode 101 according to the present invention. The electrode 101 includes an electrically conductive support 11, and an active material layer 12 provided on the electrically conductive support 11.

The electrically conductive support 11 is formed by an electrically-conductive, low-resistance substance, e.g., a material used as a current collector of a positive electrode or a negative electrode of a secondary battery. Specifically, the electrically conductive support 11 is formed by a metal foil, mesh or porous material composed of aluminum, gold, silver, a stainless steel, an aluminum alloy, or the like, or a resin film which contains an electrically conductive filler composed of any such metal.

The active material layer 12 includes an electrode active material 13 and an electrical conductivity assistant 14. One feature of the present invention is that the electrode active material 13 includes a polymer compound having a structure to be described in detail below. Another feature of the present invention is that in the active material layer 12, the electrode active material 13 does not form particles but covers at least a portion of the surface of the electrical conductivity assistant 14.

First, the electrode active material 13 will be described in detail. The electrode active material 13 is an organic compound which reversibly undergoes oxidation-reduction reactions, and is specifically a polymer compound including a tetrachalcogenofulvalene structure. The tetrachalcogenofulvalene structure is represented by general formula (1) below. The tetrachalcogenofulvalene structure may be included in the main chain of a polymer compound or may be included in the side chain.

[FORMULA 15]

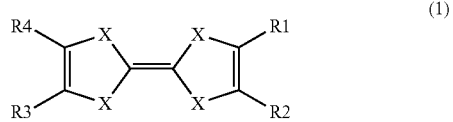

(1)

where X is a chalcogen, i.e., a group-16 element of the periodic table. Specifically, the four X's are independent of one another, and the chalcogens are an oxygen atom, a sulfur atom, a selenium atom or a tellurium atom.

Where the tetrachalcogenofulvalene structure is included in the main chain of the polymer compound (the first polymer compound), selected two among R1 to R4 represent the tetrachalcogenofulvalene structure represented by adjacent general formula (1) or a bonding hand to a monomer having a chemical structure other than general formula (1), and the other two are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group or a nitroso group and an alkylthio group. The acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom, a phosphorus atom and a boron atom.

Where the tetrachalcogenofulvalene structure is included in the side chain of the polymer compound (the second polymer compound), a selected one among R1 to R4 represents a bonding hand for binding to another portion of the main chain or the side chain of the polymer compound, and the other three are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group and an alkylthio group. The acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom, a phosphorus atom and a boron atom. R1 and R2 may bind to each other to form a ring, and R3 and R4 may bind to each other to form a ring.

The tetrachalcogenofulvalene structure shown by general formula (1) includes, in each of the two five-membered rings, a chalcogen atom having an unpaired electron and a double bond. Thus, a π electron conjugated cloud in which five-membered rings are delocalized is formed. Thus, the tetrachalcogenofulvalene structure can remain in a stable state even if it takes an oxidized state where a π electron is discharged from each of the two five-membered rings.

When $X_1$ to $X_4$ are sulfur atoms in the structure represented by general formula (1), the structure of general formula (1) is tetrathiafulvalene (also abbreviated as TTF) shown in formula (2) below.

[FORMULA 16]

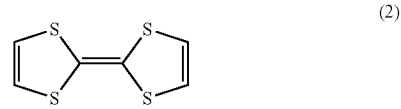

(2)

As shown in formula (R1) below, when the tetrachalcogenofulvalene structure represented by general formula (1) is subjected to one-electron oxidation, one of the two five-membered rings loses an electron and becomes positively charged. Therefore, a counter-anion is coordinated to the tetrachalcogenofulvalene structure. Furthermore, upon one-electron oxidation, the other five-membered ring loses an electron, and becomes positively charged. Therefore, another counter-anion is coordinated to the tetrachalcogenofulvalene structure.

The tetrachalcogenofulvalene structure is stable even in an oxidized state, and is reduced by receiving an electron, thus being able to return to an electrically neutral state. Therefore, by utilizing these reversible oxidation-reduction reactions, the tetrachalcogenofulvalene structure can be used as an electrode active material which is capable of storing electric charge. For example, when the tetrachalcogenofulvalene structure represented by general formula (1) is used for the positive electrode of a lithium secondary battery, during discharging, the tetrachalcogenofulvalene structure takes an electrically neutral state, i.e., a state on the left side of formula (R1). Moreover, in a charged state, the tetrachalcogenofulvalene structure takes a positively charged state, i.e., a state on the right side of formula (R1).

[FORMULA 17]

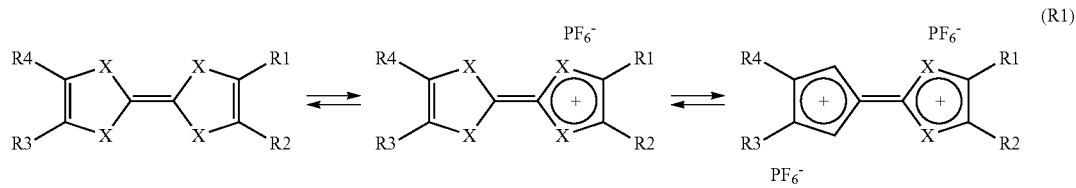

It has been reported in TTF Chemistry, Fundamentals and Applications of Tetrathiafulvalene, Journal of the American Chemical Society, 1975, 97(10), P2921-2922, Chemical Communication, 1997, P 1925-1926, etc., for example, that the oxidation-reduction property shown in formula (R1) is realized when X's are a sulfur atom, a selenium atom or a tellurium atom and an oxygen atom.

What is important for the desirable oxidation-reduction property is the tetrachalcogenofulvalene structure itself, and the functional groups of the tetrachalcogenofulvalene structure, i.e., the structures from R1 to R4 in the structure represented by general formula (1) are not limited to any particular structures as long as they are sites that do not contribute to oxidation-reduction. Synthesis of compounds having various structures for R1 to R4, and their possession of an oxidation-reduction property similar to that of chalcogenofulvalene, are reported in TTF Chemistry, Fundamentals and Applications of Tetrathiafulvalene, Journal of the American Chemical Society.

As polymers having a π electron conjugated cloud, polyaniline, polythiophene, and derivatives thereof are known. These polymers include a π electron conjugated cloud at the main chain, and is similar to a polymer compound of an electrode active material used in an electrode of the present invention in that it includes a π electron conjugated cloud. However, with polyaniline, polyacetylene, and derivatives thereof, a resonance structure due to conjugated double bonds is formed across the entire main chain, so that, when electrons are pulled out from the main chain, the resultant positive charge will distribute with a certain expanse across the main chain. As a result, when more electrons are to be pulled out from an adjoining repetition unit, the positive charge occurring due to the pulling-out of the first electron will be delocalized over to the adjoining unit, and electrical repulsion will make it difficult to pull out any electrons from the adjoining unit.

On the other hand, in a copolymer compound which includes the tetrachalcogenofulvalene structure represented by general formula (1) in the main chain or the side chain, the electron of the π electron conjugated cloud is delocalized only within each five-membered ring. Therefore, the oxidation-reduction reaction is completed within each five-membered ring of the polymer, and it is believed that the oxidation state of one five-membered ring has no significant influence on the oxidation-reduction reaction of an adjacent five-membered ring. Therefore, an exchange of electrons corresponding to the number of five-membered rings included in the polymer is possible. That is, the electrode active material used in an electrode of the present invention is capable of achieving a high charge-discharge capacity.

In the electrode active material used in an electrode of the present invention, the tetrachalcogenofulvalene structure represented by general formula (1) is included in the repetition unit of the main chain of the polymer compound or included in the side chain of the polymer compound. The inclusion of the tetrachalcogenofulvalene structure represented by general formula (1) in the polymer compound increases the molecular weight of the molecule including the tetrachalcogenofulvalene structure and decreases the solubility in an organic solvent. Therefore, it is possible to suppress deterioration in cyclic characteristics of an electricity storage device in which an organic solvent is used as an electrolyte solution. Particularly, where the tetrachalcogenofulvalene structure is included in the main chain of the polymer, sites which undergo oxidation-reduction reactions contribute to the increase in molecular weight of the polymer. Therefore, it is possible to from a polymer structure in which portions which do not undergo oxidation-reduction reactions are made as small as possible. Thus, it is possible to realize an electrode with a high energy density and excellent charging-discharging or oxidation-reduction cyclic characteristics.

As described above, it is preferable that the polymer has a large molecular weight so that the polymer of the tetrachalcogenofulvalene structure represented by general formula (1) does not dissolve in an organic solvent. Specifically, four or more of the tetrachalcogenofulvalene structure represented by general formula (1) are preferably included, i.e., the degree of polymerization of the polymer (n shown in the following general formula or chemical formula, or the sum of n and m) is preferably four or more. This realizes an electrode active material that is unlikely to dissolve in an organic solvent. More preferably, the degree of polymerization of the polymer is 10 or more, and more preferably 20 or more and 4000 or less.

The polymer used in an electrode of the present invention desirably has a chemical structure with a high affinity with a particular aprotic solvent. This makes it easier to obtain a structure in which the electrode active material 13 does not form particles but is covering at least a portion of the surface of the electrical conductivity assistant 14. Thus, it is preferable to have a chemical structure with a high affinity with an aprotic solvent, other than the tetrachalcogenofulvalene structure.

As one chemical structure of a polymer with a high affinity with an aprotic solvent, a chemical structure with a high affinity with an aprotic solvent is preferably present as a substituent of a bonding hand other than the bonding hand forming the main chain of the tetrachalcogenofulvalene structure. The chemical structure with a high affinity with an aprotic solvent is preferably an acyclic saturated hydrocarbon group, an acyclic unsaturated hydrocarbon group, a cyclic saturated hydrocarbon group, a cyclic unsaturated hydrocarbon, a phenyl group, a hydrogen atom, a hydroxyl group, a cyano group, an amino group, a nitro group, a nitroso group, or an alkylthio group, and an oxygen element, a nitrogen element, a sulfur element or a silicon element may be included in an acyclic saturated hydrocarbon group, an acyclic unsaturated hydrocarbon group, a cyclic saturated hydrocarbon group, or a cyclic unsaturated hydrocarbon.

Moreover, an acyclic saturated hydrocarbon group and a cyclic unsaturated hydrocarbon group are preferable, and a saturated hydrocarbon group and a phenyl group are more preferable.

As one chemical structure of a polymer with a high affinity with an aprotic polar solvent, a chemical structure with a high affinity with an aprotic solvent is preferably present as a linker site of a bonding hand forming the main chain of the tetrachalcogenofulvalene structure. The chemical structure with a high affinity with an aprotic solvent is preferably an acyclic saturated hydrocarbon group, an acyclic unsaturated hydrocarbon group, a cyclic saturated hydrocarbon group, a cyclic unsaturated hydrocarbon, a phenyl group, a hydrogen atom, a hydroxyl group, a cyano group, an amino group, a nitro group, a nitroso group, or an alkylthio group, and an oxygen element, a nitrogen element, a sulfur element or a silicon element may be included in an acyclic saturated hydrocarbon group, an acyclic unsaturated hydrocarbon group, a cyclic saturated hydrocarbon group, or a cyclic unsaturated hydrocarbon. Moreover, an acyclic unsaturated hydrocarbon group and a cyclic unsaturated hydrocarbon group are preferable, and an acetylene structure, a phenyl group and a thiophene group are more preferable. Moreover, it is preferable that a phenyl group is bound at the meta position to form the main chain.

Hereinafter, a polymer compound used as the electrode active material 13 of an electrode of the present invention will be described. As described above, the electrode active material 13 is a polymer compound in which the tetrachalcogenofulvalene structure represented by general formula (1) is included in the main chain or the side chain. First, a polymer compound including the tetrachalcogenofulvalene structure in the main chain (hereinafter referred to also as a first polymer compound) will be described. Where the tetrachalcogenofulvalene structure forms the main chain, since the tetrachalcogenofulvalene structure is secured by chemical bonds at two reaction structure locations in the main chain, the degree of freedom in the molecular movement of the tetrachalcogenofulvalene reaction structure is small, and it is unlikely to be laid over the closest tetrachalcogenofulvalene structure in the molecule of the polymer. That is, the planar stack between tetrachalcogenofulvalene structures having a π electron conjugated cloud, and the acting of a resultant strong intermolecular force, are suppressed. Where a strong intermolecular force is unlikely to act between molecules, the molecules are likely to solvate, i.e., dissolve, whereby a polymer represented by general formula (1) typically has a high solubility in a solvent.

Note however that a nonaqueous solvent used in a nonaqueous electrolyte secondary battery typically does not have such a high dissolving power as to dissolve an organic compound polymer, and the polymer represented by general formula (1) does not dissolve in a nonaqueous solvent used in a nonaqueous electrolyte secondary battery. The "high solubility" as used above means that the polymer represented by general formula (1) dissolves in a solvent that is appropriately selected from among aprotic polar solvents having a high dissolving power against an organic compound polymer.

As long as the tetrachalcogenofulvalene structure represented by general formula (1) is included in the main chain, the first polymer compound, which is the electrode active material 13, may be a copolymer between a monomer having a tetrachalcogenofulvalene structure represented by general formula (1), and a monomer having a chemical structure other than general formula (1). Note however that in order to obtain a higher energy density, it is preferable that tetrachalcogenofulvalene structures are directly bound to each other to form the main chain of the polymer. In this case, for example, it may be a copolymer between two or more monomers including tetrachalcogenofulvalene structures that differ from each other in terms of which one of R1 to R4 of the tetrachalcogenofulvalene structure represented by general formula (1) is not used for binding to an adjacent tetrachalcogenofulvalene structure. In other words, it may be a polymer obtained by copolymerization between two or more monomers which both include a tetrachalcogenofulvalene structure but which have different substituents from each other. In a polymer obtained by copolymerization between two or more monomers which both include a tetrachalcogenofulvalene structure but which have different substituents from each other, since adjacent tetrachalcogenofulvalene structures have different substituents, the intermolecular force between tetrachalcogenofulvalene structures is further weakened due to the intermolecular force between the substituents and the steric hindrance. Moreover, a solvent is likely to enter the gap between molecules occurring due to the steric hindrance between substituents. Therefore, a polymer represented by general formula (1) having such a structure is likely to solvate, i.e., dissolve, in an aprotic polar solvent to such a degree that it does not dissolve in an electrolytic solvent.

First, the first polymer compound used as the electrode active material 13 of an electrode of the present invention may be a copolymer compound including repetition units represented by general formulae (3) and (4) below. While these are polymers in which the 1,4-positions of the tetrachalcogenofulvalene structures are directly bound to each other, the tetrachalcogenofulvalene structures of the repetition units have different substituents. In a copolymer including repetition units represented by general formulae (3) and (4), the tetrachalcogenofulvalene structures are directly bound to each other to form the main chain of the copolymer. Therefore, the proportion of the constituent part of the main chain that contributes to oxidation-reduction reactions is high, and it is possible to store electric charge with a high energy density as an electricity storage material.

A copolymer including repetition units represented by general formulae (3) and (4) may be a block copolymer, an alternating copolymer, or a random copolymer. Specifically, it may be a copolymer having an alternating array of units, each of which includes a plurality of repetition units represented by general formula (3) directly bound together, and units, each of which includes plurality of repetition units represented by general formula (4) directly bound together. It may be a copolymer having an alternating array of repetition units represented by general formula (3) and repetition units represented by general formula (4). Alternatively, it may be a copolymer having a random array of repetition units represented by general formula (3) and repetition units represented by general formula (4).

[FORMULA 18]

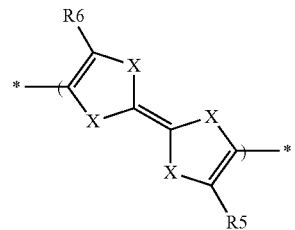

(3)

[FORMULA 19]

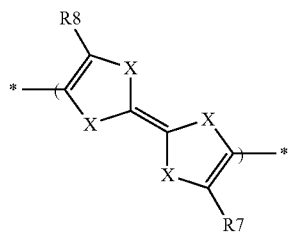

(4)

Herein, in general formulae (3) and (4), the four X's are, independently, an oxygen atom, a sulfur atom, a selenium atom or a tellurium atom, and R5 to R8 are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group. The acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom. Note however that the combination between R5 and R6 is different from the combination between R7 and R8.

For example, R5 and R6 may each be a phenyl group, while R7 and R8 are each an acyclic hydrocarbon group. Specifically, the electrode active material 13 may be a polymer shown in chemical formula (5) below, where X is a sulfur atom, R5 and R6 are each a phenyl group, and R7 and R8 are a decyl group. Herein, the sum between n and m represents the degree of polymerization, and is an integer of two or more. Repetition units having two tetrachalcogenofulvalene structures may be arrayed regularly or randomly. The ratio between n and m is arbitrary. It is preferable that the polymer has a large molecular weight so that the polymer does not dissolve in an organic solvent. Specifically, it is preferable that it includes four or more tetrachalcogenofulvalene structures, i.e., the degree of polymerization of the polymer (the sum between n and m) is four or more.

[FORMULA 20]

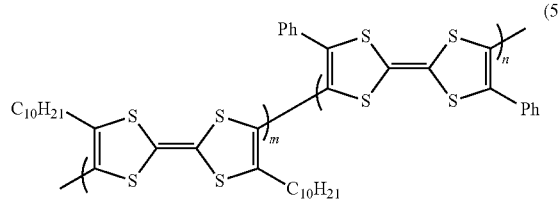

(5)

The electrode active material 13 may be a polymer represented by general formula (6) below. In these polymers, an acyclic unsaturated hydrocarbon group or a cyclic unsaturated hydrocarbon group including an acetylene structure or a thiophene structure as a linker is arranged alternately with tetrachalcogenofulvalene structures in the main chain. In the polymer represented by general formula (6), tetrachalcogenofulvalene structures form the main chain via an acyclic unsaturated hydrocarbon group or a cyclic unsaturated hydrocarbon group including an acetylene structure or a thiophene structure. Therefore, an acyclic unsaturated hydrocarbon group or a cyclic unsaturated hydrocarbon group including an acetylene structure or a thiophene structure suppresses electronic interactions between tetrachalcogenofulvalene structures, whereby it is possible to increase the stability against electrochemical oxidation-reduction in the tetrachalcogenofulvalene structures. As a result, all the tetrachalcogenofulvalene structures in the polymer can be oxidized and reduced reversibly, and it is possible to realize an electrode active material with a high capacity.

As an acyclic unsaturated hydrocarbon group or a cyclic unsaturated hydrocarbon group including an acetylene structure or a thiophene structure as a linker is arranged alternately with tetrachalcogenofulvalene structures, the intermolecular force between tetrachalcogenofulvalene structures is further weakened. Because of the electron-withdrawing action of these linker structures, the affinity with a nonaqueous solvent is increased. Therefore, a polymer represented by general formula (6) is more likely to solvate, i.e., dissolve, in an aprotic polar solvent. Moreover, since a solvent is likely to enter the gap between molecules occurring due to the steric hindrance between substituents, it is likely to solvate, i.e., dissolve, in an aprotic polar solvent to such a degree that it does not dissolve in an electrolytic solvent.

[FORMULA 21]

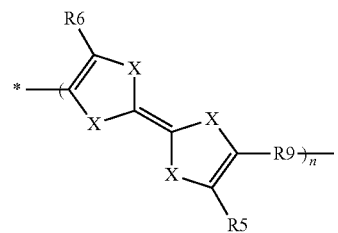

(6)

Herein, in general formula (6), the four X's are, independently, an oxygen atom, a sulfur atom, a selenium atom or a tellurium atom, and R5 and R6 are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group. The acyclic saturated hydrocarbon group, the acyclic unsaturated hydrocarbon group, the cyclic saturated hydrocarbon group and the cyclic unsaturated hydrocarbon group each include at least one kind selected from the group consisting of an oxygen atom, a nitrogen atom, a sulfur atom and a silicon atom. R9 is an acyclic unsaturated hydrocarbon group or a cyclic unsaturated hydrocarbon group including an acetylene structure or a thiophene structure, and includes at least one kind selected from the group of a carbon atom, an oxygen atom, a nitrogen atom, a sulfur atom, and a silicon atom.

For example, the electrode active material 13 may be a polymer shown in chemical formula (8) below, where X is a sulfur atom, R5 and R6 are each a phenyl group, and R9 has the structure shown in chemical formula (7) below.

[FORMULA 22]

(7)

[FORMULA 23]

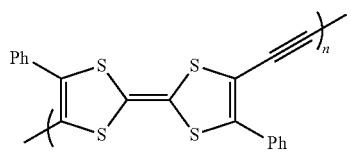
(8)

The electrode active material 13 may be a polymer of general formula (6), where R9 has the structure shown in any of general formulae (9-a) to (9-c) below. For example, where R9 has the structure represented by general formula (9-a) or (9-b), the electrode active material 13 includes a polymer represented by general formula (10) or (11) below.

[FORMULA 24]

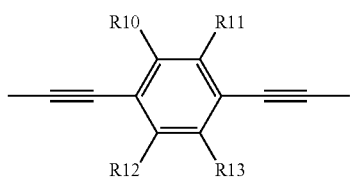
(9-a)

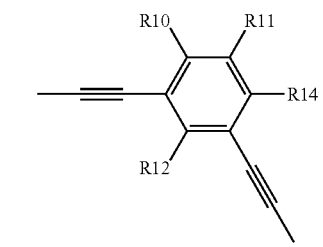
(9-b)

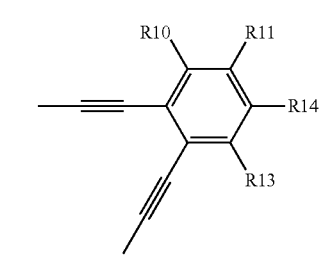
(9-c)

[FORMULA 25]

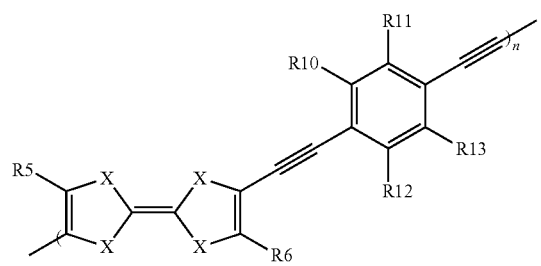
(10)

Herein, in general formula (10), the four X's are, independently, an oxygen atom, a sulfur atom, a selenium atom, or a tellurium atom; R5, R6 and R10 to R13 includes, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; and the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom.

[FORMULA 26]

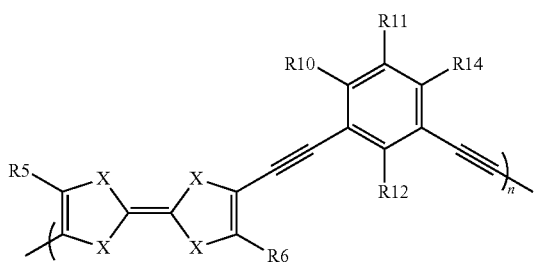
(11)

Herein, in general formula (11), the four X's are, independently, an oxygen atom, a sulfur atom, a selenium atom, or a tellurium atom, and R5, R6, R10 to R12 and R14 include, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group. The acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom.

For example, the electrode active material 13 may be a polymer shown in chemical formula (12), (13) or (14) below, where X is a sulfur atom, R5 and R6 are each a thiohexyl group, a methyl group or a decyl group, and R10 to R13 are a hydrogen group in general formula (10).

[FORMULA 27]

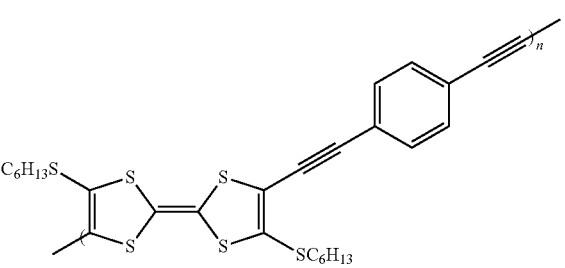
(12)

[FORMULA 28]

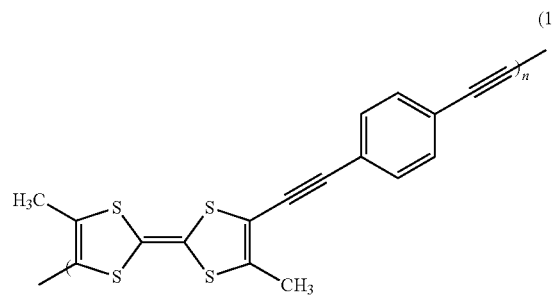

(13)

[FORMULA 29]

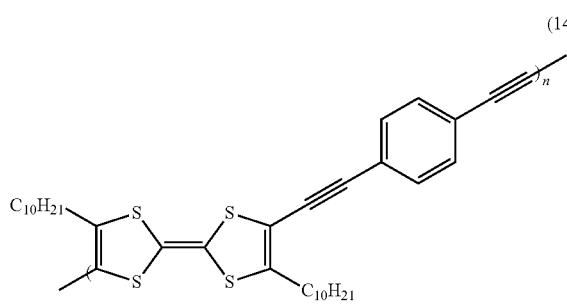

(14)

The electrode active material 13 may be a polymer shown in chemical formula (15) below, where X is a sulfur atom, R5 and R6 are each a phenyl group, R10 and R13 are each a methoxy group, and R11 and R12 are each a hydrogen group, in general formula (10).

[FORMULA 30]

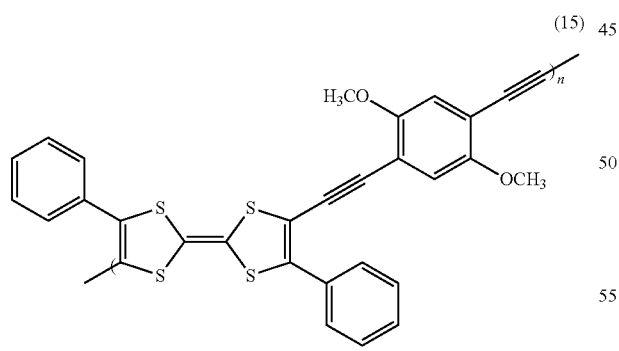

(15)

The electrode active material 13 may be a polymer shown in chemical formula (16) or (17) below, where x is a sulfur atom, R5 and R6 are each a methyl group or a phenyl group, and R10 to R12 and R14 are each a hydrogen group, in general formula (11).

[FORMULA 31]

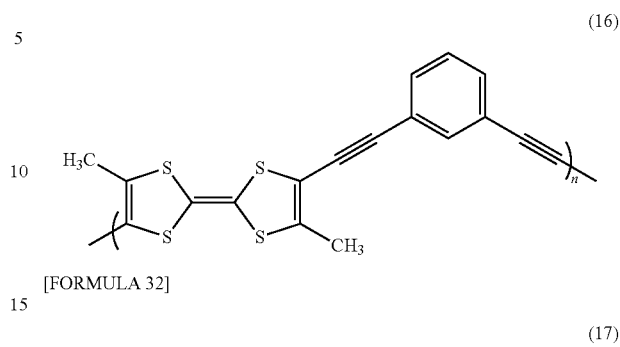

(16)

[FORMULA 32]

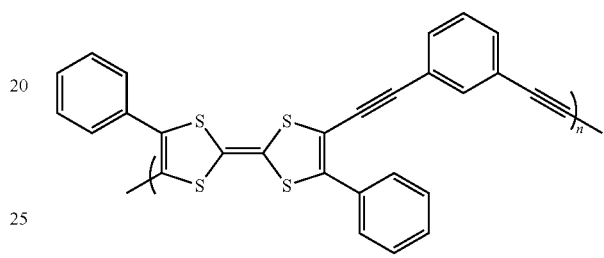

(17)

Alternatively, in general formula (6), R9 may have any of the structures shown in chemical formulae (18) to (22) below including a thiophene structure.

[FORMULA 33]

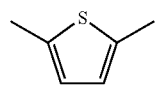

(18)

[FORMULA 34]

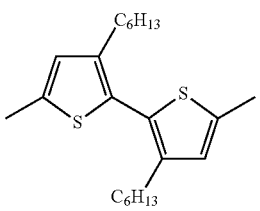

(19)

[FORMULA 35]

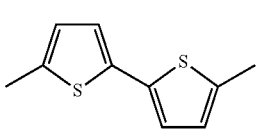

(20)

[FORMULA 36]

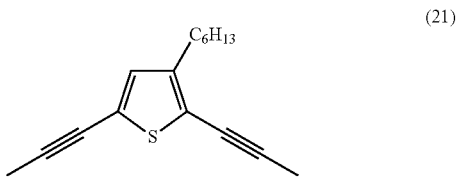

(21)

[FORMULA 37]

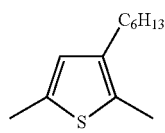 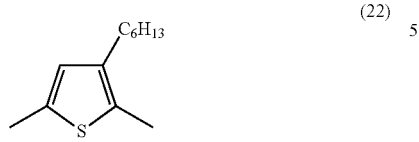
(22)

More specifically, where x is a sulfur atom, the polymer may be a polymer represented by chemical formulae (23) to (30) below. It is preferable that four or more tetrachalcogenofulvalene structures are included so that the polymer does not dissolve in an organic solvent. That is, it is preferable that n in chemical formulae (23) to (30) below is four or more and that m in chemical formula (30) is four or more. In a polymer represented by chemical formula (30), repetition units having tetrathiafulvalene structures and repetition units having thiophene structures may be arrayed regularly or randomly. The ratio between n and m is arbitrary.

[FORMULA 38]

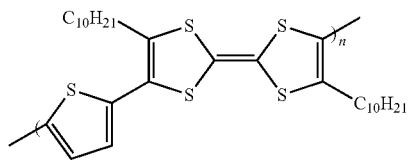
(23)

[FORMULA 39]

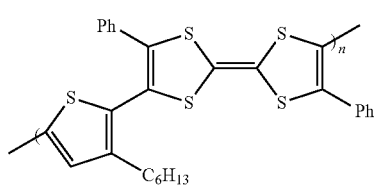
(24)

[FORMULA 40]

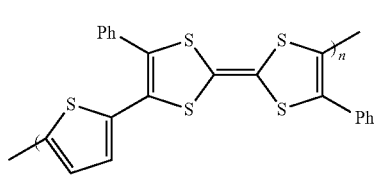
(25)

[FORMULA 41]

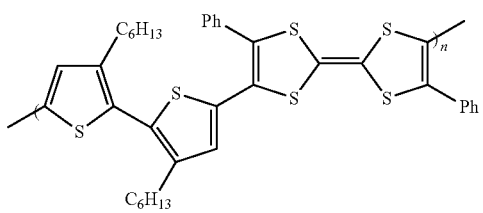
(26)

[FORMULA 42]

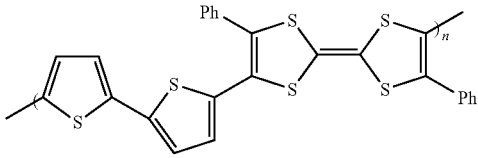
(27)

[FORMULA 43]

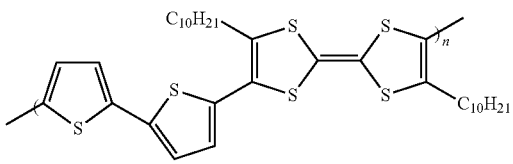
(28)

[FORMULA 44]

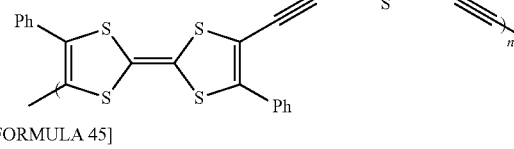
(29)

[FORMULA 45]

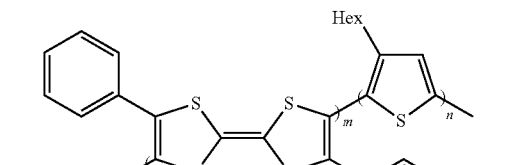
(30)

In the polymers described hereinbefore, the main chain of the polymer is formed by R1 and R3 of the tetrachalcogenofulvalene structure represented by general formula (1), i.e., the 1-position and the 4-position of the tetrachalcogenofulvalene structure. However, the main chain of the polymer may be formed by R1 and R2 (or R3 and R4) of the tetrachalcogenofulvalene structure represented by general formula (1), i.e., the 1-position and the 2-position (or the 3-position and the 4-position) of the tetrachalcogenofulvalene structure.

For example, the electrode active material 13 may be a polymer represented by general formula (31) below.

[FORMULA 46]

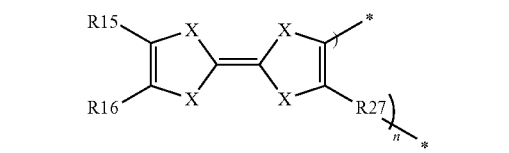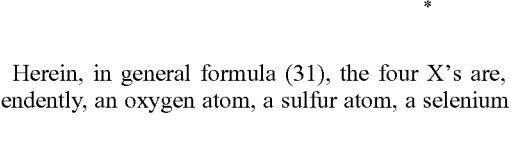
(31)

Herein, in general formula (31), the four X's are, independently, an oxygen atom, a sulfur atom, a selenium atom or a tellurium atom; R15 and R16 are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; and the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom. R27 is an acyclic unsaturated hydrocarbon group or a cyclic unsaturated hydrocarbon group including at least one of an acetylene structure and a thiophene structure, and includes at least one kind selected from the group consisting of a carbon atom, an oxygen atom, a nitrogen atom, a sulfur atom and a silicon atom.

More specifically, R27 may have a structure shown in any of chemical formula (7) below and general formulae (9-a), (9-b) and (9-c) below.

[FORMULA 47]

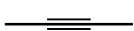

(7)

[FORMULA 48]

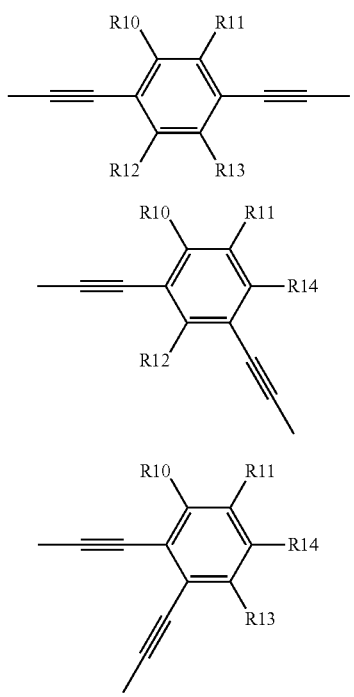

(9-a)

(9-b)

(9-c)

Herein, in general formulae (9-a), (9-b) and (9-c), R10 to R14 include, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group, and the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom.

Where R17 has a structure shown in chemical formula (9-a) in general formula (31), the electrode active material may be a polymer represented by general formula (32) below.

[FORMULA 49]

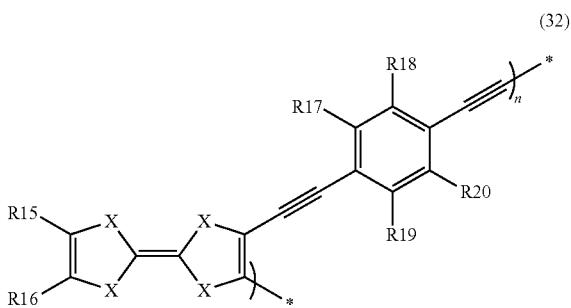

(32)

Herein, in general formula (32), the four X's are, independently, an oxygen atom, a sulfur atom, a selenium atom, or a tellurium atom; R15 to R20 include, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; and the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom.

For example, the electrode active material 13 may be a polymer shown in chemical formula (33) below, where X is a sulfur atom, R15 and R16 are a thiohexyl group, and R17 to R20 are a hydrogen atom.

[FORMULA 50]

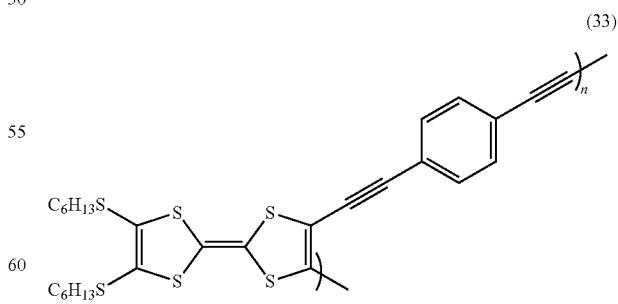

(33)

Where R17 has a structure shown in chemical formula (9-b) in general formula (31), the electrode active material may be a polymer represented by general formula (34) below.

[FORMULA 51]

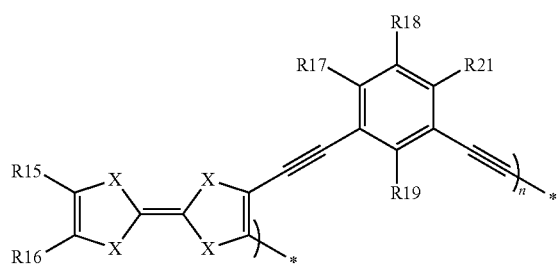

(34)

Herein, in general formula (34), the four X's are, independently, an oxygen atom, a sulfur atom, a selenium atom, or a tellurium atom, and R15 to R19 and R21 include, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group. The acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom.

The electrode active material 13 may have a structure represented by general formula (35) below.

[FORMULA 52]

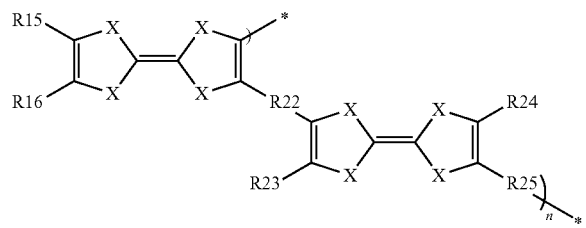

(35)

Herein, in general formula (35) the four X's are, independently, an oxygen atom, a sulfur atom, a selenium atom or a tellurium atom; R15, R16, R23 and R24 are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group or an alkylthio group; and the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom and a silicon atom. R22 and R25 are, independently, an acyclic unsaturated hydrocarbon group or a cyclic unsaturated hydrocarbon group including at least one of an acetylene structure and a thiophene structure, and include at least one kind selected from the group consisting of a carbon atom, an oxygen atom, a nitrogen atom, a sulfur atom and a silicon atom.

In general formula (18), R22 and R25 may have a structure shown in chemical formula (7) below.

[FORMULA 53]

(7)

For example, the electrode active material 13 may be a polymer shown in chemical formula (36) below, where X is a sulfur atom, R15 and R16 are a thiohexyl group, and R23 and R24 are a phenyl group. It is preferable that four or more tetrachalcogenofulvalene structures are included so that the polymer does not dissolve in an organic solvent. That is, it is preferable that n in chemical formula (36) below is two or more.

[FORMULA 54]

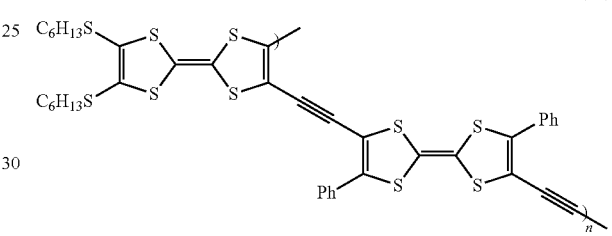

(36)

Also in the polymers represented by general formulae (31), (32), (34) and (35), tetrachalcogenofulvalene structures form the main chain via an acyclic unsaturated hydrocarbon group or a cyclic unsaturated hydrocarbon group including an acetylene structure or a thiophene structure. Therefore, an acyclic unsaturated hydrocarbon group or a cyclic unsaturated hydrocarbon group suppresses electronic interactions between tetrachalcogenofulvalene structures, whereby it is possible to increase the stability against electrochemical oxidation-reduction in the tetrachalcogenofulvalene structures. As a result, all the tetrachalcogenofulvalene structures in the polymer can be oxidized and reduced reversibly, and it is possible to realize an electrode active material with a high capacity.

Each of the polymers described above can be synthesized by polymerizing monomers including a tetrachalcogenofulvalene structure. As long as it has a structure represented by general formulae (1) to (18) described above, the polymer may be synthesized in any manner. However, in order to prevent rearrangement of active bonding hands during polymerization, and form a highly regular polymer, it is preferable to synthesize a polymer through polymerization based on a coupling reaction. Specifically, it is preferable to prepare a monomer of a tetrachalcogenofulvalene structure which has a molecular structure including a predetermined substituent represented by general formulae (1) to (18) described above and has halogen or another functional group at a position to be the bonding hand during polymerization, and synthesize a polymer through polymerization based on a Sonogashira coupling reaction or another coupling reaction. Specific synthesis methods will be described in Examples.

Next, as the electrode active material 13, a polymer compound including the tetrachalcogenofulvalene structure in the side chain (hereinafter referred to also as a second polymer compound) will be described. Where a polymer having tetrachalcogenofulvalene structures in repetition units includes tetrachalcogenofulvalene structures in side chains, the electrode active material 13 is a copolymer compound between a first unit including, in the side chain, an oxidation-reduction site having a structure represented by general formula (1), and a second unit not including, in the side chain, an oxidation-reduction reaction site.

Where tetrachalcogenofulvalene structures are included in side chains, the tetrachalcogenofulvalene structures present in the side chains are likely to be close to each other. Therefore, it is difficult to ensure a traveling path for a counter-anion during oxidation-reduction reactions, and the oxidation-reduction reactions no longer proceed smoothly. In this case, it is more difficult to obtain a stable oxidation state of a tetrachalcogenofulvalene structure, and it is therefore more difficult for oxidation reactions to proceed. This will be a resistance for active material reactions.

Therefore, a second unit which does not have an oxidation-reduction reaction site in the side chain is copolymerized with a first unit which has an oxidation-reduction site having a structure represented by general formula (1) in the side chain, so that when an oxidation-reduction site having a structure represented by general formula (1) is oxidized, the counter-anion is more likely to come close to the oxidation-reduction site and be coordinated. This reduces the steric hindrance in the vicinity of the oxidation-reduction site, making it more likely that the counter-anion is coordinated to the oxidation-reduction site, and also reduces the resistance for active material reactions.

Where tetrachalcogenofulvalene structures are included in side chains, the tetrachalcogenofulvalene structures located in side chains are likely to come close to each other, and in a polymer compound including no second unit, the tetrachalcogenofulvalene structures are likely to be stacked on each other. Therefore, the solubility of the polymer compound in a solvent is low. By copolymerization with second units which have no tetrachalcogenofulvalene structure, it is possible to prevent tetrachalcogenofulvalene structures from being stacked, thereby improving the solubility in a solvent.

Specifically, the second unit does not have a site that electrochemically undergoes oxidation-reduction reactions in the potential range in which the structures represented by general formula (1) would undergo oxidation-reduction reactions. Preferably, the side chain of the second unit is s functional group having an affinity with an aprotic solvent, whereby it is easier for the solvated counter-anion to come close to the vicinity of the oxidation-reduction site. Structures having such chemical characteristics include: an ester group, an ether group, and a carbonyl group, which are oxygen-containing functional groups; a cyano group, a nitro group, and a nitroxyl group, which are nitrogen-containing functional groups; an alkyl group and a phenyl group, which are functional groups composed of carbon; an alkylthio group, a sulfone group, and a sulfoxide group, which are sulfur-containing functional groups; and so on. Preferably, the side chain of the second unit is an ester group, an ether group or a carbonyl group.

The side chain of the second unit preferably includes at least one kind, or two or more kinds, selected from among them.

There is no particular limitation as to the end portion of the functional group such as an ester group, an ether group, a carbonyl group, a sulfone group, or a sulfoxide group; however, alkyl groups having a small carbon number such as a methyl group or an ethyl group, and aromatic groups are desirable. Examples of preferable ester groups include alkyl esters represented as ($-COO-CH_3$), ($-COO-C_2H_5$) phenyl esters ($-COO-C_6H_5$), and so on. Examples of preferable ether groups include an alkyl ether represented as ($-O-CH_3$), ($-O-C_2H_5$), phenyl ether ($-O-C_6H_5$), and so on. Examples of preferable carbonyl groups include ($-C(=O)-CH_3$), ($-C(=O)-C_2H_5$), ($-C(=O)-C_6H_5$), and so on. Preferable sulfone groups include ($-S(=O)_2-CH_3$), ($-S(=O)_2-C_2H_5$), ($-S(=O)_2-C_6H_5$), and so on. Preferable sulfoxide groups include ($-S(=O)-CH_3$), ($-S(=O)-C_2H_5$), ($-S(=O)-C_6H_5$), and so on. Particularly, the side chain of the second unit preferably includes an ester group, an ether group or a carbonyl group which has a high affinity with an aprotic solvent.

There is no particular limitation as to the main chain of the copolymer compound, but a trivalent residue which contains at least one selected from the group consisting of a carbon atom, an oxygen atom, a nitrogen atom, and a sulfur atom is contained as a repetition unit. The repetition unit may contain a substituent selected from the group consisting of saturated aliphatic groups and unsaturated aliphatic groups having a carbon number of 1 to 10. In other words, the repetition unit includes at least one hydrogen or a substituent selected from the group consisting of saturated aliphatic groups and unsaturated aliphatic groups having a carbon number of 1 to 10. Specifically, it may be polyethylene or polypropylene, which are saturated hydrocarbons, polyacetylene, which is an unsaturated hydrocarbon, polycarbonate and polystyrene including aromatics, as well as what is obtained by substituting a portion of such protons with a halogen, and so on.

Preferably, the copolymer compound composed of first units and second units has a large degree of polymerization so as not to dissolve in an organic solvent. Specifically, it is preferable that a total number of first units and second units contained in the copolymer compound is four or more, i.e., the degree of polymerization is four or more. As a result, an electricity storage material which is unlikely to dissolve in an organic solvent is realized. More preferably, the degree of polymerization of the polymer is 10 or more, and even more preferably, 20 or more and 4000 or less.

Where the side chain of the second unit of the copolymer compound is a functional group having an affinity with a nonaqueous solvent, it is possible to control the affinity of the copolymer compound as a whole with a solvent based on the type of the side chain of the second unit or the constituent ratio m/n of the number m of second units with respect to the number n of first units. Herein, m and n are each an integer of one or more. It has been found through a detailed study that where the side chain of the second unit is a functional group having an affinity with a nonaqueous solvent, the affinity with a particular aprotic solvent other than an electrolytic solvent is improved significantly, and it dissolves even when the degree of polymerization of the polymer is 10 or more. The constituent ratio m/n in the present invention means an average value of a value obtained by dividing the total number m of second units composing the copolymer compound by the total number n of first units. An aprotic solvent having a high affinity with a copolymer compound composed of first units and second units will be described below in detail.

As described above, the constituent ratio m/n only needs to be greater than zero because the effects of reducing the steric hindrance in the vicinity of oxidation-reduction sites are obtained if the copolymer compound even contains a small amount of second units having no oxidation-reduction site in the side chain. In order to increase the affinity with an aprotic solvent, it is preferable that there are as many second units as possible; as the constituent ratio m/n becomes larger, the aforementioned effects can be obtained to a greater extent. However, since the second units do not contain any oxidation-reduction sites, the charge density of the copolymer compound will decrease as the second units increase. It has been found through a detailed study of the inventors of the present invention that, when the constituent ratio m/n is five or less, the charge density can be enhanced and oxidation-reduction reactions can be allowed to repetitively occur in a stable manner.

That is, the copolymer compound included in the electricity storage material of the present invention can be represented by general formula (37) below.

[FORMULA 55]

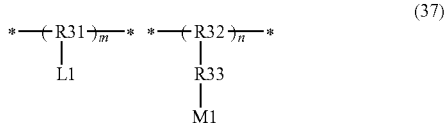

(37)

Herein, R31 and R32 constitute a main chain of the copolymer compound. R32 and R32 are trivalent residues containing, independently, at least one selected from the group consisting of a carbon atom, an oxygen atom, a nitrogen atom and a sulfur atom; and at least one substituent selected from the group consisting of saturated aliphatic groups and unsaturated aliphatic groups having a carbon number of 1 to 10 or at least one hydrogen. L1 is an ester group, an ether group, a carbonyl group, a cyano group, a nitro group, a nitroxyl group, an alkyl group, a phenyl group, an alkylthio group, a sulfone group or a sulfoxide group that is bound to R31. As described above, it is preferable that L1 is an ester group, an ether group or a carbonyl group having a high affinity with an aprotic solvent. R33 is a divalent residue including at least one selected from the group consisting of a substituted or unsubstituted alkylene, alkenylene, arylene, ester, amide, and ether having a carbon number of 1 to 4 that are bound to R32 and M1. M1 is general formula (1), and is bound to R33 via the aforementioned bonding hand, where n and m are integers representing the numbers of times of repeating the monomer units.

R31 and R32 may include any side chain other than $M_1$ and L1 as represented by general formula (2). Moreover, m+n is preferably four or more, more preferably 10 or more, and even more preferably 20 or more and 4000 or less. In order for the copolymer compound to have a high charge density and to have a desirable affinity with an aprotic polar solvent, it is preferable that m/n is greater than zero and five or less. Repetition units containing L1 and repetition units containing M1 may be arrayed regularly or randomly.

In a preferred embodiment of the electricity storage material of the present invention, a tetrathiafulvalene structure is included in a side chain of each first unit of the copolymer compound as described above. The tetrathiafulvalene structure is stable even in a state of two-electron oxidation as described above, and therefore is suitable for electricity storage materials. Specifically, a structure represented by general formula (38) below is contained in each first unit of the copolymer compound.

[FORMULA 56]

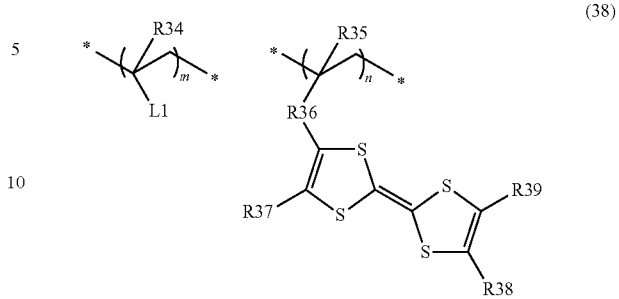

(38)

Herein, R36 is a divalent residue including at least one selected from the group consisting of a substituted or unsubstituted alkylene, alkenylene, arylene, ester, amide and ether having a carbon number of 1 to 4. R34 and R35 are, independently, one selected from the group consisting of a hydrogen atom, a saturated aliphatic group having a carbon number of 1 to 4 and a phenyl group, and R37 to R39 are, independently, an acyclic aliphatic group, a cyclic aliphatic group, a hydrogen atom, a hydroxyl group, a cyano group, an amino group, a nitro group, a nitroso group or an alkylthio group; and R38 and R39 may be bound to each other to form a ring. $L_1$ is an ester group, an ether group, a carbonyl group, a cyano group, a nitro group, a nitroxyl group, an alkyl group, a phenyl group, an alkylthio group, a sulfone group, or a sulfoxide group. As described above, the tetrathiafulvalene structure is very stable even in an oxidation state, and the oxidation-reduction reactions of the tetrathiafulvalene structure are not much influenced by any structure outside the structure.

Each of the aforementioned second polymer compounds to be used for the electricity storage material of the present invention may be synthesized by any method so long as it includes the aforementioned first units and second units. For example, a copolymer main-chain compound to become a main chain of the copolymer compound may be synthesized, and thereafter side chains including a structure represented by general formula (1) may be introduced to the copolymer main-chain compound. Alternatively, side chains including a structure represented by general formula (1) may be introduced to a monomer which is used for the synthesis of a main-chain compound of the copolymer compound, and the copolymer compound may be synthesized by performing synthesis of the main chain. However, in order to prevent rearrangement of active bonding hands during the polymerization reaction, and synthesize a highly regular copolymer compound in which the molecular weight, the mixing ratio between the first units and the second units, and the like are controlled, it is preferable to first synthesize a copolymer main-chain compound to become the main chain, and introduce side chains including a structure represented by general formula (1) to the copolymer main-chain compound through a coupling reaction. Examples thereof include a coupling reaction with a halogen element and a hydroxyl group, a coupling reaction with a halogen element and an amino group, and the like. One of a halogen element and a hydroxyl group, or one of a halogen element and an amino group, is introduced into the copolymer main-chain compound, whereas the other is introduced in the side chains. Through a coupling reaction with a halogen element and a hydroxyl group, a copolymer compound is obtained in which the main chain of the copolymer compound and side chains including a structure represented by general formula (1) are bound through ester linkages. Moreover, through a coupling reaction of a halogen element and an amino group, a copolymer compound is obtained in which the main chain of the copolymer compound and side chains including a structure represented by general formula (1) are bound through amide linkages.

Moreover, side chains including a structure represented by general formula (1) may be introduced to a copolymer main-chain compound by allowing dehydration condensation between hydroxyl groups. In this case, a copolymer compound is obtained in which the main chain of the copolymer compound and the side chains including a structure represented by general formula (1) are bound through ether linkages. Specific instances will be illustrated in Examples below.

As a compound that can be used as the electrode active material 13, a first polymer compound having tetrachalcogenofulvalene structures in repetition units of the main chain, and a second polymer compound which is a copolymer between first units having tetrachalcogenofulvalene structures in side chains and second units not having tetrachalcogenofulvalene structures in side chains have been described above. In these two kinds of polymer compounds, the tetrachalcogenofulvalene structure exhibits oxidation-reduction reactions independently without being so much dependent on the polymeric structure. Therefore, the oxidation-reduction potential of the tetrachalcogenofulvalene structure is generally equal between these two kinds of polymer compounds. Therefore, the electrode of the present embodiment only needs to include at least one of the first polymer compound and the second polymer compound, as the electrode active material 13, and may use both of these.

Next, the structural feature of the active material layer 12, which is one other feature of the present invention, will be described. As shown in FIG. 1, in the active material layer 12, the electrode active material 13, which is a copolymer compound with a side chain including a structure represented by general formula (1), covers at least a portion of the surface of the electrical conductivity assistant 14.

Figure 2:
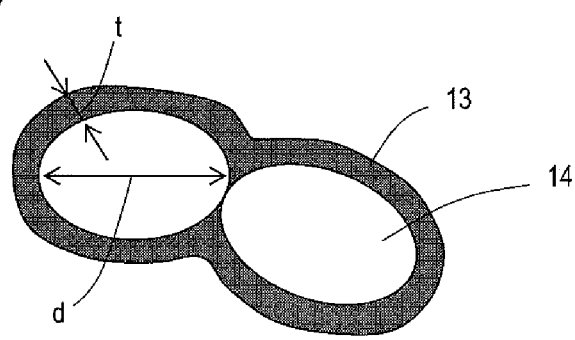
FIG. 2 A schematic cross-sectional view showing, on an enlarged scale, a portion of an active material layer of the electrode shown in FIG. 1.

FIG. 2 is a schematic view showing, on an enlarged scale, a portion of the active material layer 12. As shown in FIG. 1 and FIG. 2, in the present embodiment, the electrode active material 13 does not form particles but covers the surface of the electrical conductivity assistant 14. That is, the electrode active material 13 is present in the form of a cover film covering the electrical conductivity assistant 14. Thus, in the present specification, the electrode active material 13 covering the surface of the electrical conductivity assistant 14 refers to a state where the electrode active material 13 is present in the form of a continuous body such as to conform to the shape of the surface of the electrical conductivity assistant 14. While a state where the electrode active material 13 forms a continuous body having a uniform thickness on the surface of the electrical conductivity assistant 14 is preferred, the thickness may have some distribution. Where the electrode active material 13 is dissolved in a solvent, mixed with the electrical conductivity assistant 14, and allowed to dry, so that the electrode active material 13 covers the surface of the electrical conductivity assistant 14, as will be described below, part of the electrode active material 13 may not be dissolved, and particle-shaped bumps may locally occur in the film of the electrode active material 13. In such a case, the particle-shaped bumps are preferably smaller than 100 nm.

While the electrical conductivity assistant 14 is shown in FIG. 1 and FIG. 2 to have an elliptical cross section, the shape of the electrical conductivity assistant 14 is not limited to elliptical but may be any one of various shapes of electrical conductivity assistants commonly used as an electrical conductivity assistant of an electrode material. The particle shape formed by the electrical conductivity assistant 14 does not have to be completely covered by the electrode active material 13, and there may be some areas where particles of the electrical conductivity assistant 14 are in contact with one another.

The thickness of the electrode active material 13 covering the electrical conductivity assistant 14 is preferably small, as compared with the size of the electrical conductivity assistant 14. That is, the thickness t of the electrode active material 13 preferably satisfies t<d, where d denotes the average particle diameter of the electrical conductivity assistant 14. More specifically, it is preferable that the average particle diameter of the electrical conductivity assistant 14 is about several tens of nm to several μm, and the thickness t of the electrode active material 13 is about several nm to several hundreds of nm. Moreover, the active material layer 12 preferably has a gap 12a between the electrode active materials 13 covering the electrical conductivity assistant 14 as shown in FIG. 1. Where the thickness t of the electrode active material 13 is smaller than several nm, the proportion accounted for by the electrolytic material 13 in the active material layer is small, whereby the charge capacity of the electrode 101 is small. If the thickness t of the electrode active material 13 exceeds several hundreds of nm, the traveling distance of the anion in the electrode active material will also be long, as will be described below, thereby increasing the resistive component of the electrode. Where the average particle diameter of the electrical conductivity assistant 14 is less than several tens of nm or where it is greater than several μm, it may be difficult to obtain the electrode active material 13 having such a thickness t as described above.

Since the active material layer 12 has such a structure, the contact area between the electrode active material 13 and the electrical conductivity assistant 14 increases, whereby electrons travel smoothly through oxidation-reductions between the electrical conductivity assistant 14 and the electrode active material 13. The oxidation-reduction reactions in the electrode active material 13 are also more likely to occur uniformly.

Where the electrode active material 13 undergoes oxidation-reduction reactions, the anion in the electrolyte solution needs to travel from the surface of the electrode active material 13 that is in contact with the electrolyte solution to the vicinity of the structure represented by general formula (1) described above which is the oxidation-reduction site inside the electrode active material 13. The inside of the electrode active material 13 is where it is more difficult for the anion to travel than in the electrolyte solution, and becomes a resistive component. Therefore, the shorter the traveling distance of the anion, the faster the oxidation-reduction reactions proceed.

According to the present embodiment, since the electrode active material 13 is present in the form of a thin film in the active material layer 12, the traveling distance from the surface of the electrode active material 13 that is in contact with the electrolyte solution to the inside is short. Moreover, as the gap 12a is preferably present in the active material layer 12, the electrolyte solution enters the gap 12a, thereby expanding the area of the electrode active material 13 that is in contact with the electrolyte solution. Therefore, the anion more easily arrives at the vicinity of the structure represented by general formula (1) which is the oxidation-reduction site present inside the electrode active material 13, whereby it is possible to reduce the resistive component in the electrode 101.

The active material layer 12 having such a structure can be produced by utilizing a feature that the electrode active material 13 which is a copolymer compound having a side chain including a structure represented by general formula (1) has a high affinity with a particular aprotic solvent.

Specifically, it is possible to form the active material layer 12 having a structure shown in FIG. 1 in which the surface of the electrical conductivity assistant 14 is covered by a thin film of the electrode active material 13 by dissolving a copolymer compound having a side chain including a structure represented by general formula (1) in a particular aprotic solvent to obtain a solution, applying a mixture obtained by mixing this solution with an electrical conductivity assistant on the electrically conductive support 11, and removing the aprotic solvent.

Figure 3:
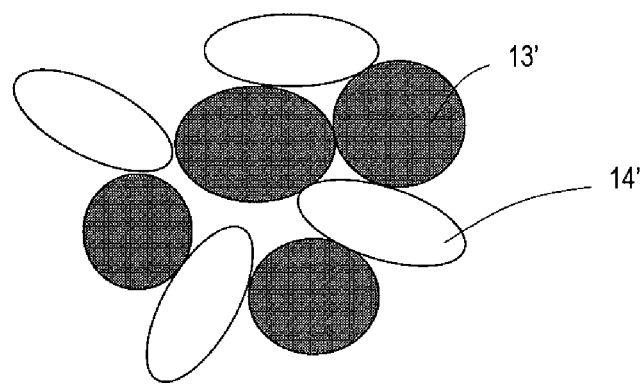
FIG. 3 A schematic cross-sectional view showing a structure of a conventional electrode.

It has been found through a study of the inventors of the present invention that a polymer having TTF disclosed in Patent Document No. 4 in the side chain has a low affinity with an organic solvent and does not dissolve therein. Patent Document No. 4 discloses producing a slurry by mixing together a polymer having TTF in the side chain, an electrical conductivity assistant and an organic solvent, applying the slurry on a current collector, and then moving the organic solvent, thereby producing an electrode. With an electrode thus obtained, however, since the polymer having TTF in the side chain does not dissolve in an organic solvent, it is believed that an electrode active material 13' which is a polymer having TTF in the side chain forms particles of about several μm in the obtained electrode as shown in FIG. 3. Therefore, it is believed that particles formed by an electrical conductivity assistant 14' and particles of the electrode active material 13' are independent of each other, and are present on current collector in the form of mixed particles.

It is believed that with such a structure, particles of the electrode active material 13' are in contact with the electrical conductivity assistant 14' only at points or over small areas, whereby electrons cannot travel smoothly through oxidation-reduction between the electrical conductivity assistant 14' and the electrode active material 13' as described above, and the oxidation-reduction reactions in the electrode active material 13' are likely to be non-uniform. Moreover, it is believed that since the anion of the electrolyte solution is unlikely to travel as far as to the inside of particles of the electrode active material 13', and the traveling distance of the anion inside the electrode active material is also longer, the resistive component of the electrode increases.

The electrical conductivity assistant 14 may be any of various electron conductive materials that do not undergo chemical changes at the electrode reaction potential. For example, where the electrode of the present embodiment is used as a positive electrode of a lithium secondary battery, carbon materials such as carbon black, graphites and carbon fibers, metal fibers, metal powders, electrically conductive whiskers, electrically conductive metal oxide, etc., may be used, either alone or as a mixture thereof, as the electrical conductivity assistant.

From a standpoint of being able to increase the energy density per weight, it is preferable to use a granular carbon material such as carbon black or a carbon fiber. Moreover, in order to increase the contact area, it is desirable to use a granular carbon or a carbon fiber having a large specific surface.

From a standpoint of being able to increase the energy density per weight of the electrode, it is preferable that the weight percentage of the electrode active material 13 in the active material layer 12 is 30 wt % or more. The greater the weight percentage of the electrode active material 13, the greater the charge capacity of the electricity storage device using the electrode 101. However, if the weight percentage becomes excessive, the proportion of the electrical conductivity assistant becomes smaller, and the thickness of the electrode active material 13 covering the electrical conductivity assistant becomes larger. Since the electrode active material 13 has a lower electron conductivity than the electrical conductivity assistant, if the electrode active material 13 covering the electrical conductivity assistant becomes thicker, it is no longer sufficiently ensure the electron conductivity in the electrode active material 13 covering the electrical conductivity assistant, thereby making it difficult to uniformly charge-discharge the entire active material layer. For example, in an electrode in which acetylene black is used as the electrical conductivity assistant and the active material percentage is 80 wt %, if the electrode active material 13 uniformly covers the surface of the electrical conductivity assistant, the thickness of the electrode active material 13 is about 100 nm, and high-speed charging-discharging will be difficult. That is, it becomes difficult to realize an electricity storage device with a high capacity and a high output power. Thus, the weight percentage of the active material in the substance layer 12 is 30 wt % or more and 80 wt % or less. Moreover, it is 50 wt % or more and 70 wt % or less.

The active material layer 12 may include a binder agent. The binder agent may be either a thermoplastic resin or a thermosetting resin. For example, polyolefin resins such as polyethylene and polypropylene, fluorine-type resins such as polytetrafluoroethylene (PTFE), polyvinylidene fluoride (PVDF), and hexafluoropropylene (HFP), copolymer resins thereof, styrene-butadiene rubber, polyacrylic acid or a copolymer resin thereof, and the like are usable as binder agents. Where an electrode active material is dissolved in a particular organic solvent and allowed to cover an electrical conductivity assistant, it is desirable that the electrode active material and the binder agent are dissolved in the same organic solvent, and fluorine-type resins are preferable, in order to improve the uniformity of the film. Where the active material layer 12 includes a binder agent, the binder agent covers the surface of the electrical conductivity assistant 14, together with the electrode active material 13. On the surface of the electrical conductivity assistant 14, the electrode active material 13 and the binder agent are in a mixed state.

The active material layer 12 having a structure described above of the present embodiment is obtained by, for example, producing a mixture including an aprotic solvent with an electrode active material dissolved therein and an electrical conductivity assistant, and removing the aprotic solvent from the resultant mixture. Hereinafter, an embodiment of a method for manufacturing an electrode of the present embodiment will be described in detail.

A method for manufacturing an electrode of the present embodiment includes a step of preparing a mixture including an aprotic solvent with an electrode active material dissolved therein and an electrical conductivity assistant, and a step of removing the aprotic solvent from the mixture.

The mixture may be produced by first dissolving the electrode active material 13 in an aprotic solvent and then mixing the aprotic solvent with the electrical conductivity assistant 14, or by dissolving the electrode active material in a mixture obtained by mixing together an aprotic solvent and the electrical conductivity assistant 14. The mixture may include a binder agent. The binder agent may be one described above. The electrical conductivity assistant 14 and the binder agent may not be dissolved in an aprotic solvent. Where the mixture includes a binder agent, the order in which they are mixed together is arbitrary. It is desirable that the electrode active material 13 is dissolved in an aprotic solvent and is uniformly dispersed therein. Therefore, the following order is preferable: first dissolve the electrode active material 13 in an aprotic solvent, and then mix the electrical conductivity assistant 14 and the binder agent together.

There is no particular limitation as to the aprotic solvent. One that has a high affinity with the electrode active material described above is preferable. Specifically, aprotic solvents such as N-methylpyrrolidone (NMP), 1,3-dimethyl-2-imidazolidinone (DMI), tetrahydrofuran (THF), toluene, dimethylformamide (DMF), dimethylacetamide (DMAc), dimethyl sulfoxide (DMSO), and chloroform are preferable, and NMP, DMI and THF are more preferable.

The mixture can be produced by using a mixing method commonly used in the pertinent field if the electrode active material is dissolved in an aprotic solvent. For example, the dissolution can be done by using a mixer such as a planetary mixer.

Next, the aprotic solvent is removed from the resultant mixture. There is no particular limitation as to the method for removing the aprotic solvent, and any method commonly used in the pertinent field may be used. Examples include a solvent removal in which the resultant mixture is applied onto a base material such as an electrically conductive support and then allowed to dry at a high temperature using a drying furnace, or the like. Where the produced mixture is applied onto a base material to remove the solvent, the application method may be any method commonly used in the pertinent field. Specifically, a mixture can be applied onto the electrically conductive support 11 using spin coating, screen printing method, a coater, or the like. Other examples include a method, such as spray drying, in which the resultant mixture is dispersed and allowed to dry at a high temperature to as to remove the aprotic polar solvent.

Preferably, the resultant mixture is applied onto an electrically conductive support, and the solvent is removed by drying at a high temperature using a drying furnace, or the like. Then, the layer, resulting after the drying, which includes the electrically conductive support, the electrode active material formed on the electrically conductive support, and a conductive agent, can be used as an electrode of an electricity storage device.

Where an electrically non-conductive support is used as the base material, the layer resulting from the drying which includes the electrode active material and the conductive agent is supported on the electrically conductive support. Similarly, also where the solvent removal is done by spray drying, and the like, it is supported on the electrically conductive support. Thus, there is obtained an electrode for an electricity storage device.

Thus, the electrode 101 is produced, where the active material layer 12, in which the electrode active material 13 is not forming particles and is covering the surface of the electrical conductivity assistant 14, is formed on the electrically conductive support 11.

With the electrode of the present embodiment, since the electrode active material is covering the electrical conductivity assistant, the contact area between the electrode active material and the electrical conductivity assistant is large, thereby allowing for smooth traveling of electrons between the electrode active material and the electrical conductivity assistant. Since the electrode active material is present as a thin film on the surface of the electrical conductivity assistant, the traveling distance of the counter-ion from the electrolyte solution to oxidation-reduction reaction portions in the electrode active material becomes shorter, thereby allowing for a reduction in the resistance due to diffusion of the counter-ion. As a result, it is possible to reduce the resistance in the electrode during oxidation-reduction reactions.

Figure 4:
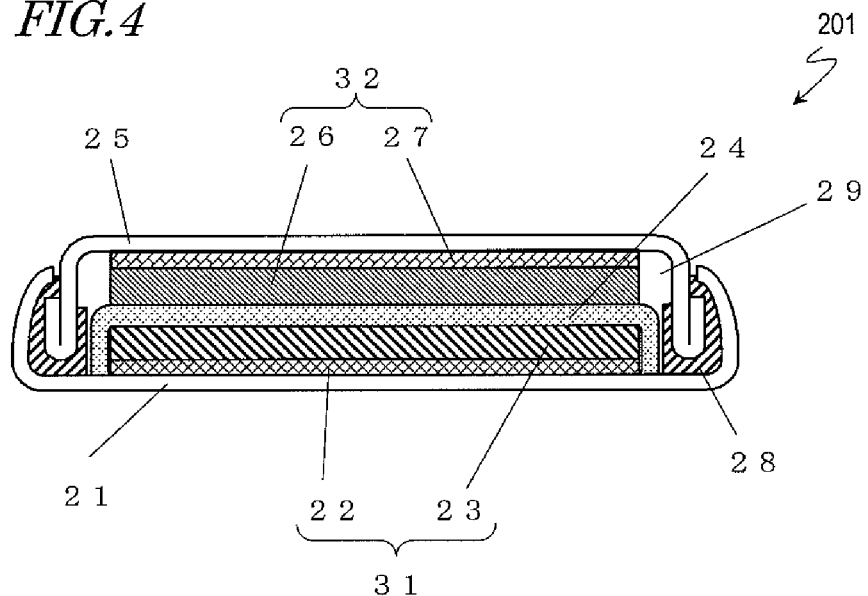
FIG. 4 A schematic cross-sectional view showing the first embodiment of an electricity storage device according to the present invention.

Next, an electricity storage device using an electrode of the present invention as a positive electrode will be described in detail. FIG. 4 is a cross-sectional view schematically showing a coin-type lithium secondary battery which is an embodiment of the electricity storage device according to the present invention. A coin-type lithium secondary battery shown in FIG. 4 includes a positive electrode 31, a negative electrode 32, and a separator 24. The positive electrode 31 includes a positive current collector 22 and a positive-electrode active material layer 23, and the electrode 101 shown in FIG. 1 may be used. The negative electrode 32 includes a negative-electrode active material layer 26 and a negative current collector 27, and the negative-electrode active material layer 26 is supported by the negative current collector 27.

The negative-electrode active material layer 26 contains a negative-electrode active material. As the negative-electrode active material, any known negative-electrode active material that reversibly occludes and releases lithium is used. For example, materials capable of reversibly occluding and releasing lithium, e.g., graphite materials such as natural graphite and artificial graphite, amorphous carbon materials, lithium metal, lithium-containing composite nitride, lithium-containing titanium oxide, silicon, silicon-containing alloys, silicon oxide, tin, tin-containing alloys, and tin oxide, or, carbon materials having an electric double layer capacity such as activated carbon, organic compound materials having a $\pi$ electron conjugated cloud, and the like can be used. These negative electrode materials may each be used by itself, or a plurality of negative electrode materials may be mixed for use. For the negative current collector 27, any material known as a current collector of a negative electrode for a lithium ion secondary battery, e.g., copper, nickel, and stainless steel, can be used. Similarly to the positive current collector 22, the negative current collector 27 can also be used in forms such as a metal foil, mesh or porous material, and a resin film containing an electrically conductive filler composed of any such metal.

The negative-electrode active material layer 26 may contain only a negative-electrode active material, or may contain one or both of an electrical conductivity assistant and a binder agent. The electrical conductivity assistant may be one described above. The binder agent may also be one described above.

The positive electrode 31 and the negative electrode 32 oppose each other with the separator 24 interposed therebetween, such that the positive-electrode active material layer 23 and the negative-electrode active material layer 26 are in contact with the separator 24, whereby an electrode group is constituted. The separator 24 is a resin layer composed of a resin which does not have electron conductivity, and is a microporous film having a large ion transmission and a predetermined mechanical strength and electrical insulation. From a standpoint of providing an excellent organic solvent-resistant ability and an excellent hydrophobicity, a polyolefin resin in which polypropylene, polyethylene, or the like is used by itself or in which these are combined is preferable. Instead of the separator 24, a resin layer having electron conductivity which swells by containing an electrolyte solution and functions as a gel electrolyte may be provided.

The electrode group is accommodated in the internal space of a case 21. In the internal space of the case 21, an electrolyte solution 29 is injected, so that the positive electrode 31, the negative electrode 32, and the separator 24 are impregnated with the electrolyte solution 29. Since the separator 24 includes minute spaces for retaining the electrolyte solution 29, the electrolyte solution 29 is retained in the minute spaces, such that the electrolyte solution 29 is interposed between the positive electrode 31 and the negative electrode 32. An opening of a case 21 is sealed by a sealing plate 25, using a gasket 28.

The electrolyte solution 29 is composed of a nonaqueous solvent and a supporting salt which dissolves in the nonaqueous solvent. As the nonaqueous solvent, known solvents which can be used for nonaqueous secondary batteries and nonaqueous-type electric double layer capacitors are usable. Specifically, solvents containing a cyclic carbonic acid ester are suitably used. This is because cyclic carbonic acid esters have a very high relative dielectric constant, as is typified by ethylene carbonate and propylene carbonate. Among cyclic carbonic acid esters, propylene carbonate is preferable. This is because it has a freezing point of −49° C., which is lower than that of ethylene carbonate, thus allowing the electricity storage device to operate at low temperatures.

Moreover, solvents containing cyclic esters are also suitably used. The reason is that cyclic esters have a very high relative dielectric constant, as is typified by γ-butyrolactone; therefore, when any such solvent is contained as a component, the entire nonaqueous solvent of the electrolyte solution 29 can have a very high dielectric constant.

As the nonaqueous solvent, any one of these may be used by itself, or a plurality of solvents may be mixed for use. Other solvents that are usable as the solvent include acyclic carbonic acid esters, acyclic esters, cyclic or acyclic ethers, and the like. Specifically, nonaqueous solvents such as dimethyl carbonate, diethyl carbonate, methyl ethyl carbonate, dioxolane, sulfolane, and acetonitrile can be used. As the nonaqueous solvent of the electrolyte solution enters the positive-electrode active material layer 23 of the positive electrode so that the positive-electrode active material layer 23 is swollen with the nonaqueous solvent, whereby it is possible to reduce the reaction resistance in oxidation-reduction reactions at the positive electrode. Note however that if the solubility of the positive-electrode active material in a nonaqueous solvent is too high, the positive-electrode active material layer 23 may possibly elute. Therefore, it is preferable that the nonaqueous solvent is one that does not elute the electrode active material 13 which is used in the positive-electrode active material layer 23.

As the supporting salt, a supporting salt composed of the following cations and anions can be used. As cations, for example, alkali metal cations such as lithium, sodium, and potassium, alkaline-earth metal cations such as magnesium, quaternary ammonium cations such as tetraethylammonium and 1,3-ethylmethylimidazolium, and the like can be used. One of the cations may be used solely, or two or more of the cations may be used in combination. Among these, lithium cations, quaternary ammonium cations, and the like, are preferable.

As anions, for example, halide anions, perchlorate anions, trifluoromethanesulfonate anions, boron tetrafluoride anions, hexafluorophosphate anions, trifluoromethanesulfonate anions, bis(trifluoromethanesulfonyl)imide anions, bis(perfluoroethylsulfonyl)imide anions, and the like can be used. One of the anions may be used solely, or two or more of the anions may be used in combination. Specific examples of supporting salts include, for example, lithium fluoride, lithium chloride, lithium perchlorate, lithium trifluoromethanesulfonate, lithium boron tetrafluoride, bistrifluoromethylsulfonylimide lithium, lithium thiocyanate, magnesium perchlorate, magnesium trifluoromethanesulfonate, sodium boron tetrafluoride, and the like.

An electricity storage device using an electrode of the present invention not only provides a high capacity and excellent cyclic characteristics, but also is an electricity storage device with a high output power. Therefore, an electricity storage device using an electrode of the present invention is suitably used for vehicles such as hybrid vehicles and for portable electronic devices. Vehicles and portable electronic devices incorporating the electricity storage device of the present invention are characterized in that the electricity storage device has a light weight, and that they have a large output power and excellent cyclic characteristics. Therefore, a light weight is particularly achieved which has been difficult to achieve with any electricity storage device employing a conventional inorganic compound in terms of weight.

The present embodiment has been described in an embodiment where an electrode and an electricity storage device of the present invention are used for a lithium secondary battery. However, the electrode and the electricity storage device of the present invention can be used in various energy storage devices, sensors, etc., utilizing electrochemical storing of electric charge. Specifically, electric double layer capacitors may be provided, in which an electrode of the present invention is used as the positive electrode, and combined with an activated carbon negative electrode. They can also be used in an electrochemical capacitor, or the like, other than a secondary battery, such as a lithium ion capacitor combined with a negative electrode capable of occluding and releasing lithium such as lithium-occluding graphite.

They can also suitably be used in various electrochemical elements and electrodes used in electrochemical elements. As an example of an electrochemical element, a polymer actuator can be provided by using, as the electrolyte, a polymer gel electrolyte that expands and shrinks in response to charging and discharging. Since the electrode of the present invention changes its color in response to charging and discharging, an electrochromic display element can be provided by using an electrically conductive glass as the electrically conductive support, while using a transparent material such as a film or a glass as part of the exterior.

Where an electrode of the present invention is used as an electrochemical element, it is preferable that a salt of quaternary ammonium salts and anions is included as a supporting salt of the electrolyte solution.

(Second Embodiment)

Hereinafter, a second embodiment of an electrode of the present invention and an electricity storage device in which the same is used will be described.

Figure 5:
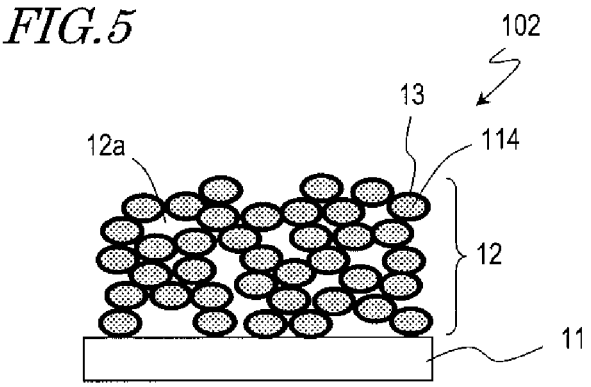
FIG. 5 A schematic cross-sectional view showing the second embodiment of an electrode according to the present invention.

FIG. 5 schematically shows the cross-sectional structure of an electrode 102 of the present embodiment. The electrode 102 includes an electrically conductive support 11, and an active material layer 12 provided on the electrically conductive support 11.

The electrically conductive support 11 is formed by an electrically-conductive, low-resistance substance, e.g., a material used as a current collector of a positive electrode or a negative electrode of a secondary battery. Specifically, the electrically conductive support 11 is formed by a metal foil, mesh or porous material composed of aluminum, gold, silver, a stainless steel, an aluminum alloy, or the like, or a resin film which contains an electrically conductive filler composed of any such metal.

The active material layer 12 includes an electrode active material 13 and an electrical conductivity assistant 114. The present embodiment is different from the first embodiment in that in the active material layer 12, the electrode active material 13 does not form particles and covers at least a portion of the surface of the electrical conductivity assistant 114, and the electrical conductivity assistant 114 is a carbon black having a specific surface of 800 $m^2/g$ or more.

As the electrode active material 13, the first polymer compound or the second polymer compound described above in the first embodiment, i.e., a polymer compound including the tetrachalcogenofulvalene structure represented by general formula (1) in the main chain or the side chain, is used.

Figure 6:
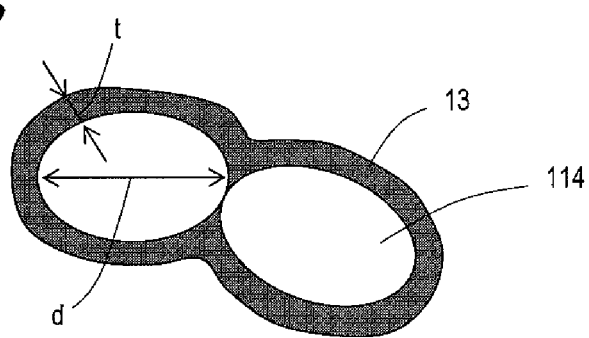
FIG. 6 A schematic cross-sectional view showing, on an enlarged scale, a portion of an active material layer of the electrode shown in FIG. 5.

As described above in the first embodiment, in the active material layer 12, the electrode active material 13 which is a polymer compound including a structure represented by general formula (1) covers at least a portion of the surface of the electrical conductivity assistant 114. FIG. 6 is a schematic view showing, on an enlarged scale, a portion of the active material layer 12. As shown in FIG. 5 and FIG. 6, as in the first embodiment, the electrode active material 13 does not form particles but covers the surface of the electrical conductivity assistant 114. That is, the electrode active material 13 is present in the form of a cover film covering the electrical conductivity assistant 114. While the electrical conductivity assistant 114 is shown in FIG. 5 and FIG. 6 to have an elliptical cross section, the cross section of the electrical conductivity assistant 114 is not limited to elliptical but may be any one of various shapes of electrical conductivity assistants commonly used as an electrical conductivity assistant of an electrode material. The particle shape formed by the electrical conductivity assistant 114 does not have to be completely covered by the electrode active material 13, and there may be some areas where particles of the electrical conductivity assistant 114 are in contact with one another.

The thickness of the electrode active material 13 covering the electrical conductivity assistant 114 is preferably small, as compared with the size of the electrical conductivity assistant 114. That is, the thickness t of the electrode active material 13 preferably satisfies t<d, where d denotes the average particle diameter of the electrical conductivity assistant 114. More specifically, it is preferable that the average particle diameter of the electrical conductivity assistant 114 is about several tens of nm to several hundreds of nm, and the thickness t of the electrode active material 13 is about several nm to several hundreds of nm. Moreover, the active material layer 12 preferably has a gap 12a between the electrode active materials 13 covering the electrical conductivity assistant 114 as shown in FIG. 5. Where the thickness t of the electrode active material 13 is smaller than several nm, the proportion accounted for by the electrolytic material 13 in the active material layer is small, whereby the charge capacity of the electrode 102 is small. If the thickness t of the electrode active material 13 exceeds several hundreds of nm, the traveling distance of the anion in the electrode active material will also be long, as will be described below, thereby increasing the resistive component of the electrode. Where the average particle diameter of the electrical conductivity assistant 114 is less than several tens of nm or where it is greater than several μm, it may be difficult to obtain the electrode active material 13 having such a thickness t as described above.

Since the active material layer 12 has such a structure, the contact area between the electrode active material 13 and the electrical conductivity assistant 114 increases, whereby electrons travel smoothly through oxidation-reductions between the electrical conductivity assistant 114 and the electrode active material 13. The oxidation-reduction reactions in the electrode active material 13 are also more likely to occur uniformly.

Where the electrode active material 13 undergoes oxidation-reduction reactions, the anion in the electrolyte solution needs to travel from the surface of the electrode active material 13 that is in contact with the electrolyte solution to the vicinity of the structure represented by general formula (1) described above which is the oxidation-reduction site inside the electrode active material 13. The inside of the electrode active material 13 is where it is more difficult for the anion to travel than in the electrolyte solution, and becomes a resistive component. Therefore, the shorter the traveling distance of the anion, the faster the oxidation-reduction reactions proceed.

According to the present embodiment, since the electrode active material 13 is present in the form of a thin film in the active material layer 12, the traveling distance from the surface of the electrode active material 13 that is in contact with the electrolyte solution to the inside is short. Moreover, as the gap 12a is preferably present in the active material layer 12, the electrolyte solution enters the gap 12a, thereby expanding the area of the electrode active material 13 that is in contact with the electrolyte solution. Therefore, the anion more easily arrives at the vicinity of the structure represented by general formula (1) which is the oxidation-reduction site present inside the electrode active material 13, whereby it is possible to reduce the resistive component in the electrode 102.

The active material layer 12 having such a structure can be produced by utilizing a feature that the electrode active material 13 which is a polymer compound including a structure represented by general formula (1) has a high affinity with a particular aprotic solvent.

Specifically, it is possible to form the active material layer 12 having a structure shown in FIG. 5 in which the surface of the electrical conductivity assistant 114 is covered by a thin film of the electrode active material 13 by a manufacturing method including the steps of: dissolving a copolymer compound having a side chain including a structure represented by general formula (1) in a particular aprotic solvent to obtain a solution; producing a mixture obtained by mixing this solution with an electrical conductivity assistant; and removing the aprotic solvent.

The inventors of the present invention have found that in order to realize a structure in which the electrode active material 13 thinly covers the surface of the electrical conductivity assistant 114 as described above, it is preferable that the electrical conductivity assistant 114 is a carbon black having a specific surface of 800 $m^2/g$ or more, whereby it is possible to realize an electrode for an electricity storage device with a high output power.

Generally, in order to cover the surface of an electrical conductivity assistant with an electrode active material to obtain the effect of reducing the reaction resistance, or the like, by a method described above, it is believed to be suitable to use a carbon material having a large specific surface such as activated carbon. The reason is that it is believed that the electrical conductivity assistant can be covered with a thinner cover film of an electrode active material as the specific surface is larger. Moreover, various forms of carbon materials, such as a carbon black and a carbon fiber, are known as carbon materials to be used as electrical conductivity assistants.

However, it has been found through a detailed study of the inventors of the present invention that with materials with large specific surfaces having minute pores, such as some activated carbons, it is believed that there are cases where the size of the pores is too small so that the solvent with the electrode active material 13 dissolved therein does not enter the pores, and the surface of the pores of the electrical conductivity assistant cannot be covered uniformly by the electrode active material 13.

Where an electricity storage device is produced by using a polymer compound including a structure represented by general formula (1), the polymer compound preferably has a large molecular weight so that it does not elute into the electrolyte solution. For example, it is preferable that the molecular weight, calculated in equivalent polystyrene, is 10000 or more. When such a polymer compound is dissolved in an organic solvent, the organic solvent has a certain viscosity. Therefore, where a carbon material of a larger specific surface having pores on the order of nanometers, as is typified by activated carbon, is used, it is believed that an organic solvent including a polymer compound dissolved therein does not reach the deepest portion of the pores, and that the large specific surface, characteristic of an electrical conductivity assistant, cannot be utilized sufficiently, failing to obtain the effects described above.

The inventors of the present invention have found that when a carbon black, which is a granular carbon material, is used, an organic solvent including an electrode active material dissolved therein can reach every place across the large surface area to provide a cover. Carbon black is minute particles of amorphous carbon manufactured while being industrially controlled, and normally has an average particle diameter of about several tens of nm to several hundreds of nm. It has been found through a detailed study that particularly when the specific surface of the carbon black is 800 $m^2/g$ or more, the thickness of the layer including the electrode active material 13 on the surface of the electrical conductivity assistant 114 is sufficiently small, whereby the effects described above will be seen in a pronounced manner. More preferably, the average particle diameter of the carbon black is 50 nm or less. This is because if the average particle diameter of the carbon black is greater than 50 nm, the thickness t of the electrode active material on the electrical conductivity assistant will be too thick, and it will be no longer possible to obtain a high output power.

For carbon blacks that can be used as the electrical conductivity assistant 114, there is no particular limitation as to the manufacturing method and the type of the carbon black so long as it is a carbon black having a specific surface of 800 $m^2/g$ or more. Furnace black by a furnace method, channel black by a channel method, acetylene black by an acetylene method, Ketjen black, and the like, can be used. The specific surface of a carbon black can be measured by a gas adsorption method such as the BET method.

It has also been found through a study that a polymer having TTF in the side chain disclosed in Patent Document No. 4 has a low affinity with an organic solvent and does not dissolve therein. Patent Document No. 4 discloses producing a slurry by mixing together a polymer having TTF in the side chain, an electrical conductivity assistant and an organic solvent, applying the slurry on a current collector, and then moving the organic solvent, thereby producing an electrode.

Figure 7:
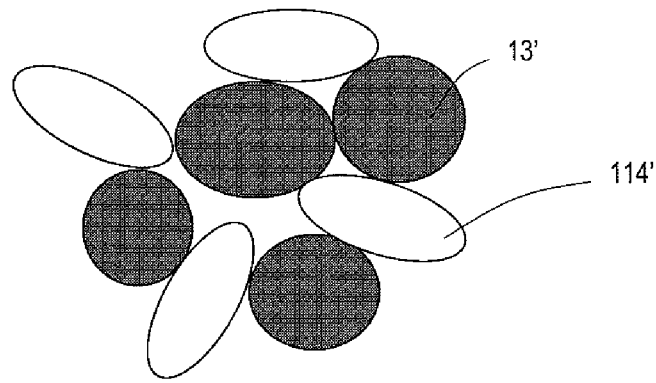
FIG. 7 A schematic cross-sectional view showing a structure of a conventional electrode.

With an electrode thus obtained, however, since the polymer having TTF in the side chain does not dissolve in an organic solvent, it is believed that the electrode active material 13' which is a polymer having TTF in the side chain forms particles of about several μm in the obtained electrode as shown in FIG. 7. Therefore, it is believed that particles formed by an electrical conductivity assistant 114' and particles of the electrode active material 13' are independent of each other, and are present on current collector in the form of mixed particles.

It is believed that with such a structure, particles of the electrode active material 13' are in contact with the electrical conductivity assistant 114' only at points or over small areas, whereby electrons cannot travel smoothly through oxidation-reduction between the electrical conductivity assistant 114' and the electrode active material 13' as described above, and the oxidation-reduction reactions in the electrode active material 13' are likely to be non-uniform. Moreover, it is believed that since the anion of the electrolyte solution is unlikely to travel as far as to the inside of particles of the electrode active material 13', and the traveling distance of the anion inside the electrode active material is also longer, the resistive component of the electrode increases.

The active material layer 12 may include a binder agent. The binder agent may be either a thermoplastic resin or a thermosetting resin. For example, polyolefin resins such as polyethylene and polypropylene, fluorine-type resins such as polytetrafluoroethylene (PTFE), polyvinylidene fluoride (PVDF), and hexafluoropropylene (HFP), copolymer resins thereof, styrene-butadiene rubber, polyacrylic acid or a copolymer resin thereof, and the like are usable as binder agents. Where an electrode active material is dissolved in a particular organic solvent and allowed to cover an electrical conductivity assistant, it is desirable that the electrode active material and the binder agent are dissolved in the same organic solvent, and fluorine-type resins are preferable, in order to improve the uniformity of the film. Where the active material layer 12 includes a binder agent, the binder agent covers the surface of the electrical conductivity assistant 114, together with the electrode active material 13. On the surface of the electrical conductivity assistant 114, the electrode active material 13 and the binder agent are in the form of a mixed mixture.

The active material layer 12 having a structure described above of the present embodiment is obtained by, for example, producing a mixture including an aprotic solvent with an electrode active material dissolved therein and an electrical conductivity assistant, and removing the aprotic solvent. Hereinafter, an embodiment of a method for manufacturing an electrode of the present embodiment will be described in detail.

A method for manufacturing an electrode of the present embodiment includes a step of preparing a mixture including an aprotic solvent with an electrode active material dissolved therein and an electrical conductivity assistant, and a step of removing the aprotic solvent from the mixture to be applied.

The mixture may be produced by first dissolving the electrode active material 13 in an aprotic solvent and then mixing the aprotic solvent with the electrical conductivity assistant 114, or by dissolving the electrode active material in a mixture obtained by mixing together an aprotic solvent and the electrical conductivity assistant. The mixture may include a binder agent. The binder agent may be one described above. The electrical conductivity assistant 114 and the binder agent may not be dissolved in an aprotic solvent. Where the mixture includes a binder agent, the order in which they are mixed together is arbitrary. It is desirable that the electrode active material is dissolved in an aprotic solvent and is uniformly dispersed therein. Therefore, the following order is preferable: first dissolve the electrode active material in an aprotic solvent, and then mix the electrical conductivity assistant and the binder agent together.

There is no particular limitation as to the aprotic solvent. One that has a high affinity with the electrode active material described above is preferable. Specifically, aprotic solvents such as N-methylpyrrolidone (NMP), 1,3-dimethyl-2-imidazolidinone (DMI), tetrahydrofuran (THF), toluene, chloroform, dimethylformamide (DMF), dimethylacetamide (DMAc), and dimethyl sulfoxide (DMSO) are preferable, and NMP, DMI and THF are more preferable.

The mixture can be produced by using a mixing method commonly used in the pertinent field if the electrode active material is dissolved in an aprotic solvent. For example, the dissolution can be done by using a mixer such as a planetary mixer.

Next, the aprotic solvent is removed from the resultant mixture. There is no particular limitation as to the method for removing the aprotic solvent, and any method commonly used in the pertinent field may be used. Examples include a solvent removal in which the resultant mixture is applied onto a base material such as an electrically conductive support and then allowed to dry at a high temperature using a drying furnace, or the like. Where the produced mixture is applied onto a base material to remove the solvent, the application method may be any method commonly used in the pertinent field. Specifically, a mixture can be applied onto the electrically conductive support 11 using spin coating, screen printing method, a coater, or the like. Other examples include a method, such as spray drying, in which the resultant mixture is dispersed and allowed to dry at a high temperature to as to remove the aprotic polar solvent.

Preferably, the resultant mixture is applied onto an electrically conductive support, and the solvent is removed by drying at a high temperature using a drying furnace, or the like. Then, the layer, resulting after the drying, which includes the electrically conductive support, the electrode active material formed on the electrically conductive support, and a conductive agent, can be used as an electrode of an electricity storage device.

Where an electrically non-conductive support is used as the base material, the layer resulting from the drying which includes the electrode active material and the conductive agent is supported on the electrically conductive support. Similarly, also where the solvent removal is done by spray drying, and the like, it is supported on the electrically conductive support. Thus, there is obtained an electrode for an electricity storage device.

Thus, the electrode 102 is produced, where the active material layer 12, in which the electrode active material 13 is not forming particles and is covering the surface of the electrical conductivity assistant 114, is formed on the electrically conductive support 11.

With the electrode of the present embodiment, since the electrode active material is covering the electrical conductivity assistant, the contact area between the electrode active material and the electrical conductivity assistant is large, thereby allowing for smooth traveling of electrons between the electrode active material and the electrical conductivity assistant. Since the electrode active material is present as a thin film on the surface of the electrical conductivity assistant, the traveling distance of the counter-ion from the electrolyte solution to oxidation-reduction reaction portions in the electrode active material becomes shorter, thereby allowing for a reduction in the resistance due to diffusion of the counter-ion. As a result, it is possible to reduce the resistance in the electrode during oxidation-reduction reactions. Particularly, since the electrical conductivity assistant is a carbon black having a specific surface of 800 $m^2/g$ or more, the surface area of the electrical conductivity assistant is large, and the electrode active material is covering the electrical conductivity assistant as a thin cover film. Therefore, the effects described above are obtained in a pronounced manner, and it is possible to realize an electrode for an electricity storage device having a high output power.

Figure 8:
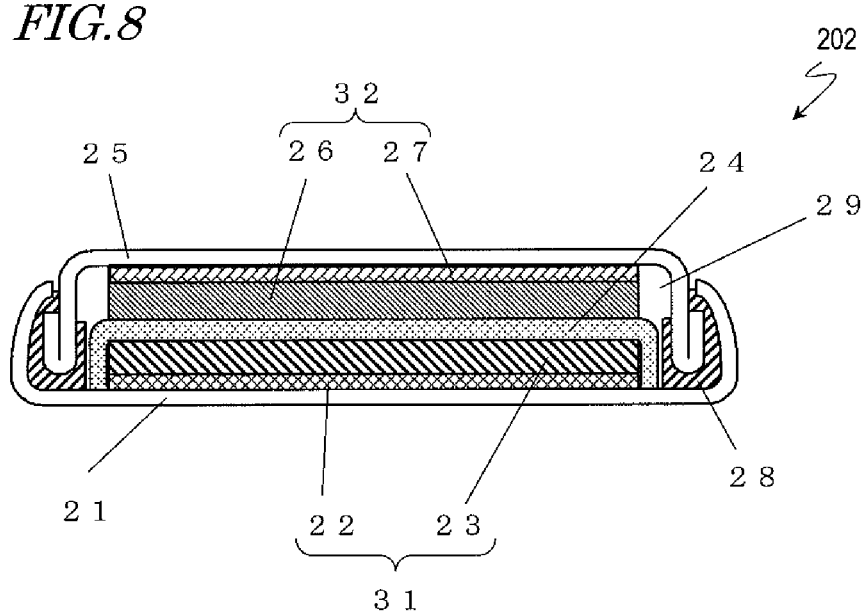
FIG. 8 A schematic cross-sectional view showing the second embodiment of an electricity storage device according to the present invention.

Next, an electricity storage device using an electrode of the present invention as a positive electrode will be described in detail. FIG. 8 is a cross-sectional view schematically showing a coin-type lithium secondary battery 202 which is an embodiment of the electricity storage device according to the present invention. The coin-type lithium secondary battery shown in FIG. 8 includes a positive electrode 31, a negative electrode 32, and a separator 24. The positive electrode 31 includes a positive current collector 22 and a positive-electrode active material layer 23, and the electrode 102 shown in FIG. 5 may be used. The negative electrode 32 includes a negative-electrode active material layer 26 and a negative current collector 27, and the negative-electrode active material layer 26 is supported by the negative current collector 27.

The negative-electrode active material layer 26 contains a negative-electrode active material. As the negative-electrode active material, any known negative-electrode active material that reversibly occludes and releases lithium is used. For example, materials capable of reversibly occluding and releasing lithium, e.g., graphite materials such as natural graphite and artificial graphite, amorphous carbon materials, lithium metal, lithium-containing composite nitride, lithium-containing titanium oxide, silicon, silicon-containing alloys, silicon oxide, tin, tin-containing alloys, and tin oxide, or, carbon materials having an electric double layer capacity such as activated carbon, organic compound materials having a $\pi$ electron conjugated cloud, and the like can be used. These negative electrode materials may each be used by itself, or a plurality of negative electrode materials may be mixed for use. For the negative current collector 27, any material known as a current collector of a negative electrode for a lithium ion secondary battery, e.g., copper, nickel, and stainless steel, can be used. Similarly to the positive current collector 22, the negative current collector 27 can also be used in forms such as a metal foil, mesh or porous material, and a resin film containing an electrically conductive filler composed of any such metal.

The negative-electrode active material layer 26 may contain only a negative-electrode active material, or may contain one or both of an electrical conductivity assistant and a binder agent. The electrical conductivity assistant may be one described above. The binder agent may also be one described above.

The positive electrode 31 and the negative electrode 32 oppose each other with the separator 24 interposed therebetween, such that the positive-electrode active material layer 23 and the negative-electrode active material layer 26 are in contact with the separator 24, whereby an electrode group is constituted. The separator 24 is a resin layer composed of a resin which does not have electron conductivity, and is a microporous film having a large ion transmission and a predetermined mechanical strength and electrical insulation. From a standpoint of providing an excellent organic solvent-resistant ability and an excellent hydrophobicity, a polyolefin resin in which polypropylene, polyethylene, or the like is used by itself or in which these are combined is preferable. Instead of the separator 24, a resin layer having electron conductivity which swells by containing an electrolyte solution and functions as a gel electrolyte may be provided.

The electrode group is accommodated in the internal space of a case 21. In the internal space of the case 21, an electrolyte solution 29 is injected, so that the positive electrode 31, the negative electrode 32, and the separator 24 are impregnated with the electrolyte solution 29. Since the separator 24 includes minute spaces for retaining the electrolyte solution 29, the electrolyte solution 29 is retained in the minute spaces, such that the electrolyte solution 29 is interposed between the positive electrode 31 and the negative electrode 32. An opening of the case 21 is sealed by a sealing plate 25, using a gasket 28.

The electrolyte solution 29 is composed of a nonaqueous solvent and a supporting salt which dissolves in the nonaqueous solvent. As the nonaqueous solvent, known solvents which can be used for nonaqueous secondary batteries and nonaqueous-type electric double layer capacitors are usable. Specifically, solvents containing a cyclic carbonic acid ester are suitably used. This is because cyclic carbonic acid esters have a very high relative dielectric constant, as is typified by ethylene carbonate and propylene carbonate. Among cyclic carbonic acid esters, propylene carbonate is preferable. This is because it has a freezing point of −49° C., which is lower than that of ethylene carbonate, thus allowing the electricity storage device to operate at low temperatures.

Moreover, solvents containing cyclic esters are also suitably used. The reason is that cyclic esters have a very high relative dielectric constant, as is typified by γ-butyrolactone; therefore, when any such solvent is contained as a component, the entire nonaqueous solvent of the electrolyte solution 29 can have a very high dielectric constant.

As the nonaqueous solvent, any one of these may be used by itself, or a plurality of solvents may be mixed for use. Other solvents that are usable as the solvent include acyclic carbonic acid esters, acyclic esters, cyclic or acyclic ethers, and the like. Specifically, nonaqueous solvents such as dimethyl carbonate, diethyl carbonate, methyl ethyl carbonate, tetrahydrofuran, dioxolane, sulfolane, dimethylformamide, acetonitrile, and dimethyl sulfoxide can be used. As the nonaqueous solvent of the electrolyte solution enters the positive-electrode active material layer 23 of the positive electrode so that the positive-electrode active material layer 23 is swollen with the nonaqueous solvent, whereby it is possible to reduce the reaction resistance in oxidation-reduction reactions at the positive electrode. Note however that if the solubility of the positive-electrode active material in a nonaqueous solvent is too high, the positive-electrode active material layer 23 may possibly elute. Therefore, it is preferable that the nonaqueous solvent is one that does not elute the electrode active material 13 which is used in the positive-electrode active material layer 23.

As the supporting salt, a supporting salt composed of the following cations and anions can be used. As cations, for example, alkali metal cations such as lithium, sodium, and potassium, alkaline-earth metal cations such as magnesium, quaternary ammonium cations such as tetraethylammonium and 1,3-ethylmethylimidazolium, and the like can be used. One of the cations may be used solely, or two or more of the cations may be used in combination. Among these, lithium cations, quaternary ammonium cations, and the like, are preferable.

As anions, for example, halide anions, perchlorate anions, trifluoromethanesulfonate anions, boron tetrafluoride anions, hexafluorophosphate anions, trifluoromethanesulfonate anions, bis(trifluoromethanesulfonyl)imide anions, bis(perfluoroethylsulfonyl)imide anions, and the like can be used. One of the anions may be used solely, or two or more of the anions may be used in combination. Specific examples of supporting salts include, for example, lithium fluoride, lithium chloride, lithium perchlorate, lithium trifluoromethanesulfonate, lithium boron tetrafluoride, bistrifluoromethylsulfonylimide lithium, lithium thiocyanate, magnesium perchlorate, magnesium trifluoromethanesulfonate, sodium boron tetrafluoride, and the like.

An electricity storage device using an electrode of the present embodiment not only provides a high capacity and excellent cyclic characteristics, but also is an electricity storage device with a high output power. Therefore, an electricity storage device using an electrode of the present embodiment is suitably used for vehicles such as hybrid vehicles and for portable electronic devices. Vehicles and portable electronic devices incorporating the electricity storage device of the present invention are characterized in that the electricity storage device has a light weight, and that they have a large output power and excellent cyclic characteristics. Therefore, a light weight is particularly achieved which has been difficult to achieve with any electricity storage device employing a conventional inorganic compound in terms of weight.

The present embodiment has been described in an embodiment where an electrode and an electricity storage device of the present invention are used for a lithium secondary battery. However, the electrode and the electricity storage device of the present invention can be used in various energy storage devices, sensors, etc., utilizing electrochemical storing of electric charge. Specifically, electric double layer capacitors may be provided, in which an electrode of the present invention is used as the positive electrode, and combined with an activated carbon negative electrode. They can also be used in an electrochemical capacitor, or the like, other than a secondary battery, such as a lithium ion capacitor combined with a negative electrode capable of occluding and releasing lithium such as lithium-occluding graphite. They can also suitably be used in electrodes used in various electrochemical elements. As an example of an electrochemical element, a polymer actuator can be provided by using, as the electrolyte, a polymer gel electrolyte that expands and shrinks in response to charging and discharging. Since the electrode of the present invention changes its color in response to charging and discharging, an electrochromic display element can be provided by using an electrically conductive glass as the electrically conductive support, while using a transparent material such as a film or a glass as part of the exterior.

(Third Embodiment)

Hereinafter, a third embodiment of an electrode of the present invention and an electricity storage device in which the same is used will be described.

The inventors of the present invention studied how to increase the capacity of an electricity storage device by using, as an electrode active material, a polymer compound including a plurality of reaction structures having a π electron conjugated cloud, and increasing the proportion of to electrode active material in the electrode active material layer. As a result, a problem was confirmed that if the content of the electrode active material increases, the output characteristics as an electrode decrease, failing to obtain an electrode with a high capacity and a high output power as designed.

A detailed study made on this problem suggested a decrease in the electron conductivity and ion conductivity in the vicinity of the interface between the current collector and the active material layer. This is believed to be because a polymer compound including a plurality of reaction structures having a π electron conjugated cloud is an organic substance, and has a lower electron conductivity than that of an electrical conductivity assistant, whereby the electron conduction is inhibited between the electrode active material and the current collector as the surface of the current collector is covered by the electrode active material having a low electron conductivity. Based on these findings, the inventors of the present invention found a structure that improves the electron conductivity between a current collector and an active material layer in an electricity storage device.

Figure 9:
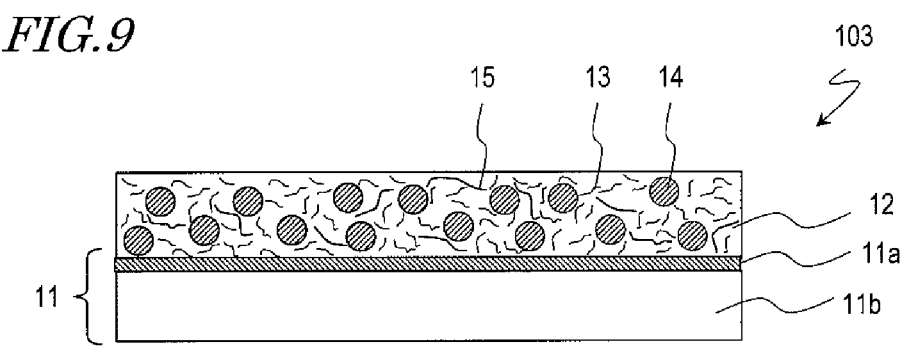
FIG. 9 A schematic cross-sectional view showing the third embodiment of an electrode according to the present invention.

FIG. 9 schematically shows a cross-sectional structure of an embodiment of an electrode 103 of the present embodiment. The electrode 103 includes an electrically conductive support 11, and an active material layer 12 provided on the electrically conductive support 11.

The electrically conductive support 11 includes an electrolytically-etched aluminum layer 11a and an electrically conductive layer 11b, and the active material layer 12 is in contact with the electrolytically-etched aluminum layer 11a. The electrolytically-etched aluminum layer 11a is made of aluminum, and the minute pores formed, thereby roughening the surface. The minute pores are a plurality of etching apertures formed by electrolytic etching, and are preferably arranged on the surface of the electrolytically-etched aluminum layer 11a in a self-aligned manner. The aperture diameter of the etching apertures is preferably about 0.05 μm or more and 0.5 μm or less. The thickness of the electrolytically-etched aluminum layer 11a is preferably 0.5 μm or more and 5 μm or less, and more preferably 1 μm or more and 3 μm or less. The depth of the etching apertures is about the same as the thickness of the electrolytically-etched aluminum layer 11a.

If the thickness of the etching layer is greater than 5 μm, or if the etching apertures are larger than 0.5 μm, the strength of the electrolytically-etched aluminum layer 11a decreases. If the etching apertures are larger than 0.5 μm, the electrode active material may possibly enter the etching apertures, burying the etching apertures. Conversely, if the thickness of the etching layer is smaller than 0.5 μm or the aperture diameter of the etching apertures is smaller than 0.05 μm, the effect of the electrolytically-etched aluminum layer 11a may not be obtained sufficiently. If the etching apertures are smaller than 0.05 μm, the etching apertures cannot be impregnated with a sufficient amount of electrolyte solution, failing to sufficiently obtain the effects of the present invention.

The electrically conductive layer 11b may be formed by any material as long as it is electrically conductive, and may be formed by a composite material such as aluminum or stainless steel, or may be formed by other metals, for example. It may be a material obtained by evaporating a metal material such as aluminum onto the surface of a resin film, for example. A surface of an aluminum foil may be subjected to electrolytic etching to form the electrolytically-etched aluminum layer 11a, and the unetched portion may be used as the electrically conductive layer 11b. The thickness of the electrically conductive layer 11b is determined, taking into consideration the mechanical strength and electric characteristics required for the electrically conductive support 11. Preferably, the thickness of the electrically conductive support 11 as a whole, combining the electrically conductive layer 11b and the electrolytically-etched aluminum layer 11a together, is 10 μm or more and 30 μm or less. If the thickness of the electrically conductive support 11 as a whole is thinner than 10 μm, the electric strength will be weak. If it is thicker than 30 μm, the volume of the portion of the electricity storage device that does not contribute to electricity storage increases, and the capacity density decreases.

The electrolytic etching process for forming the electrolytically-etched aluminum layer 11a may be performed by conducting a direct current or an alternate electric current through an aluminum foil in an aqueous solution. In the case of alternating current etching, it can be performed by providing an electric current of about 100 to 1000 mA/cm$^2$ with a frequency of about 5 to 50 Hz in an aqueous hydrochloric acid solution of 20° C. to 60° C., for example.

The active material layer 12 includes the electrical conductivity assistant 14 and the electrode active material 13. As the electrode active material 13, the first polymer compound or the second polymer compound described above in the first embodiment, i.e., a polymer compound including the tetrachalcogenofulvalene structure represented by general formula (1) in the main chain or the side chain, is used. It is preferable that the weight percentage of the electrode active material 13 in the active material layer 12 is 30 wt % or more. The greater the weight percentage of the electrode active material 13, the greater the charge capacity of the electricity storage device using the electrode 103. However, if the weight percentage becomes excessive, the proportion of the electrical conductivity assistant becomes smaller, thereby making it difficult to uniformly charge-discharge the entire active material layer. Thus, the weight percentage of the active material in the substance layer 12 is 30 wt % or more and 80 wt % or less. More preferably, it is 50 wt % or more and 70 wt % or less.

The electrical conductivity assistant 14 may be any of various electron conductive materials that do not undergo chemical changes at the electrode reaction potential. For example, where the electrode of the present invention is used as a positive electrode of a lithium secondary battery, carbon materials such as carbon black, graphites and acetylene black, electrically conductive polymers such as polyaniline, polypyrrole or polythiophene, electrically conductive fibers such as carbon fiber or metal fiber, metal powders, electrically conductive whiskers, electrically conductive metal oxides, etc., may be used, either alone or as a mixture thereof, as the electrical conductivity assistant. Particularly, carbon materials are desirable.

The active material layer 12 may further include a binder agent 15. The binder agent 15 may be either a thermoplastic resin or a thermosetting resin. For example, polyolefin resins such as polyethylene and polypropylene, fluorine-type resins such as polytetrafluoroethylene (PTFE), polyvinylidene fluoride (PVDF), and hexafluoropropylene (HFP), copolymer resins thereof, styrene-butadiene rubber, polyacrylic acid or a copolymer resin thereof, and the like are usable as binder agents.

With the electrode 103 having the structure as described above, if the content proportion of the electrode active material in the active material layer 12 is 30% or more, the electrode 103 can achieve a higher output power. The surface of the electrolytically-etched aluminum layer 11a is roughened. It is believed that the surface area is increased because of this, and the contact probability between the electrical conductivity assistant 14 and the electrode active material in the electrically conductive support 11 and the active material layer 12 at the interface between the electrically conductive support 11 and the active material layer 12 increases, thereby ensuring a desirable electron conductivity.

The surface of the electrolytically-etched aluminum layer 11a has pores. Since the electrode active material 13 cannot enter the pores, when the electrode 103 is immersed in an electrolyte solution, the electrolyte solution enters the pores, whereby the electrolyte solution may exist at the interface between the active material layer 12 and the electrically conductive support 11. This makes smooth the movement of ions necessary for the charging-discharging reactions. It is believed that it particularly makes smooth the mobility of the anion.

Based on the above, the electrically conductive support 11 may include, instead of the electrolytically-etched aluminum layer 11a, an electrically conductive surface layer with surface irregularities of about the same level of roughness as the electrolytically-etched aluminum layer 11a. Specifically, a metal current collector with surface irregularities formed by dry etching, a metal current collector having a predetermined pattern formed by vapor deposition or machining, or a current collector including a metal foil, and a metal film with predetermined surface irregularities or a metal mesh with a predetermined gap formed on the metal foil may be used. In this case, any of those described above may be used as the material of the current collector. Those described above or the like may be used instead of the electrolytically-etched aluminum layer 11a.

There is no particular limitation as to the method for producing the electrode 103, and any known method for manufacturing an electrode for an electricity storage device can be used. Specifically, first, the electrically conductive support 11 including the electrolytically-etched aluminum layer 11a and the electrically conductive layer 11b is prepared. Where the electrically conductive support 11 is produced from an aluminum foil, the procedure described above may be followed, for example.

Where the electrode active material 13 is present, in the form of particles, in the active material layer 12, the granular electrode active material 13 and the electrical conductivity assistant 14 may be mixed together using an appropriate solvent, and applied on the electrolytically-etched aluminum layer 11a of the electrically conductive support 11, after which the solvent is removed, thereby producing the electrode 103.

In order to uniformly disperse the electrode active material 13 in the active material layer 12, a solution in which the electrode active material 13 is dissolved is used. Specifically, the electrode active material 13 is dissolved in an aprotic solvent, and mixed with an electrical conductivity assistant. It can be obtained by applying the resultant mixture on the electrolytically-etched aluminum layer 11a of the electrically conductive support 11, and then removing the aprotic solvent. With such an electrode production method, if the surface of the electrically conductive support is a smooth surface, the surface of the electrically conductive support may be covered by the electrode active material 13, thereby significantly reducing the electron conductivity between the electrically conductive support and the electrode active material. However, with the present embodiment, since the electrolytically-etched aluminum layer 11a is provided on the surface of the electrically conductive support 11, the electrolyte solution enters the pores of the electrolytically-etched aluminum layer 11a, thereby ensuring the electron conductivity between the active material layer 12 and the electrically conductive support 11.

In the above embodiment, the electrode active material 13 is in the form of particles or is uniformly dispersed in the active material layer 12. However, as described in the first embodiment and the second embodiment, the electrode active material 13 may cover the electrical conductivity assistant 14 in the active material layer 12.

Figure 10:
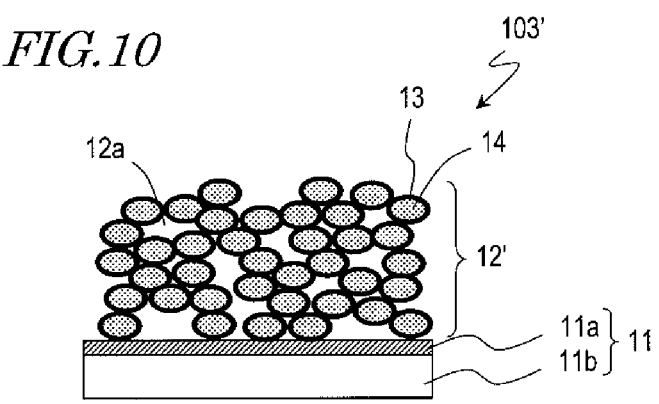
FIG. 10 A schematic cross-sectional view showing other forms of the third embodiment.
Figure 11:
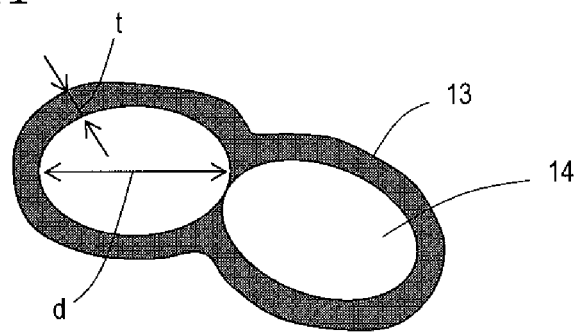
FIG. 11 A schematic cross-sectional view showing, on an enlarged scale, the structure in the vicinity of an electrical conductivity assistant of FIG. 10.

In an electrode 103' shown in FIG. 10, the electrically conductive support 11 includes the electrolytically-etched aluminum layer 11a and the electrically conductive layer 11b, and an active material layer 12' is in contact with the electrolytically-etched aluminum layer 11a. In the active material layer 12', the electrode active material 13, which is a polymer compound having a side chain including a structure represented by general formula (1), covers at least a portion of the surface of the electrical conductivity assistant 14. FIG. 11 is a schematic view showing, on an enlarged scale, a portion of the active material layer 12'. As shown in FIG. 10 and FIG. 11, the electrode active material 13 does not form particles but covers the surface of the electrical conductivity assistant 14. That is, the electrode active material 13 is present in the form of a cover film covering the electrical conductivity assistant 14. While the electrical conductivity assistant 14 is shown in FIG. 10 and FIG. 11 to have an elliptical cross section, the shape of the electrical conductivity assistant 14 is not limited to elliptical but may be any one of various shapes of electrical conductivity assistants commonly used as an electrical conductivity assistant of an electrode material. The particle shape formed by the electrical conductivity assistant 14 does not have to be completely covered by the electrode active material 13, and there may be some areas where particles of the electrical conductivity assistant 14 are in contact with one another.

The thickness of the electrode active material 13 covering the electrical conductivity assistant 14 is preferably small, as compared with the size of the electrical conductivity assistant 14. That is, the thickness t of the electrode active material 13 preferably satisfies t<d, where d denotes the average particle diameter of the electrical conductivity assistant 14. More specifically, it is preferable that the average particle diameter of the electrical conductivity assistant 14 is about several tens of nm to several hundreds of nm, and the thickness t of the electrode active material 13 is about several nm to several hundreds of nm. Moreover, the active material layer 12' preferably has a gap 12a between the electrode active materials 13 covering the electrical conductivity assistant as shown in FIG. 10. Where the thickness t of the electrode active material 13 is smaller than several nm, the proportion accounted for by the electrolytic material 13 in the active material layer is small, whereby the charge capacity of the electrode 103 is small. If the thickness t of the electrode active material 13 exceeds several hundreds of nm, the traveling distance of the anion in the electrode active material will also be long, as will be described below, thereby increasing the resistive component of the electrode. Where the average particle diameter of the electrical conductivity assistant 14 is less than several tens of nm or where it is greater than several μm, it may be difficult to obtain the electrode active material 13 having such a thickness t as described above.

Where the active material layer 12 has such a structure, the contact area between the electrode active material 13 and the electrical conductivity assistant 14 increases, whereby electrons travel smoothly through oxidation-reductions between the electrical conductivity assistant 14 and the electrode active material 13, as described in the first embodiment and the second embodiment, in addition to the effects of the electrolytically-etched aluminum layer 11a of the electrically conductive support 11 described above. The oxidation-reduction reactions in the electrode active material 13 are also more likely to occur uniformly.

Where the electrode active material 13 undergoes oxidation-reduction reactions, the anion in the electrolyte solution needs to travel from the surface of the electrode active material 13 that is in contact with the electrolyte solution to the vicinity of the side chain of the structure represented by general formula (1) described above which is the oxidation-reduction site inside the electrode active material 13. The inside of the electrode active material 13 is where it is more difficult for the anion to travel than in the electrolyte solution, and becomes a resistive component. Therefore, the shorter the traveling distance of the anion, the faster the oxidation-reduction reactions proceed.

With the electrode 103' shown in FIG. 10, since the electrode active material 13 is present in the form of a thin film in the active material layer 12, the traveling distance from the surface of the electrode active material 13 that is in contact with the electrolyte solution to the inside is short. Moreover, as the gap 12a is preferably present in the active material layer 12, the electrolyte solution enters the gap 12a, thereby expanding the area of the electrode active material 13 that is in contact with the electrolyte solution. Therefore, the anion more easily arrives at the vicinity of the side chain of the structure represented by general formula (1) which is the oxidation-reduction site present inside the electrode active material 13, whereby it is possible to reduce the resistive component in the electrode 103.

The active material layer 12 having such a structure can be produced by utilizing a feature that the electrode active material 13 which is a polymer compound including a structure represented by general formula (1) has a high affinity with a particular aprotic solvent.

Specifically, it is possible to form the active material layer 12' having a structure shown in FIG. 10 in which the surface of the electrical conductivity assistant 14 is covered by a thin film of the electrode active material 13 by a manufacturing method including the steps of: dissolving a copolymer compound having a side chain including a structure represented by general formula (1) in a particular aprotic solvent to obtain a solution; producing a mixture obtained by mixing this solution with an electrical conductivity assistant; and removing the aprotic solvent.

Also in the electrode 103' of FIG. 10, the active material layer 12' may include a binder agent. The binder agent may be one described above. Where an electrode active material is dissolved in a particular organic solvent and allowed to cover an electrical conductivity assistant, it is desirable that the electrode active material and the binder agent are dissolved in the same organic solvent, and fluorine-type resins are preferable, in order to improve the uniformity of the film. Where the active material layer 12' includes a binder agent, the binder agent covers the surface of the electrical conductivity assistant 14, together with the electrode active material 13. On the surface of the electrical conductivity assistant 14, the electrode active material 13 and the binder agent are in the form of a mixed mixture.

The method for manufacturing the electrode 103' includes a step of preparing a mixture of an aprotic solvent with an electrode active material dissolved therein, and an electrical conductivity assistant, and a step of removing the aprotic solvent from the mixture to be applied.

The mixture may be produced by first dissolving the electrode active material 13 in an aprotic solvent and then mixing the aprotic solvent with the electrical conductivity assistant 14, or by dissolving the electrode active material in a mixture obtained by mixing together an aprotic solvent and the electrical conductivity assistant. The mixture may include a binder agent. The binder agent may be one described above. The electrical conductivity assistant 14 and the binder agent may not be dissolved in an aprotic solvent. Where the mixture includes a binder agent, the order in which they are mixed together is arbitrary. It is desirable that the electrode active material is dissolved in an aprotic solvent and is uniformly dispersed therein. Therefore, the following order is preferable: first dissolve the electrode active material in an aprotic solvent, and then mix the electrical conductivity assistant and the binder agent together.

The mixture can be produced by using a mixing method commonly used in the pertinent field if the electrode active material is dissolved in an aprotic solvent. For example, the dissolution can be done by using a mixer such as a planetary mixer.

Next, the aprotic solvent is removed from the resultant mixture. There is no particular limitation as to the method for removing the aprotic solvent, and any method commonly used in the pertinent field may be used. Examples include a solvent removal in which the resultant mixture is applied onto a base material such as an electrically conductive support and then allowed to dry at a high temperature using a drying furnace, or the like. Where the produced mixture is applied onto a base material to remove the solvent, the application method may be any method commonly used in the pertinent field. Specifically, a mixture can be applied onto the electrically conductive support 11 using spin coating, screen printing method, a coater, or the like. Other examples include a method, such as spray drying, in which the resultant mixture is dispersed and allowed to dry at a high temperature to as to remove the aprotic polar solvent.

Preferably, the resultant mixture is applied onto an electrically conductive support, and the solvent is removed by drying at a high temperature using a drying furnace, or the like. Then, the layer, resulting after the drying, which includes the electrically conductive support, the electrode active material formed on the electrically conductive support, and a conductive agent, can be used as an electrode of an electricity storage device.

Where an electrically non-conductive support is used as the base material, the layer resulting from the drying which includes the electrode active material and the conductive agent is supported on the electrically conductive support. Similarly, also where the solvent removal is done by spray drying, and the like, it is supported on the electrically conductive support. Thus, there is obtained an electrode for an electricity storage device.

Thus, the electrode 103 is produced, where the active material layer 12, in which the electrode active material 13 is not forming particles and is covering the surface of the electrical conductivity assistant 14, is formed on the electrically conductive support 11.

With the electrode 103' shown in FIG. 10, since the electrode active material is covering the electrical conductivity assistant, the contact area between the electrode active material and the electrical conductivity assistant is large, thereby allowing for smooth traveling of electrons between the electrode active material and the electrical conductivity assistant. Since the electrode active material is present as a thin film on the surface of the electrical conductivity assistant, the traveling distance of the counter-ion from the electrolyte solution to oxidation-reduction reaction portions in the electrode active material becomes shorter, thereby allowing for a reduction in the resistance due to diffusion of the counter-ion. As a result, it is possible to reduce the resistance in the electrode during oxidation-reduction reactions. Therefore, the effects described above are obtained in a pronounced manner, and it is possible to realize an electrode for an electricity storage device having a high output power.

Figure 12:
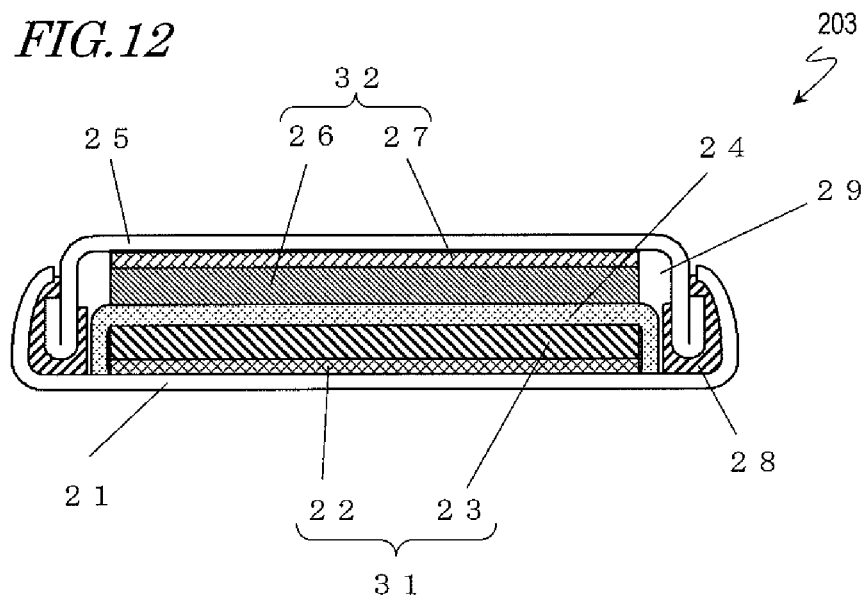
FIG. 12 A schematic cross-sectional view showing the third embodiment of an electricity storage device according to the present invention.

Next, an electricity storage device using an electrode of the present invention as a positive electrode will be described in detail. FIG. 12 is a cross-sectional view schematically showing a coin-type lithium secondary battery 203 which is an embodiment of the electricity storage device according to the present invention. A coin-type lithium secondary battery shown in FIG. 12 includes a positive electrode 31, a negative electrode 32, and a separator 24. The positive electrode 31 includes a positive current collector 22 and a positive-electrode active material layer 23, and the electrode 103 shown in FIG. 9 or the electrode 103' shown in FIG. 10 may be used. The negative electrode 32 includes a negative-electrode active material layer 26 and a negative current collector 27, and the negative-electrode active material layer 26 is supported by the negative current collector 27.

The negative-electrode active material layer 26 contains a negative-electrode active material. As the negative-electrode active material, any known negative-electrode active material that reversibly occludes and releases lithium is used. For example, materials capable of reversibly occluding and releasing lithium, e.g., graphite materials such as natural graphite and artificial graphite, amorphous carbon materials, lithium metal, lithium-containing composite nitride, lithium-containing titanium oxide, silicon, silicon-containing alloys, silicon oxide, tin, tin-containing alloys, and tin oxide, or, carbon materials having an electric double layer capacity such as activated carbon, organic compound materials having a $\pi$ electron conjugated cloud, and the like can be used. These negative electrode materials may each be used by itself, or a plurality of negative electrode materials may be mixed for use. For the negative current collector 27, any material known as a current collector of a negative electrode for a lithium ion secondary battery, e.g., copper, nickel, and stainless steel, can be used. Similarly to the positive current collector 22, the negative current collector 27 can also be used in forms such as a metal foil, and a resin film containing an electrically conductive filler composed of any such metal.

The negative-electrode active material layer 26 may contain only a negative-electrode active material, or may contain one or both of an electrical conductivity assistant and a binder agent. The electrical conductivity assistant may be one described above. The binder agent may also be one described above.

The positive electrode 31 and the negative electrode 32 oppose each other with the separator 24 interposed therebetween, such that the positive-electrode active material layer 23 and the negative-electrode active material layer 26 are in contact with the separator 24, whereby an electrode group is constituted. The separator 24 is a resin layer composed of a resin which does not have electron conductivity, and is a microporous film having a large ion transmission and a predetermined mechanical strength and electrical insulation. From a standpoint of providing an excellent organic solvent-resistant ability and an excellent hydrophobicity, a polyolefin resin in which polypropylene, polyethylene, or the like is used by itself or in which these are combined is preferable. Instead of the separator 24, a resin layer having electron conductivity which swells by containing an electrolyte solution and functions as a gel electrolyte may be provided.

The electrode group is accommodated in the internal space of a case 21. In the internal space of the case 21, an electrolyte solution 29 is injected, so that the positive electrode 31, the negative electrode 32, and the separator 24 are impregnated with the electrolyte solution 29. Since the separator 24 includes minute spaces for retaining the electrolyte solution 29, the electrolyte solution 29 is retained in the minute spaces, such that the electrolyte solution 29 is interposed between the positive electrode 31 and the negative electrode 32. An opening of the case 21 is sealed by a sealing plate 25, using a gasket 28.

The electrolyte solution 29 is composed of a nonaqueous solvent and a supporting salt which dissolves in the nonaqueous solvent. As the nonaqueous solvent, known solvents which can be used for nonaqueous secondary batteries and nonaqueous-type electric double layer capacitors are usable. Specifically, solvents containing a cyclic carbonic acid ester are suitably used. This is because cyclic carbonic acid esters have a very high relative dielectric constant, as is typified by ethylene carbonate and propylene carbonate. Among cyclic carbonic acid esters, propylene carbonate is preferable. This is because it has a freezing point of −49° C., which is lower than that of ethylene carbonate, thus allowing the electricity storage device to operate at low temperatures.

Moreover, solvents containing cyclic esters are also suitably used. The reason is that cyclic esters have a very high relative dielectric constant, as is typified by γ-butyrolactone; therefore, when any such solvent is contained as a component, the entire nonaqueous solvent of the electrolyte solution 29 can have a very high dielectric constant.

As the nonaqueous solvent, any one of these may be used by itself, or a plurality of solvents may be mixed for use. Other solvents that are usable as the solvent include acyclic carbonic acid esters, acyclic esters, cyclic or acyclic ethers, and the like. Specifically, nonaqueous solvents such as dimethyl carbonate, diethyl carbonate, methyl ethyl carbonate, tetrahydrofuran, dioxolane, sulfolane, dimethylformamide, acetonitrile, and dimethyl sulfoxide can be used. As the nonaqueous solvent of the electrolyte solution enters the positive-electrode active material layer 23 of the positive electrode so that the positive-electrode active material layer 23 is swollen with the nonaqueous solvent, whereby it is possible to reduce the reaction resistance in oxidation-reduction reactions at the positive electrode. Note however that if the solubility of the positive-electrode active material in a nonaqueous solvent is too high, the positive-electrode active material layer 23 may possibly elute. Therefore, it is preferable that the nonaqueous solvent is one that does not elute the electrode active material 13 which is used in the positive-electrode active material layer 23.

As the supporting salt, a supporting salt composed of the following cations and anions can be used. As cations, for example, alkali metal cations such as lithium, sodium, and potassium, alkaline-earth metal cations such as magnesium, quaternary ammonium cations such as tetraethylammonium and 1,3-ethylmethylimidazolium, and the like can be used. One of the cations may be used solely, or two or more of the cations may be used in combination. Among these, lithium cations, quaternary ammonium cations, and the like, are preferable.

As anions, for example, halide anions, perchlorate anions, trifluoromethanesulfonate anions, boron tetrafluoride anions, hexafluorophosphate anions, trifluoromethanesulfonate anions, bis(trifluoromethanesulfonyl)imide anions, bis(perfluoroethylsulfonyl)imide anions, and the like can be used. One of the anions may be used solely, or two or more of the anions may be used in combination. Specific examples of supporting salts include, for example, lithium fluoride, lithium chloride, lithium perchlorate, lithium trifluoromethanesulfonate, lithium boron tetrafluoride, bistrifluoromethylsulfonylimide lithium, lithium thiocyanate, magnesium perchlorate, magnesium trifluoromethanesulfonate, sodium boron tetrafluoride, and the like.

An electricity storage device using an electrode of the present invention not only provides a high capacity and excellent cyclic characteristics, but also is an electricity storage device with a high output power. Therefore, an electricity storage device using an electrode of the present invention is suitably used for vehicles such as hybrid vehicles and for portable electronic devices. Vehicles and portable electronic devices incorporating the electricity storage device of the present invention are characterized in that the electricity storage device has a light weight, and that they have a large output power and excellent cyclic characteristics. Therefore, a light weight is particularly achieved which has been difficult to achieve with any electricity storage device employing a conventional inorganic compound in terms of weight.

The present embodiment has been described in an embodiment where an electrode and an electricity storage device of the present invention are used for a lithium secondary battery. However, the electrode and the electricity storage device of the present invention can be used in various energy storage devices, sensors, etc., utilizing electrochemical storing of electric charge. Specifically, electric double layer capacitors may be provided, in which an electrode of the present invention is used as the positive electrode, and combined with an activated carbon negative electrode. They can also be used in an electrochemical capacitor, or the like, other than a secondary battery, such as a lithium ion capacitor combined with a negative electrode capable of occluding and releasing lithium such as lithium-occluding graphite. They can also suitably be used in electrodes used in various electrochemical elements. As an example of an electrochemical element, a polymer actuator can be provided by using, as the electrolyte, a polymer gel electrolyte that expands and shrinks in response to charging and discharging.

Since the electrode of the present invention changes its color in response to charging and discharging, an electrochromic display element can be provided by using an electrically conductive glass as the electrically conductive support, while using a transparent material such as a film or a glass as part of the exterior.

EXAMPLES

Hereinafter, results of synthesizing polymers having a tetrachalcogenofulvalene structure in the repetition units, producing electrodes and electricity storage devices by using the same, and evaluating the characteristics of the electricity storage devices will be specifically described.

(I) Evaluation of Electrode Active Material and Active Material Layer Structure

First, results of producing electrodes and electricity storage devices using the same by different electrode manufacturing methods using electrode active materials of different structures, and evaluating the characteristics of the electricity storage devices, in order to confirm the effects of the electrode of the present invention, will be described.

1. Production of Electrodes and Electricity Storage Devices

Example 1

(1) Production of Positive Electrode

A copolymer compound represented by formula (39) below (hereinafter referred to as copolymer compound 39) was synthesized as a positive-electrode active material.

[FORMULA 57]

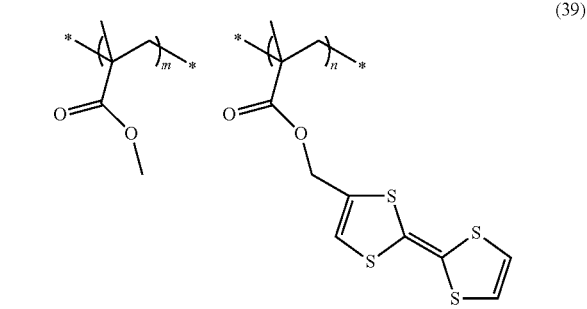

The constituent ratio m/n of the number m of second units (units having no oxidation-reduction sites in the side chains) with respect to the number n of first units (units having oxidation-reduction sites in the side chains) of the copolymer compound to be co-synthesized represented by chemical formula (39) is approximately 1. Copolymer compound was synthesized in split steps: synthesis of a tetrathiafulvalene precursor contained in the side chains, synthesis of a copolymer main-chain compound, and coupling of tetrathiafulvalene to the copolymer main-chain compound. These will be described in order below.

Synthesis of the tetrathiafulvalene precursor was conducted by a route represented by formula (R2) below. In a flask, 5 g of tetrathiafulvalene 2 (manufactured by Aldrich Co.) was placed, and 80 cc of tetrahydrofuran (manufactured by Aldrich Co.) was further added. After cooling this to −78° C., an n-hexane-tetrahydrofuran solution of 1 molarity of lithium diisopropylamide (manufactured by KANTO CHEMICAL CO.) was added dropwise over 10 minutes, and thereafter 7.3 g of paraformaldehyde (manufactured by KANTO CHEMICAL CO.) was added, and through 15 hours of agitation, reaction was allowed to progress. The solution obtained in this manner was poured into 900 cc of water, twice extracted with 1 L of diethyl ether (manufactured by KANTO CHEMICAL CO.), and after being cleaned with 500 cc of saturated aqueous solution of ammonium chloride and 500 cc of saturated brine, dried on anhydrous sodium sulfate. After the drying agent was removed, concentration under a reduced pressure was conducted, and 6.7 g of the resultant coarse matter was subjected to silica gel column purification, thus obtaining 1.7 g of purified matter. It was confirmed with H-NMR and IR that the purified matter was tetrathiafulvalene precursor 51.

[FORMULA 58]

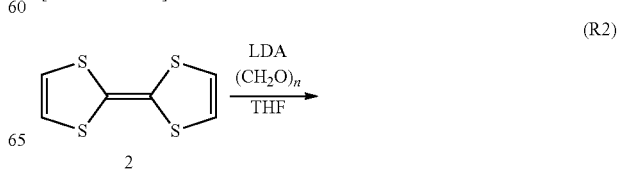

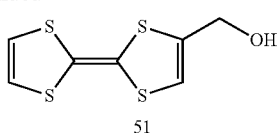

51

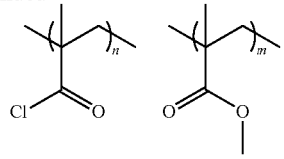

54

Synthesis of the copolymer main-chain compound was conducted by a route represented by formula (R3) below. As a monomer material, 40 g of methylmethacrylate 53 (manufactured by Aldrich Co.) and 21 g of methacryloyl chloride (manufactured by Aldrich Co.) were mixed to 90 g of toluene (manufactured by Aldrich Co.), and 4 g of azoisobutyronitrile (manufactured by Aldrich Co.) was added as a polymerization initiator. Reaction was allowed to progress by agitating the mixture at 100° C. for 4 hours. By adding hexane to the solution obtained in this manner, reprecipitation was allowed to occur, whereby 57 g of precipitate product was obtained. It was confirmed with H-NMR, IR, and GPC that the product was the copolymer main-chain compound represented by formula 54. In an H-NMR measurement, a peak associated with the hydrogens of methyl groups, which are attached one-for-each to the main chains of a first unit and a second unit and a peak associated with those of a methyl group which is bound to a side chain portion of a second unit can be observed with distinction. Therefore, from a ratio between the integral values of the respective peaks in the resultant NMR spectrum, a proportion of the second units in the copolymer main-chain compound can be determined, whereby the constituent ratio m/n of the second units to the first units can be calculated. For example, when copolymer main-chain compound used in the present Example is measured in an H-NMR measurement in a chloroform solvent, a peak associated with the methyl groups respectively bound to the main chains of each first unit and each second unit can be observed in the neighborhood of 0.5 to 2.2 ppm, and a peak associated with the methyl group bound to the side chain portion of each second unit can be observed in the neighborhood of 3.6 ppm, and from a ratio between the integral values of these H-NMR spectrum peaks, a constituent ratio between the first units and the second units of synthesized copolymer main-chain compound can be calculated. In an IR measurement, carbonyl groups (C=O) of the first unit side chain portions, the Cl portions, and carbonyl groups of the second unit side chain portions were measurable as distinct peaks. The molecular weight of the copolymer main-chain compound synthesized was measured by using GPC, and it was confirmed that the degree of polymerization exceeded 20.

[FORMULA 59]

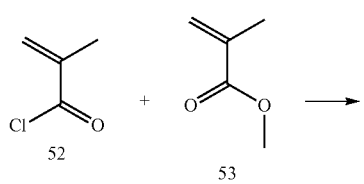

(R3)

Coupling of tetrathiafulvalene precursor 18 to copolymer main-chain compound 54 was effected by a route represented by formula (R4) below. Under an Ar gas flow, 1.0 g of tetrathiafulvalene precursor 51 and 26 cc of tetrahydrofuran were placed in a reaction vessel, and agitated at room temperature. To the reaction solution, 0.17 g of NaH (60 wt % in mineral oil) (manufactured by Aldrich Co.) was added dropwise, and while this was agitated at 40° C. for 1 hour, a solution in which 0.58 g of copolymer main-chain compound 54 had been dissolved in 8.5 cc of tetrahydrofuran was mixed. Reaction was allowed to progress by agitating the mixed solution at 70° C. overnight. Hexane was added to the solution obtained in this manner, and 0.2 g of precipitate product was obtained through reprecipitation. It was confirmed with H-NMR, IR and GPC that the resultant product was copolymer compound 39. Using the H-NMR measurement, the constituent ratio between the first unit and the second unit can be obtained as with the copolymer main-chain compound. For example, a peak associated with the hydrogens of the methylene group whose main chain is bound to tetrathiafulvalene which is an oxidation-reduction site can be observed near 4.8 ppm, and a peak associated with hydrogens other than the binding portions of tetrathiafulvalene to the main chain can be observed near 6.8 to 7.0 ppm. Therefore, it is possible to obtain the constituent ratio between the first unit and the second unit from the ratio between the intensity of the peak associated with the first units and the intensity of the peak associated with the methyl group in the second unit side chain portions. Note that, for the constituent ratio of the present Example, a value is used which is calculated, from integral values of a peak associated with the first units and a peak associated with the methyl groups bound to the second unit side chain portions, in an H-NMR measurement of copolymer compound 39 after the step of introducing TTF. From the results of the obtained H-NMR spectrum, it was confirmed that the constituent ratio m/n of the second unit (the methacrylate portion) with respect to the first unit (the unit including a tetrathiafulvalene site which is an oxidation-reduction site) of copolymer compound 39 was approximately 1. The weight-average molecular weight of copolymer compound 39 synthesized was approximately 28000. That is, it was confirmed that the number n of TTF units included in the polymer was 72, and the degree of polymerization (the sum between n and m) was 144, i.e., greater than or equal to four. As a result of sulfur element analysis of copolymer compound 39 synthesized, the sulfur content was found to be 30.2 wt %. The stoichiometric capacity of copolymer compound 39 is calculated from the sulfur content to be 125 mAh/g.

[FORMULA 60]

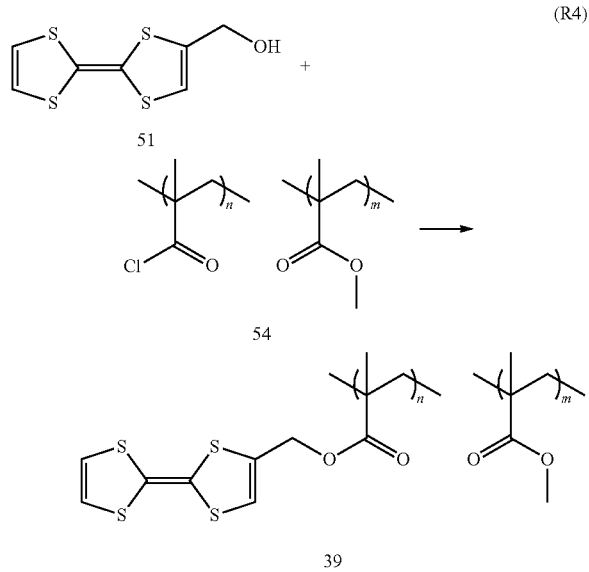

A positive electrode was produced in a glow box of an argon atmosphere having a gas purifier, using copolymer compound 39 synthesized.

First, a mixture with copolymer compound 39 dissolved therein was produced. In a mortar, 50 mg of copolymer compound 39 was crushed, and 150 mg of NMP (manufactured by Wako Pure Chemical Industries, Ltd.) was added thereto as an aprotic solvent and mixed in the mortar, to dissolve copolymer compound 39 in the aprotic polar solvent. The grain size distribution of copolymer compound 39 within NMP was measured by a laser diffraction-scattering method, using SALD-7000 manufactured by Shimadzu Corporation. The measurement conditions were as follows: the measurement was conducted while setting the measured grain size range to 0.015 μm to 500 μm, the measurement interval to 2 seconds, and while agitating in the solvent using the attached agitation plate. As a result of the measurement, the diffraction/scattering intensity was not observed, and it was confirmed that there was no grains of 0.015 μm or more in NMP. A ultraviolet-visible spectroscopy (UV-vis) measurement was conducted, and an absorption peak associated with the TTF ring was confirmed near 300 to 320 nm, thereby confirming that copolymer compound 39 was present in NMP.

To the NMP with copolymer compound 39 dissolved therein, 400 mg of acetylene black which is an electrical conductivity assistant, 100 mg of polyvinylidene fluoride which is a binder agent, and 5.8 g of NMP were added, and mixed, thus producing a mixture.

Next, the resultant mixture was applied onto a current collector. An aluminum foil having a thickness of 20 μm was used as the current collector. The application of the mixture onto the aluminum foil was conducted by using a coater. The application was conducted while setting the gap width to 300 μm, and the scanning speed to 7 mm/sec.

Next, NMP, which was an aprotic solvent, was removed. The mixture applied onto the aluminum foil was placed in a thermostat oven, and dried for 1 hour at a temperature of 80° C., thereby removing the aprotic solvent. Moreover, it was cut by stamping into a disk shape with a diameter of 13.5 mm, thus producing a positive electrode.

Figure 13:
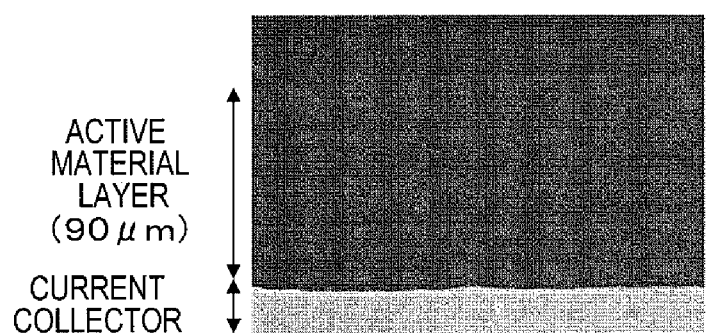
FIG. 13($a$) is an SEM image showing a cross section of the electrode of Example 1, and (b) is an image showing the distribution of sulfur across that cross section.
Figure 13:
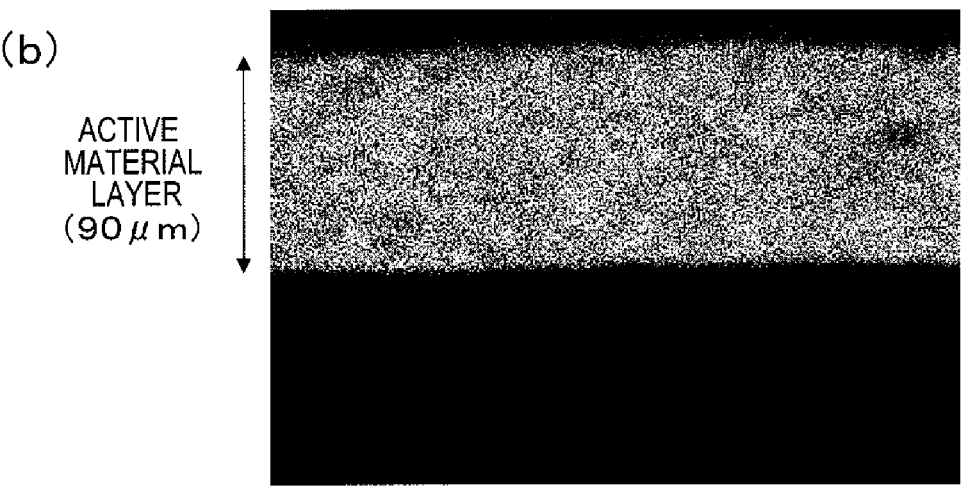

FIG. 13(a) shows a scanning electron microscope (SEM) image in the vicinity of the current collector of the produced positive electrode. The thickness of the positive-electrode active material layer of the produced positive electrode was 90 μm from the SEM image. The cross section of the produced positive electrode was observed, with 1000 magnifications, using an electron probe micro-analyzer (EPMA, JXA-8900 from JEOL Ltd.) for a sulfur distribution associated with the electrode active material. The measurement results are shown in FIG. 13(b). In FIG. 13(b), areas where sulfur is present are shown in black-and-white gray levels, with sulfur-rich portions shown in white, and areas where no sulfur is present are shown in black. From the measurement results, no active material particles of 1 μm or more were observed, and it was found that sulfur was distributed uniformly across the electrode plate. The application weight of the positive-electrode active material was 0.2 mg/cm$^2$ per electrode plate area.

Figure 14:
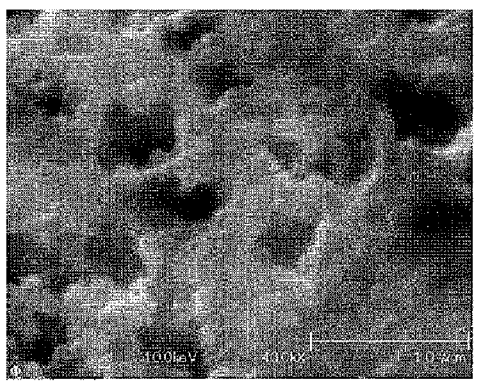
FIG. 14($a$) is an SEM image showing a cross section of an electrode of Example 1, and (b) and (c) are a carbon distribution image and a sulfur distribution image across that cross section.
Figure 14:
Figure 14:

In order to grasp the more detailed distribution state of the electrode active material in the active material layer of the positive electrode, an SEM observation of the cross section with 40000 magnifications and an element analysis by Auger electron spectroscopy (AES, Model670 manufactured by ULVAC-PHI, Inc.) were conducted. FIG. 14(a) shows a cross-sectional SEM image of the analyzed area, and FIGS. 14(b) and 14(c) show the carbon distribution image and the sulfur distribution image of the area corresponding to the cross-sectional SEM image.

In FIG. 14(b), areas where carbon is present are shown in black-and-white gray levels, with carbon-rich portions shown in white, and areas where no carbon is present are shown in black. From FIG. 14(b), particles deriving from the electrical conductivity assistant can be seen.

In FIG. 14(c), areas where sulfur is present are shown in black-and-white gray levels, with sulfur-rich portions shown in white, and areas where no sulfur is present are shown in black. From FIG. 14(c), the distribution of the electrode active material polymer can be seen. From FIGS. 14(b) and 14(c), the distribution of the active material such as to generally overlap the distribution of electrical conductivity assistant particles can be seen. It can also be seen that the sulfur element is distributed so as to cover the electrical conductivity assistant particles.

From these results, it can be seen that in Example 1, the electrode active material is covering the electrical conductivity assistant in the active material layer.

(2) Production of Electricity Storage Device

A negative electrode and an electrolyte solution were produced. Metal lithium (thickness: 300 μm) as a negative-electrode active material was stamped into a disk shape having a diameter of 15 mm, and was attached onto a current collector plate (made of stainless steel) of a disk shape also having a diameter of 15 mm, thus producing a negative electrode.

By using a solvent in which ethylene carbonate (EC) and ethyl methyl carbonate (EMC) were mixed at a volume ratio of 1:3, and dissolving lithium hexafluorophosphate therein so that the concentration is 1.25 mol/L as a salt, an electrolyte solution was produced. Note that the electrolyte solution was used in a form permeating the positive electrode, the negative electrode, and a porous polyethylene sheet (thickness: 20 μm).

The positive electrode, the negative electrode, and the electrolyte solution produced were accommodated in a case of a coin-type battery shown in FIG. 4; an opening of the case was pinched with a sealing plate having a gasket mounted thereon; and this was crimp sealed by a press machine, whereby a coin-type electricity storage device was obtained.

Example 2

(1) Production Of Positive Electrode

A polymer compound (hereinafter referred to as polymer compound 17) represented by formula (17) below was synthesized as a positive-electrode active material.

[FORMULA 61]

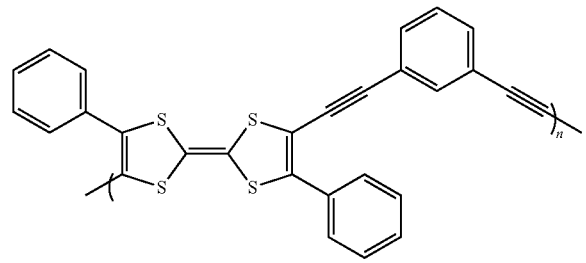

(17)

A polymer represented by chemical formula (17) was synthesized as a positive-electrode active material. Hereinafter, the polymer represented by chemical formula (17) will be represented as polymer compound 17.

(i). Synthesis of poly-(4,4'-diphenyltetrathiafulvalene)-(1,3-diethynylbenzene)copolymer (polymer compound 17)

A poly-(2,6-diphenyltetrathiafulvalene)-(1,3-diethynylbenzene)copolymer (polymer compound 17) of general formula (11) where X is S, R5 and R6 are phenyl groups, and R10 to R12 and R14 are hydrogen groups was synthesized by synthesizing Precursor compound 55 and by coupling the obtained compound 55 with compound 56 as shown in formula (R5) below. The method of synthesis will be shown below in a step-by-step manner.

[FORMULA 62]

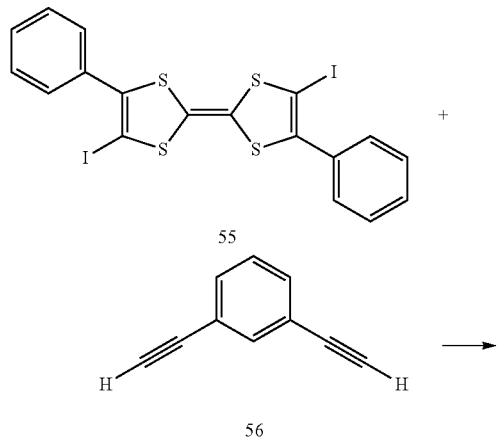

(R5)

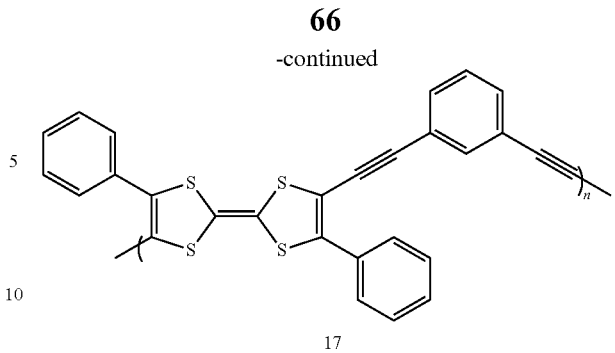

17

Synthesized compound 55 of compound 55 (4,4'-diiod-5,5'-diphenyltetrathiafulvalene) was synthesized according to formula (R6) below.

[FORMULA 63]

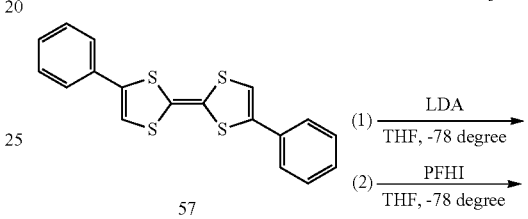

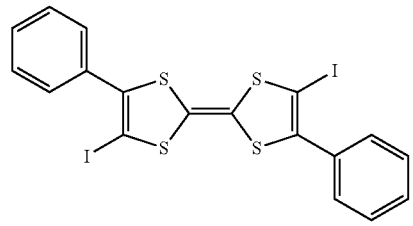

55

Under a nitrogen atmosphere, 2.8 ml of diisopropylamine and 15 ml of THF were placed in a 50-ml Schlenk tube, and kept at −78° C. 13.7 ml of butyllithium was added thereto, agitated for about 1 hour, thereby synthesizing lithium diisopropylamide (LDA). Then, under a nitrogen gas flow, at −78° C., 3.0 g of 4,4'-diphenyltetrathiafulvalene 57 (manufactured by Aldrich Co.) was added to a 100-ml Schlenk tube, dissolved in 25 ml or THF, and kept at −78° C. The LDA prepared earlier was slowly dripped into this solution and agitated for 30 minutes. Then, 9.33 g of perfluorohexyl diiod (4.5 ml) was dripped and agitated for 1 hour, and was further agitated for 1 hour at room temperature. After the reaction, distilled water was added to stop the reaction, and then filtering, cleaning, and re-crystallization were conducted, thereby obtaining red needle crystals. The yield was 52%.

The structure of the resultant compound was identified by H-NMR (CDCl$_3$) and IR measurement (KBr method). As a result of H-NMR, a chemical shift associated with the phenyl group was observed in the vicinity of 7.4-7.5 ppm. As a result of IR measurement, a peak associated with the C—H stretching vibration was observed in the vicinity of 3052 cm$^{-1}$. As a result of element analysis, the experimental values were 35.43 for carbon, 1.68 for hydrogen, 22.79 for sulfur, and 37.77 wt % for iodine, while the stoichiometric values are 35.53 for carbon, 1.64 for hydrogen, 21.05 for sulfur, and 41.78 wt % for iodine. From these results, it was confirmed that the resultant powder was compound 55.

(ii) Synthesis of Polymer Compound 17

Under a nitrogen atmosphere, 0.7 g (1.15 mmol) of compound 55 synthesized was taken into a 30-ml Schlenk tube, and 30 ml of THF was added thereto. To this, 10.95 mg (0.0575 mmol) of copper iodide was added, and 66.4 mg (0.0575 mmol, 1 ml) of tetrakis(triphenylphosphine)palladium (hereinafter, $Pd(PPh_3)_4$) was further added and agitated. To this solution, 0.0145 g (1.15 mmol) of 1,3-diethynylbenzene, which is compound 56, and 1 ml of triethylamine were added, and agitated for 24 hours at 60° C. Then, it was filtered, and the product was cleaned with 1N hydrochloric acid aqueous solution and ethanol, obtaining a polymer in reddish-brown powder after drying. The yield was 62%.

The structure of the resultant polymer was identified by molecular weight analysis with GPC and IR measurement. As a result of IR measurement (KBr method) on the resultant powder, peaks were observed in the vicinity of 692, 755, 793, 1031, 1076, 1442, 1473, 1595 and 2960 $cm^{-1}$. C—S stretching vibration associated with the TTF structure was observed in the vicinity of 800 to 650 $cm^1$.

GPC measurement of the resultant powder showed that the resultant product had three molecular weight distributions. The peak molecular weights were 37670, 1200 and 680, respectively, as calculated in equivalent polystyrene. As a result of IR measurement, and the like, it was inferred that the resultant product had a unit structure represented by polymer compound 17, but included a low polymer such as a monomer and a dimer. The product containing a low polymer was denoted as polymer compound 17'.

Purification was conducted in order to remove the low polymer from polymer compound 17'. 17 mg of polymer compound 17' was dissolved in 7 g of N-methylpyrrolidone, and this was dripped into 100 g of ethanol for reprecipitation. As the molecular weight distribution of the resultant product was measured, no peak was observed at molecular weights of 2000 or less, and the distribution of the molecular weight was about 2000 to 100000. The peak molecular weight was 38000. This product is denoted as polymer compound 17. Since the molecular weight of the repetition unit of polymer compound 17 is about 500, it can be seen that the degree of polymerization n of polymer compound 17 obtained is 4 or more.

A positive electrode was produced in a glow box of an argon atmosphere having a gas purifier, using polymer compound 17 synthesized in a similar manner to the synthesis method described above.

First, a mixture containing an aprotic solvent with polymer compound 17 dissolved therein and an electrical conductivity assistant was produced. In a mortar, 80 mg of polymer compound 17 was crushed, and 240 mg of NMP was added thereto as an aprotic solvent and mixed in the mortar, to dissolve polymer compound 17 in the aprotic solvent. The grain size distribution of polymer compound 17 within NMP was measured by a laser diffraction-scattering method, using SALD-7000 manufactured by Shimadzu Corporation. The measurement conditions were as follows: the measurement was conducted while setting the measured grain size range to 0.015 μm to 500 μm, the measurement interval to 2 seconds, and while agitating in the solvent using the attached agitation plate. As a result of the measurement, the diffraction/scattering intensity was not observed, and it was confirmed that there was no particles of 0.015 μm or more in NMP. A UV-vis measurement was conducted, and an absorption peak associated with a tetrathiafulvalene structure was confirmed near 300 nm, thereby confirming that the copolymer was present in NMP.

To the NMP with copolymer compound 17 dissolved therein, 256 mg of acetylene black which is an electrical conductivity assistant, 64 mg of polyvinylidene fluoride which is a binder agent, and 2.66 g of NMP were added, and mixed, thus producing a mixture.

Next, the resultant mixture was applied onto a current collector. An aluminum foil having a thickness of 20 μm was used as the current collector. The application of the mixture onto the aluminum foil was conducted by using a coater. The application was conducted while setting the gap width to 300 μm, and the scanning speed to 7 mm/sec.

Next, the aprotic solvent was removed. The mixture applied onto the aluminum foil was placed in a thermostat oven, and dried for 1 hour in an atmosphere at a temperature of 80° C., thereby removing the aprotic solvent. Moreover, it was cut by stamping into a disk shape with a diameter of 13.5 mm, thus producing a positive electrode.

Figure 15:
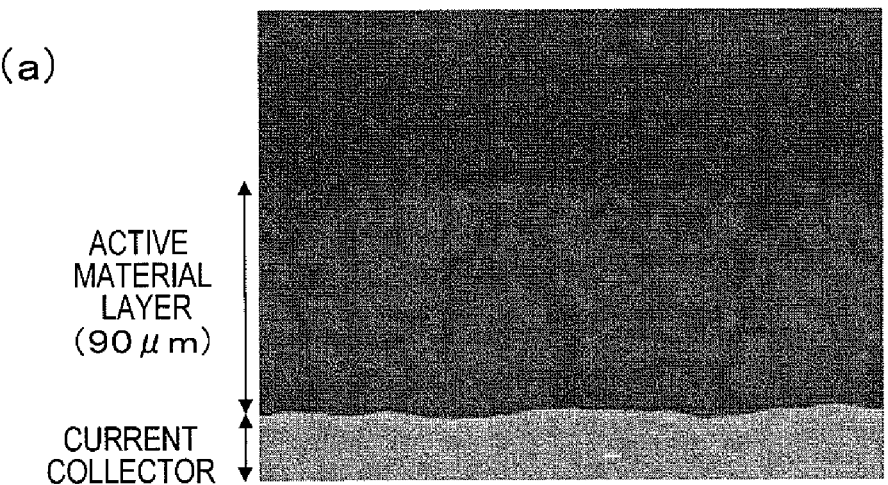
FIG. 15($a$) is an SEM image showing a cross section of an electrode of Example 2, and (b) is an image showing the distribution of sulfur across that cross section.
Figure 15:
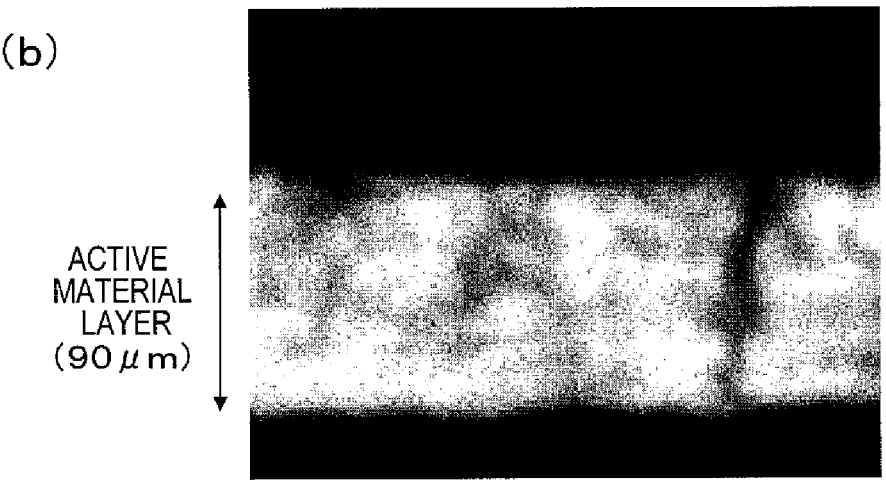

FIG. 15(a) shows a scanning electron microscope (SEM) image in the vicinity of the current collector of the produced positive electrode. The thickness of the positive-electrode active material layer of the produced positive electrode was 90 μm from the SEM image. The cross section of the produced positive electrode was observed, with 1000 magnifications, using an electron probe micro-analyzer (EPMA, JXA-8900 from JEOL Ltd.) for a sulfur distribution associated with the electrode active material. The measurement results are shown in FIG. 15(b). In FIG. 15(b), areas where sulfur is present are shown in black-and-white gray levels, with sulfur-rich portions shown in white, and areas where no sulfur is present are shown in black. From the measurement results, no active material particles of 1 μm or more were observed, and it was found that, with such magnifications as 1000 magnifications, sulfur was distributed uniformly across the electrode plate.

In order to grasp the more detailed distribution state of the electrode active material in the active material layer of the positive electrode, an SEM observation of the cross section with 40000 magnifications and an element analysis by Auger electron spectroscopy (AES, Model670 manufactured by ULVAC-PHI, Inc.) were conducted. As a result, the distribution of the active material such as to generally overlap the distribution of electrical conductivity assistant particles can be seen, and coating-like areas indicating the presence of sulfur was also seen on the surface of particles which are assumed to be the electrical conductivity assistant containing carbon. The areas are believed to be the electrode active material. Areas where no carbon is present were also seen in the active material layer. From these results, it is assumed that the surface of the electrical conductivity assistant is covered by an electrode active material, and that there are also gaps where neither the electrode active material nor the electrical conductivity assistant is present.

(2) Production of Electricity Storage Device

An electricity storage device was produced in a similar manner to Example 1, except that the positive-electrode plate described above was used as the positive electrode.

Comparative Example 1

(1) Production of Positive Electrode

As the positive-electrode active material, copolymer compound 39 was synthesized in a similar manner to Example 1. A positive electrode was produced by a manufacturing method to be described below, using copolymer compound 39 synthesized.

Figure 16:
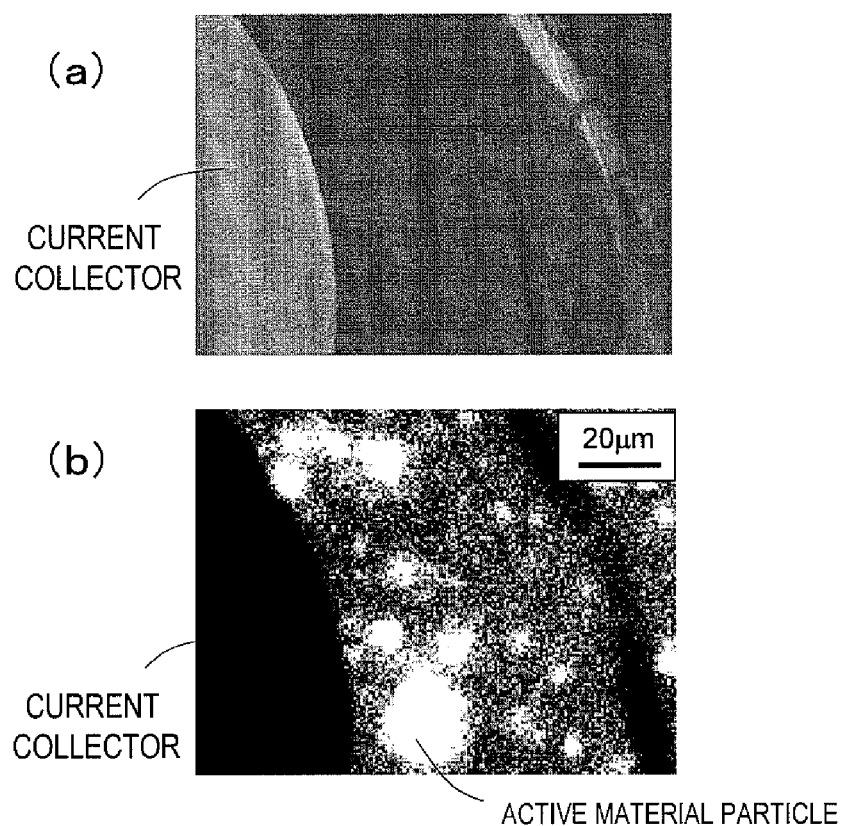
FIG. 16($a$) is an SEM image showing a cross section of an electrode of Comparative Example 1, and (b) is an image showing the distribution of sulfur across that cross section.

To 50 mg of copolymer compound 39, which has been crushed in a mortar, 400 mg of acetylene black was added, and these were homogeneously mixed; furthermore, 100 mg of polytetrafluoroethylene was added and mixed, whereby a positive-electrode active material mixture was obtained. This positive electrode mixture was crimped onto an aluminum grid, subjected to vacuum drying, and was cut by stamping into a disk shape with a diameter of 13.5 mm, thus producing a positive electrode. The particle diameter of copolymer compound 39 crushed in a mortar is about 5 to 20 μm. The cross section of the produced electrode plate was observed by an electron microscope and an electron probe micro-analyzer (EPMA) to measure the distribution of sulfur associated with the electrode active material. FIGS. 16(a) and 16(b) respectively show an SEM image showing, on an enlarged scale, an electrode active material portion of a cross section of the positive electrode of Comparative Example 1, and a sulfur distribution image by EPMA. As shown in FIG. 16(b), a granular sulfur distribution of about 5 μm to a maximum of 20 μm was observed by EPMA. This confirmed that the electrode active material was present in a granular form. Moreover, the thickness of the positive-electrode active material layer of the produced positive electrode was 90 μm. The weight of the positive-electrode active material was 0.2 mg/cm$^2$ per electrode plate unit area.

(2) Production of Electricity Storage Device

An electricity storage device was produced in a similar manner to Example 1, except that the positive electrode described above was used as the positive electrode.

Comparative Example 2

(1) Production of Positive Electrode

A positive-electrode plate was produced by a manufacturing method to be described below, using polymer compound 17 as the positive-electrode active material.

To 80 mg of a polymer compound, which has been crushed in a mortar, 256 mg of acetylene black was added, and these were homogeneously mixed; furthermore, 64 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate. The particle diameter of the copolymer compound crushed in a mortar is about 10 μm, and as the cross section of the produced electrode plate was measured by an electron probe micro-analyzer (EPMA) for the distribution of sulfur associated with the electrode active material, active material particles of about 10 μm were observed. The thickness of the positive-electrode active material layer of the produced positive-electrode plate was 90 μm.

(2) Production of Electricity Storage Device

An electricity storage device was produced in a similar manner to Example 1, except that the positive-electrode plate described above was used as the positive electrode.

Comparative Example 3

(1) Production of Positive Electrode

A polymer compound (hereinafter referred to as polymer compound 40) represented by formula (40) was synthesized as a positive-electrode active material. Polymer compound 40 does not contain the second units of the copolymer compound represented by formula (37), but is composed only of the first units having an oxidation-reduction site.

Polymer compound 40 was synthesized in split steps: synthesis of a tetrathiafulvalene precursor contained in the side chains, synthesis of a polymer main-chain compound, and coupling of tetrathiafulvalene to the polymer main-chain compound. These will be described in order below.

[FORMULA 64]

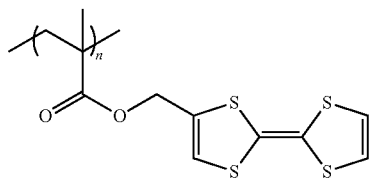

(40)

Synthesis of tetrathiafulvalene precursor 51 was conducted in a similar manner to Example 1. Synthesis of the copolymer main-chain compound was conducted by a route represented by formula (R7) below. As a monomer material, 50 g of methacryloyl chloride 52 (manufactured by Aldrich Co.) was mixed with 24 g of toluene (manufactured by Aldrich Co.), and 0.5 g of azoisobutyronitrile (manufactured by Aldrich Co.) was added as a polymerization initiator. Reaction was allowed to progress by agitating the mixture at 65° C. for 6 hours. It was confirmed with H-NMR, IR, and GPC that the product was the compound (hereinafter referred to as polymer main-chain compound 18) represented by formula (58).

[FORMULA 65]

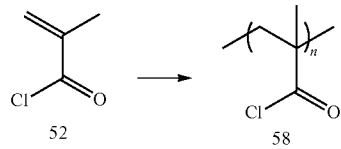

(58)

Coupling of tetrathiafulvalene precursor 51 to polymer main-chain compound 18 was effected by a route represented by formula (R8). Under an Ar gas flow, 3.4 g of tetrathiafulvalene precursor 51 and 88 cc of tetrahydrofuran were placed in a reaction vessel, and agitated at room temperature. To the reaction solution, 0.574 g of NaH (60 wt % in mineral oil) (manufactured by Aldrich Co.) was added dropwise over 20 minutes, and while this was agitated at 40° C. for 1 hour, a solution in which 1.0 g of polymer main-chain compound 58 had been dissolved in 15 cc of tetrahydrofuran was mixed. Reaction was allowed to progress by agitating the mixed solution at 80° C. overnight. The solution obtained in this manner was concentrated, and after 50 cc of water was placed in the resultant solid and agitated, it was filtrated; the resultant solid was placed in 50 cc of methanol and agitated, and subjected to filtration. The resultant solid was cleaned with hexane, and after being cleaned with methanol, dried under reduced pressure at 40° C. for 5 hours, thus obtaining 2.2 g of product. It was confirmed with H-NMR, IR, and GPC that the resultant product was polymer compound 40. Synthesized polymer compound 40 had a weight-average molecular weight of approximately 44000. As a result of sulfur element analysis of synthesized polymer compound 40, the sulfur content was found to be 38.9 wt %.

Based on the sulfur content, the stoichiometric capacity of polymer compound 40 is calculated to be 168 mAh/g.

[FORMULA 66]

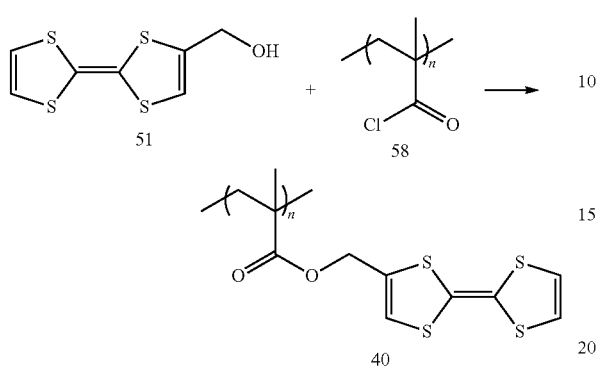

(R8)

A positive electrode was produced in a similar manner to Example 1, except that polymer compound 40 was used as the positive-electrode active material. Polymer compound 40 was added to, and mixed with, NMP, which is an aprotic solvent, and then the grain size distribution of polymer compound 40 within NMP was measured, thereby confirming that particles of about 5 to 20 μm were present. Also, it was visually confirmed that polymer compound 40 was not dissolved in NMP.

Figure 17:
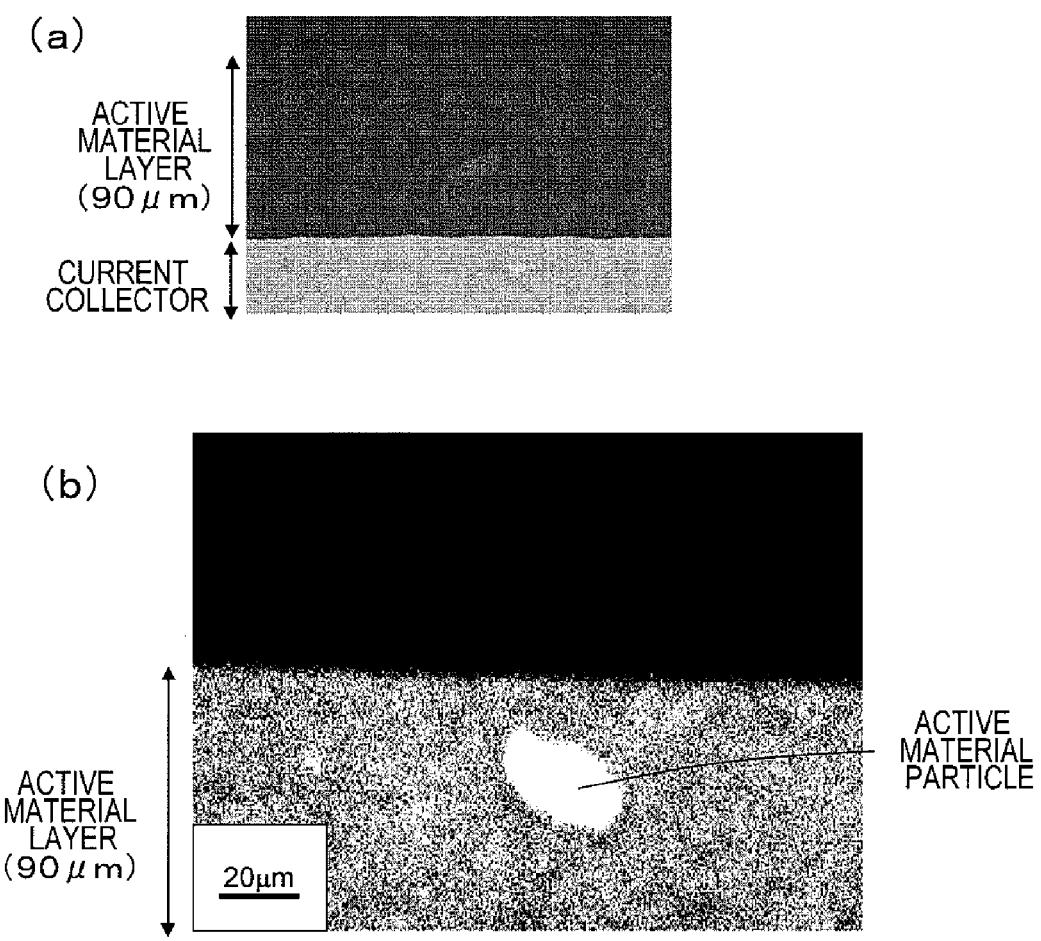
FIG. 17($a$) is an SEM image showing a cross section of an electrode of Comparative Example 3, and (b) is an image showing the distribution of sulfur across that cross section.

The cross section of the produced positive electrode was observed with an electron microscope and an electron probe micro-analyzer (EPMA) to measure the distribution of sulfur associated with the electrode active material. FIGS. 17(a) and 17(b) respectively show an SEM image showing, on an enlarged scale, an electrode active material portion of a cross section of the positive electrode of Comparative Example 2, and a sulfur distribution image by EPMA. As shown in FIG. 17(b), a granular sulfur distribution of about a maximum of 20 μm was observed by EPMA. It was confirmed from this that the active material is present in a granular form. Moreover, the thickness of the positive-electrode active material layer of the produced positive electrode was 90 μm. The weight of the positive-electrode active material was 0.2 mg/cm² per electrode plate unit area.

(2) Production of Electricity Storage Device

An electricity storage device was produced in a similar manner to Example 1, except that the positive electrode described above was used as the positive electrode.

Comparative Example 4

(1) Production of Positive Electrode

A positive electrode was produced in a similar manner to Comparative Example 1, except that polymer compound 40 was used as the positive-electrode active material.

The cross section of the produced positive electrode was observed by an electron probe micro-analyzer (EPMA) to measure the distribution of sulfur associated with the electrode active material, observing active material particles of about 5 to 20 μm. The thickness of the positive-electrode active material layer of the positive electrode was 90 μm. The weight of the positive-electrode active material was 0.2 mg/cm² per electrode plate unit area.

(2) Production of Electricity Storage Device

An electricity storage device was produced in a similar manner to Example 1, except that the positive electrode described above was used as the positive electrode.

Comparative Example 5

(1) Production of Positive Electrode

A polymer compound (hereinafter referred to as polymer compound 41) represented by formula (41) was synthesized. Polymer compound 41 is a compound that does not contain the second units, but is composed only of the first units having an oxidation-reduction site.

[FORMULA 67]

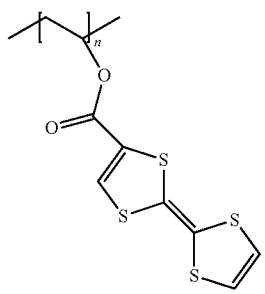

(41)

Polymer compound 41 was synthesized by allowing polyvinyl alcohol and tetrathiafulvalene carboxyl derivative to react through dehydration condensation. Polymer compound being used had a weight-average molecular weight of approximately 50000. As a result of sulfur element analysis of synthesized polymer compound 41, the sulfur content was found to be 45.3 wt %. Based on the sulfur content, the stoichiometric capacity of polymer compound 41 is calculated to be 196 mAh/g.

A positive electrode was produced in a similar manner to Comparative Example 1, except that polymer compound 41 was used as the positive-electrode active material.

(2) Production of Electricity Storage Device

An electricity storage device was produced in a similar manner to Example 1, except that the positive electrode described above was used as the positive electrode.

2. Evaluation of Characteristics of Electricity Storage Device

Charge-discharge capacity evaluation and output power evaluation were conducted for electricity storage devices of Example 1 and Comparative Examples 1-4. The charge-discharge capacity evaluation of each electricity storage device was made based on a value obtained by dividing a charge-discharge capacity at the initial charging and discharging by the active material weight, i.e., charge-discharge capacity per unit weight of active material. The charging and discharging was performed via 0.1 mA constant-current charging and discharging. The charging and discharging conditions were as follows: the charge upper limit voltage was 4.0 V and the charge lower limit voltage was 3.0 V. The downtime after finishing charging and before beginning discharging was zero.

Output power evaluation was performed by resistance value evaluation and large-current charge-discharge capacity evaluation. Resistance value evaluation was performed using the resistance value obtained by 1-Hz alternating current impedance measurement in a discharged state after repeating charging and discharging three times. The measurement condition of the alternating current impedance measurement was as follows: the voltage amplitude was 10 mV. The charging and discharging conditions were as follows: the charge upper limit voltage was 4.0 V and the charge lower limit voltage was 3.0 V. The downtime after finishing charging and before beginning discharging, and the amount of time after finishing discharging and before beginning charging were zero, and a 0.1 mA constant-current charging and discharging was used. The large-current charge-discharge capacity was evaluated based on a value obtained by dividing the discharge capacity for 3 mA constant-current discharging by the discharge capacity for 0.1 mA constant-current discharging, i.e., the capacity retention rate for 3 mA constant-current discharging with respect to that for 0.1 mA constant-current discharging. The charging and discharging conditions were as follows: the charge upper limit voltage was 4.0 V and the charge lower limit voltage was 3.0 V, and the charging was 0.1 mA constant-current charging.

The results of the charge-discharge capacity evaluation for the electricity storage devices of Examples 1 and 2 and Comparative Examples 1-5 and the results of the output power characteristics evaluation are all shown in Table 1.

TABLE 1

| | Charge-discharge capacity evaluation | | | Output power characteristics evaluation |
|---|---|---|---|---|
| | 0.1 mA charging and discharging charge-discharge capacity [mAh/g] | Charge-discharge capacity rate [% vs stoichiometric capacity] | Resistance value [Ω] | 3 mA charging and discharging capacity retention rate [%] |
| Example 1 | 115 | 92 | 68.7 | 63 |
| Example 2 | 101 | 96 | 29.2 | 75 |
| Comparative Example 1 | 109 | 87 | 255.6 | 3 |
| Comparative Example 2 | 103 | 98 | 328.9 | 2 |
| Comparative Example 3 | 139 | 83 | 283.3 | 2 |
| Comparative Example 4 | 139 | 83 | 286.7 | 2 |
| Comparative Example 5 | 188 | 96 | 296.4 | 2 |

As shown in Table 1, the resistance value is significantly reduced in Example 1 and Example 2 as compared with Comparative Examples 1-5. Since Example 1 and Example 2 and Comparative Examples 1-5 are different from each other only in terms of the positive electrode, the reduction of resistance value in Example 1 and Example 2 is due to reduction of the resistance value of the positive electrode.

Example 1 and Comparative Example 1, and Example 2 and Comparative Example 2, each use the same compound as the electrode active material, and differ from each other only in terms of the manufacturing method of the positive electrode and the structure of the active material. Specifically, in Example 1 and Example 2, the electrode active material is dissolved in a solvent, whereby polymer compound 4 and polymer compound 17, which are electrode active materials, cover the surface of the electrical conductivity assistant, and are present while being dispersed in the active material layer. In contrast, in Comparative Example 1 and Comparative Example 2, the electrode active material is present as particles. Therefore, it is believed that copolymer compound 39 or polymer compound 17, as a whole, in the active material layer is more likely to undergo oxidation reactions in Example 1 and Example 2, and the reaction resistance of the active material is more reduced as compared with Comparative Example 1, thereby reducing the resistance of the electricity storage device.

The positive-electrode active materials used in Comparative Examples 3 and 4 are all polymer compound 40, but Comparative Examples 3 and 4 differ from each other in terms of the method for forming the positive-electrode active material layer. In Comparative Example 3, as in Example 1, polymer compound 40 is mixed with NMP, and the mixture is applied onto the positive current collector, but since polymer compound 40 has a low solubility, polymer compound 40 was not dissolved but polymer compound 40 was present as particles in the positive-electrode active material layer. In Comparative Example 4, as in Comparative Example 1, the addition is made in the form of particles to the positive-electrode active material layer. Thus, it is believed that although they differ from each other in terms of the manufacturing method but both have polymer compound 40 in the form of particles in the positive-electrode active material layer, whereby as in Comparative Example 1, the active material has a high reaction resistance, and the electricity storage device has a high resistance value.

As shown in Table 1, a capacity of 63% was retained for 3 mA constant-current discharging in Example 1 and a capacity of 75% was retained for 3 mA constant-current discharging in Example 2, whereas Comparative Examples 1-5 had discharge capacities of 5% or less. It is believed that this is due to the high resistance value of the electricity storage device. It is believed that in Comparative Examples 1-5, since the voltage drop during large-current discharge is large, the reduction potential is 3.0 V or less and the discharge capacity is 5% or less, whereas in Example 1 and Example 2, the voltage drop is small, and the reduction potential is 3.0 V or less, whereby the capacity retention rate is high even during discharge at 3 mA. Thus, it was confirmed that it is possible to realize an electricity storage device having a high output power by using an electrode of the present invention.

Copolymer compound 39 in which the constituent ratio m/n of the second unit (the methacrylate site) with respect to the first unit (the unit including a tetrathiafulvalene site which is an oxidation-reduction site) is 5 was also synthesized, and it was confirmed that the compound is soluble in NMP (an aprotic polar solvent), and that it is possible to obtain an electrode having a structure in which the electrode active material is covering the electrical conductivity assistant in the active material layer. Also as to the electrode characteristics, it was confirmed that it is possible to obtain an output power characteristic as high as that of a copolymer where m/n=1. It was confirmed from the above that it is possible to increase the charge density and to allow oxidation-reduction reactions to occur stably and repeatedly if the constituent ratio m/n of the number m of second units with respect to the number n of first units of the copolymer compound is greater than 0, and the constituent ratio m/n is 5 or less.

(II) Evaluation of Mixing Proportion of Electrode Active Material in Active Material Layer Next, results of producing electrodes of different active material percentages and electricity storage devices using the same, and evaluating the characteristics of the electricity storage devices, in order to confirm the effect of the mixing proportion of the electrode active material in the active material layer in an electrode of the present invention, will be described in detail.

1. Production of electrode and electricity storage device

Example 3

(1) Production of Positive Electrode

A positive electrode was produced by the same method as Example 1, except that copolymer compound 39 was used as the electrode active material and the application gap width was set to 150 μm. A plane aluminum foil that had not been subjected to an electrolytic etching process was used as a positive current collector. A plane aluminum foil as used herein means a flat and smooth aluminum foil with little surface irregularities in which the average roughness (Ra) is 0.5 μm or less, the maximum height (Ry) is 2.0 μm or less and the ten-point average roughness (Rz) is 1.0 μm or less, as defined in JIS B 0601-1994. The plane aluminum foil used in this comparative example had a thickness of 20 μm, an average roughness (Ra) of 0.1 μm, a maximum height (Ry) of 0.6 μm, and a ten-point average roughness (Rz) of 0.6 μm.

The thickness of the active material layer of the obtained positive electrode was 40 μm. The mixing proportion of the active material layer was: 6 wt % of the electrode active material, 75 wt % of the electrical conductivity assistant, and 19 wt % of the binder agent. The obtained positive electrode was cut by stamping into a disk shape with a diameter of 13.5 mm for use.

(2) Production of Electricity Storage Device

A coin-type battery 201 having a structure shown in FIG. 4 was produced. The electrode described above was used as the positive electrode 31, composed of the positive current collector 22 and the positive-electrode active material layer 23, and the positive electrode was placed in the case 21 so that the positive current collector 22 is in contact with the inner surface of the case 21, with the separator 24 made of a porous polyethylene sheet provided thereon. Then, a nonaqueous electrolyte was injected into a case 28. As the nonaqueous solvent electrolyte, an electrolyte solution in which a lithium hexafluorophosphate had been dissolved, at a 1 mol/l concentration, in a mixed solvent containing ethylene carbonate and ethyl methyl carbonate at a weight ratio of 1:3, was used. On the other hand, the negative current collector 27 and the negative-electrode active material layer 26 were crimped in this order onto the inner surface of a sealing plate 25. The positive electrode 31, the negative electrode 32, and an electrolyte solution 28 were accommodated in a case of a coin-type battery shown in FIG. 4; an opening of the case was pinched with a sealing plate having a gasket mounted thereon; and this was crimp sealed by a press machine, whereby a coin-type electricity storage device was obtained.

Note that a graphite electrode having a thickness of 40 μm applied on the negative current collector 27 made of a copper foil having a thickness of 20 μm was used as the negative-electrode active material layer 26. The graphite negative electrode 32 was cut by stamping into a disk shape with a diameter of 13.5 mm for use.

Note that for the graphite electrode, a Li metal counter electrode was used, and preliminary charging and discharging was performed over three cycles with an electric current value of 0.4 mA/cm$^2$ between the lower limit of 0 V and the upper limit of 1.5 V (the lithium reference potential), thereby confirming that it has a reversible capacity of 1.6 mAh/cm$^2$ per unit area and it can be charged and discharged reversibly. For the graphite electrode, one that had been charged to 70% of the reversible capacity, i.e., in a state where it is pre-doped with lithium, was used. For confirming the charging and discharging of the graphite electrode and for the pre-doping of lithium, the same electrolyte solution as that used in the electricity storage device and a separator made of a porous polyethylene sheet were used.

Example 4

(1) Production of Positive Electrode

A positive electrode was produced by the same method as Example 3, except that the mixing proportion of copolymer compound 39 in the active material layer was different.

The thickness of the active material layer of the obtained positive electrode was 40 μm. The mixing proportion in the active material layer was: 20 wt % of the electrode active material, 64 wt % of the electrical conductivity assistant, and 16 wt % of the binder agent. The obtained positive electrode was cut by stamping into a disk shape with a diameter of 13.5 mm for use.

(2) Production of Electricity Storage Device

An electricity storage device was produced in a similar manner to Example 3, except that the positive-electrode plate described above was used as the positive electrode.

Example 5

(1) Production of Positive Electrode

A positive electrode was produced by the same method as Example 3, except that the mixing proportion of copolymer compound 39 in the active material layer was different.

The thickness of the active material layer of the obtained positive electrode was 40 μm. The mixing proportion in the active material layer was: 30 wt % of the active material, 56 wt % of the electrical conductivity assistant, and 14 wt % of the binder agent. The obtained positive electrode was cut by stamping into a disk shape with a diameter of 13.5 mm for use.

(2) Production of Electricity Storage Device

An electricity storage device was produced in a similar manner to Example 3, except that the positive-electrode plate described above was used as the positive electrode.

Example 6

(1) Production of Positive Electrode

A positive electrode was produced by the same method as Example 3, except that the mixing proportion of copolymer compound 39 in the active material layer was different.

The thickness of the active material layer of the obtained positive electrode was 40 μm. The mixing proportion in the active material layer was: 50 wt % of the electrode active material, 40 wt % of the electrical conductivity assistant, and 10 wt % of the binder agent. The obtained positive electrode was cut by stamping into a disk shape with a diameter of 13.5 mm for use.

(2) Production of Electricity Storage Device

An electricity storage device was produced in a similar manner to Example 3, except that the positive-electrode plate described above was used as the positive electrode.

Example 7

(1) Production of Positive Electrode

A positive-electrode plate was produced by a manufacturing method to be described below, using polymer compound 17 as the positive-electrode active material.

First, a mixture containing an aprotic solvent with polymer compound 17 dissolved therein and an electrical conductivity assistant was produced. In a mortar, 40 mg of polymer compound 17 was crushed, and 120 mg of NMP was added thereto as an aprotic solvent and mixed in the mortar, to dissolve polymer compound 17 in the aprotic solvent. The grain size distribution of polymer compound 17 within NMP was measured in a similar manner to Example 1, confirming that there were no particles of 0.015 µm or more in NMP. A UV-vis measurement was conducted, and an absorption peak associated with a tetrathiafulvalene structure was confirmed near 300 nm, thereby confirming that the copolymer was present in NMP.

To the NMP with copolymer compound 17 dissolved therein, 288 mg of acetylene black which is an electrical conductivity assistant, 72 mg of polyvinylidene fluoride which is a binder agent, and 2.78 g of NMP were added, and mixed, thus producing a mixture.

The resultant mixture was applied onto a current collector in a similar manner to Example 1 and dried to remove the aprotic solvent, and it was cut by stamping into a disk shape with a diameter of 13.5 mm for use. The mixing proportion of the active material layer of the obtained positive electrode was: 10 wt % of the electrode active material, 72 wt % of the electrical conductivity assistant, and 18 wt % of the binder agent.

Figure 18:
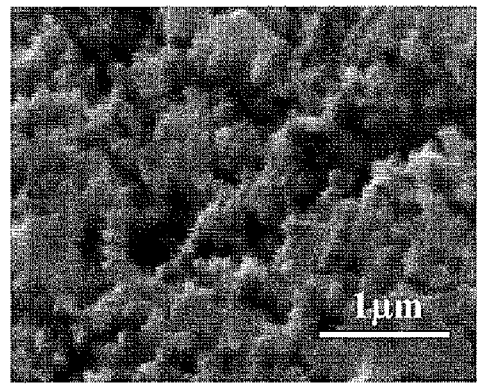
FIG. 18($a$) is an SEM image showing a cross section of an electrode of Example 7, and (b) and (c) are a carbon distribution image and a sulfur distribution image across that cross section.
Figure 18:
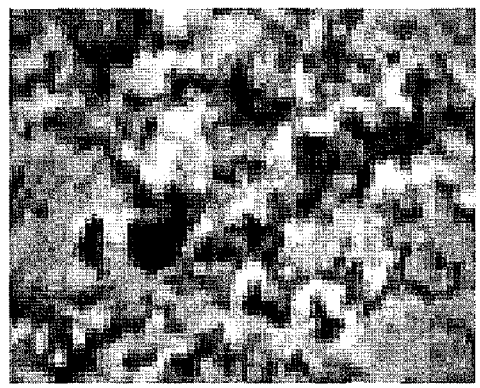
Figure 18:
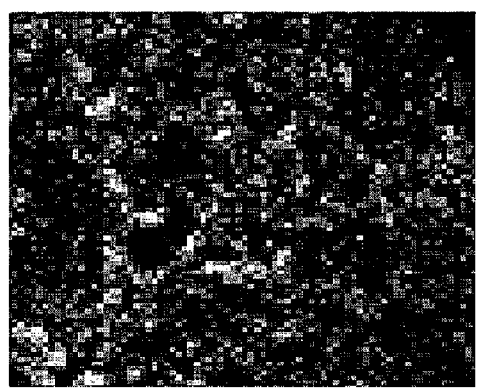

Cross-sectional SEM observation and AES analysis of the positive-electrode active material layer of the produced positive electrode were conducted in a similar manner to Example 1. FIG. 18(a) shows a cross-sectional SEM image of the analyzed area, and FIGS. 18(b) and 18(c) show the carbon distribution image and the sulfur distribution image of the area corresponding to the cross-sectional SEM image, obtained by Auger electron spectroscopy. Based on the cross-sectional SEM observation, the thickness of the active material layer was 90 µm. Based on the carbon distribution image and the sulfur distribution image, it was confirmed that there were no electrode active material particles of 1 µm or more and that the electrode active material was covering the electrical conductivity assistant in the active material layer.

(2) Production of Electricity Storage Device

An electricity storage device was produced in a similar manner to Example 3, except that the positive electrode described above was used as the positive electrode.

Example 8

(1) Production of Positive Electrode

In Example 8, the same positive-electrode plate as that of Example 7, except for the mixing proportion between the electrode active material, the electrical conductivity assistant and the binder agent in the positive electrode, was produced as follows.

First, a mixture containing an aprotic solvent with polymer compound 17 dissolved therein and an electrical conductivity assistant was produced. In a mortar, 80 mg of polymer compound 17 was crushed, and 240 mg of NMP was added thereto as an aprotic solvent and mixed in the mortar, to dissolve polymer compound 17 in the aprotic solvent. The grain size distribution of polymer compound 17 within NMP was measured in a similar manner to Example 1, confirming that there were no particles of 0.015 µm or more in NMP. A UV-vis measurement was conducted, and an absorption peak associated with a tetrathiafulvalene structure was confirmed near 300 nm, thereby confirming that the copolymer was present in NMP.

To the NMP with copolymer compound 17 dissolved therein, 256 mg of acetylene black which is an electrical conductivity assistant, 64 mg of polyvinylidene fluoride which is a binder agent, and 2.66 g of NMP were added, and mixed, thus producing a mixture.

The resultant mixture was applied onto a current collector in a similar manner to Example 1 and dried to remove the aprotic solvent, and it was cut by stamping into a disk shape with a diameter of 13.5 mm for use. The mixing proportion of the active material layer of the obtained positive electrode was: 20 wt % of the electrode active material, 64 wt % of the electrical conductivity assistant, and 16 wt % of the binder agent.

Cross-sectional SEM observation and AES analysis of the positive-electrode active material layer of the produced positive electrode were conducted in a similar manner to Example 1. Based on the cross-sectional SEM observation, the thickness of the active material layer was 90 µm. It was confirmed that there were no electrode active material particles of 1 µm or more and that the electrode active material was covering the electrical conductivity assistant in the active material layer.

(2) Production of Electricity Storage Device

An electricity storage device was produced in a similar manner to Example 3, except that the positive electrode described above was used as the positive electrode.

Example 9

(1) Production of Positive Electrode

In Example 9, the same positive-electrode plate as that of Example 7, except for the mixing proportion between the electrode active material, the electrical conductivity assistant and the binder agent in the positive electrode, was produced as follows.

First, a mixture containing an aprotic solvent with polymer compound 17 dissolved therein and an electrical conductivity assistant was produced. In a mortar, 120 mg of polymer compound 17 was crushed, and 360 mg of NMP was added thereto as an aprotic solvent and mixed in the mortar, to dissolve polymer compound 17 in the aprotic solvent. The grain size distribution of polymer compound 17 within NMP was measured in a similar manner to Example 1, confirming that there were no particles of 0.015 µm or more in NMP. A UV-vis measurement was conducted, and an absorption peak associated with a tetrathiafulvalene structure was confirmed near 300 nm, thereby confirming that the copolymer was present in NMP.

To the NMP with copolymer compound 17 dissolved therein, 224 mg of acetylene black which is an electrical conductivity assistant, 56 mg of polyvinylidene fluoride which is a binder agent, and 2.54 g of NMP were added, and mixed, thus producing a mixture.

The resultant mixture was applied onto a current collector in a similar manner to Example 1 and dried to remove the aprotic solvent, and it was cut by stamping into a disk shape with a diameter of 13.5 mm for use. The mixing proportion of the active material layer of the obtained positive electrode was: 30 wt % of the electrode active material, 56 wt % of the electrical conductivity assistant, and 14 wt % of the binder agent.

Cross-sectional SEM observation and AES analysis of the positive-electrode active material layer of the produced positive electrode were conducted in a similar manner to Example 1. Based on the cross-sectional SEM observation, the thickness of the active material layer was 90 μm. It was confirmed that there were no electrode active material particles of 1 μm or more and that the electrode active material was covering the electrical conductivity assistant in the active material layer.

(2) Production of Electricity Storage Device

An electricity storage device was produced in a similar manner to Example 3, except that the positive electrode described above was used as the positive electrode.

Example 10

(1) Production of Positive Electrode

In Example 10, the same positive-electrode plate as that of Example 7, except for the mixing proportion between the electrode active material, the electrical conductivity assistant and the binder agent in the positive electrode, was produced as follows.

First, a mixture containing an aprotic solvent with polymer compound 17 dissolved therein and an electrical conductivity assistant was produced. In a mortar, 200 mg of polymer compound 17 was crushed, and 600 mg of NMP was added thereto as an aprotic solvent and mixed in the mortar, to dissolve polymer compound 17 in the aprotic solvent. The grain size distribution of polymer compound 17 within NMP was measured in a similar manner to Example 1, confirming that there were no particles of 0.015 μm or more in NMP. A UV-vis measurement was conducted, and an absorption peak associated with a tetrathiafulvalene structure was confirmed near 300 nm, thereby confirming that the copolymer was present in NMP.

To the NMP with copolymer compound 17 dissolved therein, 160 mg of acetylene black which is an electrical conductivity assistant, 40 mg of polyvinylidene fluoride which is a binder agent, and 2.3 g of NMP were added, and mixed, thus producing a mixture.

The resultant mixture was applied onto a current collector in a similar manner to Example 1 and dried to remove the aprotic solvent, and it was cut by stamping into a disk shape with a diameter of 13.5 mm for use. The mixing proportion of the active material layer of the obtained positive electrode was: 50 wt % of the electrode active material, 40 wt % of the electrical conductivity assistant, and 10 wt % of the binder agent.

Cross-sectional SEM observation and AES analysis of the positive-electrode active material layer of the produced positive electrode were conducted in a similar manner to Example 1. Based on the cross-sectional SEM observation, the thickness of the active material layer was 90 μm. It was confirmed that there were no electrode active material particles of 1 μm or more and that the electrode active material was covering the electrical conductivity assistant in the active material layer.

(2) Production of Electricity Storage Device

An electricity storage device was produced in a similar manner to Example 3, except that the positive electrode described above was used as the positive electrode.

Comparative Example 6

(1) Production of Positive Electrode

A positive-electrode plate was produced by a manufacturing method to be described below, using copolymer compound 39 as the positive-electrode active material.

To 24 mg of a copolymer compound, which has been crushed in a mortar, 300 mg of acetylene black was added, and these were homogeneously mixed; furthermore, 76 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate. The particle diameter of the copolymer compound crushed in a mortar is about 10 μm, and as the cross section of the produced electrode plate was measured by an electron probe micro-analyzer (EPMA) for the distribution of sulfur associated with the electrode active material, active material particles of about 10 μm were observed. The thickness of the positive-electrode active material layer of the produced positive-electrode plate was 40 μm. The mixing proportion of the active material layer of the obtained positive electrode was: 6 wt % of the electrode active material, 75 wt % of the electrical conductivity assistant, and 19 wt % of the binder agent.

(2) Production Of Electricity Storage Device

An electricity storage device was produced in a similar manner to Example 3, except that the positive-electrode plate described above was used as the positive electrode.

Comparative Example 7

(1) Production of Positive Electrode

A positive-electrode plate was produced by a manufacturing method to be described below in a manner similar to Comparative Example 6, except that copolymer compound 39 was used as the positive-electrode active material, and that the mixing proportion between the electrode active material, the electrical conductivity assistant and the binder agent was different.

To 80 mg of a copolymer compound, which has been crushed in a mortar, 256 mg of acetylene black was added, and these were homogeneously mixed; furthermore, 64 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate. The particle diameter of the copolymer compound crushed in a mortar is about 10 μm, and as the cross section of the produced electrode plate was measured by an electron probe micro-analyzer (EPMA) for the distribution of sulfur associated with the electrode active material, active material particles of about 10 μm were observed. The thickness of the positive-electrode active material layer of the produced positive-electrode plate was 40 μm. The mixing proportion of the active material layer of the obtained positive electrode was: 20 wt % of the electrode active material, 64 wt % of the electrical conductivity assistant, and 16 wt % of the binder agent.

(2) Production of Electricity Storage Device

An electricity storage device was produced in a similar manner to Example 3, except that the positive-electrode plate described above was used as the positive electrode.

Comparative Example 8

(1) Production of Positive Electrode

A positive-electrode plate was produced by a manufacturing method to be described below in a manner similar to Comparative Example 6, except that copolymer compound 39 was used as the positive-electrode active material, and that the mixing proportion between the electrode active material, the electrical conductivity assistant and the binder agent was different.

To 120 mg of a copolymer compound, which has been crushed in a mortar, 224 mg of acetylene black was added, and these were homogeneously mixed; furthermore, 56 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate. The particle diameter of the copolymer compound crushed in a mortar is about 10 μm, and as the cross section of the produced electrode plate was measured by an electron probe micro-analyzer (EPMA) for the distribution of sulfur associated with the electrode active material, active material particles of about 10 μm were observed. The thickness of the positive-electrode active material layer of the produced positive-electrode plate was 40 μm. The mixing proportion of the active material layer of the obtained positive electrode was: 30 wt % of the electrode active material, 56 wt % of the electrical conductivity assistant, and 14 wt % of the binder agent.

(2) Production of electricity storage device

An electricity storage device was produced in a similar manner to Example 3, except that the positive-electrode plate described above was used as the positive electrode.

Comparative Example 9

(1) Production of Positive Electrode

A positive-electrode plate was produced by a manufacturing method to be described below in a manner similar to Comparative Example 6, except that copolymer compound 39 was used as the positive-electrode active material, and that the mixing proportion between the electrode active material, the electrical conductivity assistant and the binder agent was different.

To 200 mg of a copolymer compound, which has been crushed in a mortar, 160 mg of acetylene black was added, and these were homogeneously mixed; furthermore, 40 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate. The particle diameter of the copolymer compound crushed in a mortar is about 10 μm, and as the cross section of the produced electrode plate was measured by an electron probe micro-analyzer (EPMA) for the distribution of sulfur associated with the electrode active material, active material particles of about 10 μm were observed. The thickness of the positive-electrode active material layer of the produced positive-electrode plate was 40 μm. The mixing proportion of the active material layer of the obtained positive electrode was: 50 wt % of the electrode active material, 40 wt % of the electrical conductivity assistant, and 10 wt % of the binder agent.

(2) Production of Electricity Storage Device

An electricity storage device was produced in a similar manner to Example 3, except that the positive-electrode plate described above was used as the positive electrode.

Comparative Example 10

(1) Production of Positive Electrode

A positive-electrode plate was produced by a manufacturing method to be described below, using polymer compound 17 as the positive-electrode active material.

To 40 mg of a polymer compound, which has been crushed in a mortar, 288 mg of acetylene black was added, and these were homogeneously mixed; furthermore, 72 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate. The particle diameter of the copolymer compound crushed in a mortar is about 10 μm, and as the cross section of the produced electrode plate was measured by an electron probe micro-analyzer (EPMA) for the distribution of sulfur associated with the electrode active material, active material particles of about 10 μm were observed. The thickness of the positive-electrode active material layer of the produced positive-electrode plate was 90 μm. The mixing proportion of the active material layer of the obtained positive electrode was: 10 wt % of the electrode active material, 72 wt % of the electrical conductivity assistant, and 18 wt % of the binder agent.

(2) Production of Electricity Storage Device

An electricity storage device was produced in a similar manner to Example 3, except that the positive-electrode plate described above was used as the positive electrode.

Comparative Example 11

(1) Production of Positive Electrode

A positive-electrode plate was produced by a manufacturing method to be described below in a manner similar to Comparative Example 10, except that polymer compound 17 was used as the positive-electrode active material, and that the mixing proportion between the electrode active material, the electrical conductivity assistant and the binder agent was different.

To 80 mg of a polymer compound, which has been crushed in a mortar, 256 mg of acetylene black was added, and these were homogeneously mixed; furthermore, 64 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate. The particle diameter of the copolymer compound crushed in a mortar is about 10 μm, and as the cross section of the produced electrode plate was measured by an electron probe micro-analyzer (EPMA) for the distribution of sulfur associated with the electrode active material, active material particles of about 10 μm were observed. The thickness of the positive-electrode active material layer of the produced positive-electrode plate was 90 μm. The mixing proportion of the active material layer of the obtained positive electrode was: 20 wt % of the electrode active material, 64 wt % of the electrical conductivity assistant, and 16 wt % of the binder agent.

(2) Production of Electricity Storage Device

An electricity storage device was produced in a similar manner to Example 3, except that the positive-electrode plate described above was used as the positive electrode.

Comparative Example 12

(1) Production of Positive Electrode

A positive-electrode plate was produced by a manufacturing method to be described below in a manner similar to Comparative Example 10, except that polymer compound 17 was used as the positive-electrode active material, and that the mixing proportion between the electrode active material, the electrical conductivity assistant and the binder agent was different.

To 120 mg of a polymer compound, which has been crushed in a mortar, 224 mg of acetylene black was added, and these were homogeneously mixed; furthermore, 56 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate. The particle diameter of the copolymer compound crushed in a mortar is about 10 μm, and as the cross section of the produced electrode plate was measured by an electron probe micro-analyzer (EPMA) for the distribution of sulfur associated with the electrode active material, active material particles of about 10 μm were observed. The thickness of the positive-electrode active material layer of the produced positive-electrode plate was 90 μm. The mixing proportion of the active material layer of the obtained positive electrode was: 30 wt % of the electrode active material, 56 wt % of the electrical conductivity assistant, and 14 wt % of the binder agent.

(2) Production of Electricity Storage Device

An electricity storage device was produced in a similar manner to Example 3, except that the positive-electrode plate described above was used as the positive electrode.

Comparative Example 13

(1) Production of Positive Electrode

A positive-electrode plate was produced by a manufacturing method to be described below in a manner similar to Comparative Example 10, except that polymer compound 17 was used as the positive-electrode active material, and that the mixing proportion between the electrode active material, the electrical conductivity assistant and the binder agent was different.

To 200 mg of a polymer compound, which has been crushed in a mortar, 160 mg of acetylene black was added, and these were homogeneously mixed; furthermore, 40 mg of polytetrafluoroethylene was added and mixed, whereby a positive-electrode active material mixture was obtained. Moreover, this positive electrode mixture was crimped onto an aluminum grid, subjected to vacuum drying, and was cut by stamping into a disk shape with a diameter of 13.5 mm, thus producing a positive-electrode plate.

Figure 19:
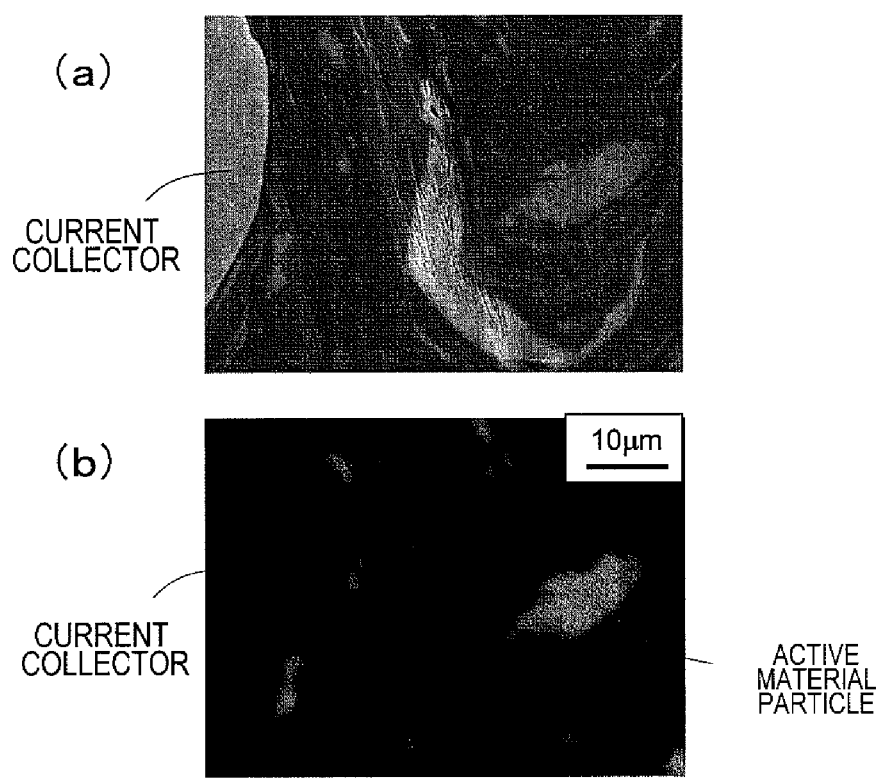
FIG. 19($a$) is an SEM image showing a cross section of an electrode of Comparative Example 13, and (b) is an image showing the distribution of sulfur across that cross section.

The particle diameter of polymer 30 crushed in a mortar was about 5 to 20 μm. The cross section of the produced electrode plate was observed by an electron microscope and an electron probe micro-analyzer (EPMA) to measure the distribution of sulfur associated with the electrode active material. FIGS. 19(a) and 19(b) respectively show an SEM image showing, on an enlarged scale, an electrode active material portion of a cross section of the positive electrode of Comparative Example 13, and a sulfur distribution image by EPMA. As shown in FIG. 19(b), a granular sulfur distribution of about several μm to 10 μm was observed by EPMA. This confirmed that the electrode active material was present in a granular form. The thickness of the positive-electrode active material layer of the produced positive-electrode plate was 90 μm. The mixing proportion of the active material layer of the obtained positive electrode was: 50 wt % of the electrode active material, 40 wt % of the electrical conductivity assistant, and 10 wt % of the binder agent.

(2) Production of Electricity Storage Device

An electricity storage device was produced in a similar manner to Example 3, except that the positive-electrode plate described above was used as the positive electrode.

2. Evaluation of Characteristics of Electricity Storage Device

The charge-discharge capacity was evaluated for electricity storage devices of Examples 3-10 and Comparative Examples 6-13. The charge-discharge capacity of each electricity storage device was evaluated based on a value obtained by dividing the charge-discharge capacity during the third charge-discharge cycle, when the capacity is stabilized, by the active material weight, i.e., the charge-discharge capacity per active material unit weight. The charging and discharging was performed via constant-current charging and discharging at an electric current value that corresponds to 1 hour rate (1 C rate) so that the charging and discharging hour rates are equal to each other. Specifically, it was 0.015 mA for Example 3 and Comparative Example 6, 0.06 mA for Example 4 and Comparative Example 7, 0.09 mA for Example 5 and Comparative Example 8, 0.15 mA for Example 6 and Comparative Example 9, 0.03 mA for Example 7 and Comparative Example 10, 0.12 mA for Example 8 and Comparative Example 11, 0.18 mA for Example 9 and Comparative Example 12, and 0.3 mA for Example 10 and Comparative Example 13. The charging and discharging conditions were as follows: the charge upper limit voltage was 4.0 V and the charge lower limit voltage was 2.5 V. The downtime after finishing charging and before beginning discharging was zero.

Figure 20:
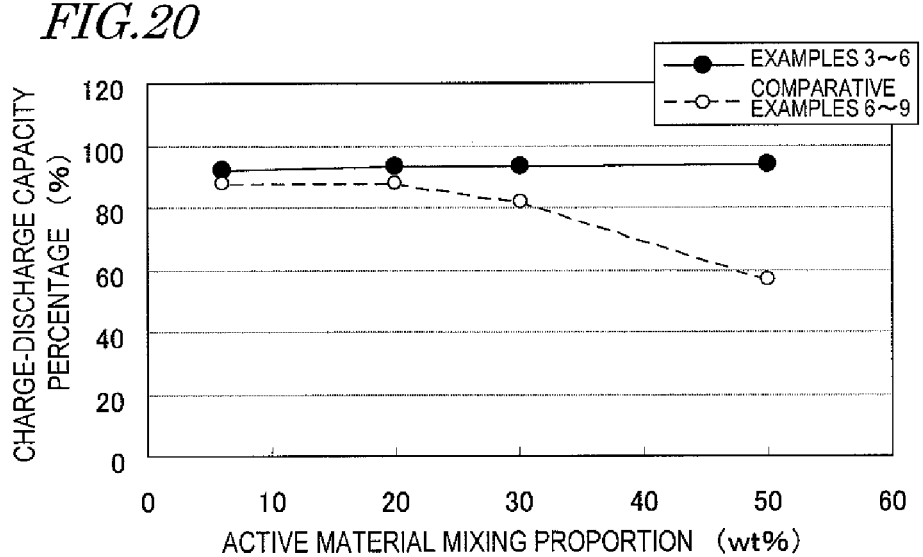
FIG. 20 A graph showing the relationship between the active material mixing proportion and the charge-discharge capacity percentage with electricity storage devices of Examples 3-6 and Comparative Examples 6-9.
Figure 21:
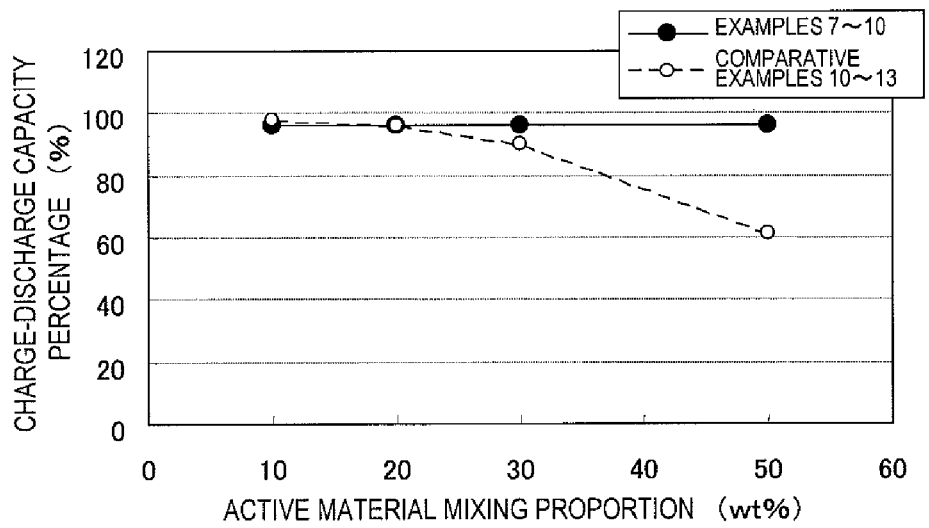
FIG. 21 A graph showing the relationship between the active material mixing proportion and the charge-discharge capacity percentage with electricity storage devices of Examples 7-10 and Comparative Examples 10-13.

The charge-discharge capacity evaluation results of the electricity storage devices of Examples 3-10 and Comparative Examples 6-13 are all shown in Table 2. The evaluation results for Examples 3-6 and Comparative Examples 6-9 are shown in FIG. 20, and the evaluation results for Examples 7-10 and Comparative Examples 10-13 are shown in FIG. 21. In FIG. 20 and FIG. 21, the vertical axis denotes a value obtained by dividing the obtained capacity by the stoichiometric capacity, i.e., the charge-discharge utilization rate.

TABLE 2

|  | Electrode active material | Active material proportion [wt %] | Charge-discharge capacity [mAh/g] | Charge-discharge utilization rate [% VS stoichiometric capacity] |
|---|---|---|---|---|
| Example 3 | Copolymer | 6 | 115 | 92 |
| Example 4 | compound | 20 | 116 | 93 |
| Example 5 | 39 | 30 | 116 | 93 |
| Example 6 |  | 50 | 115 | 92 |

TABLE 2-continued

| | Electrode active material | Active material proportion [wt %] | Charge-discharge capacity [mAh/g] | Charge-discharge utilization rate [% VS stoichiometric capacity] |
|---|---|---|---|---|
| Comparative Example 6 | | 6 | 110 | 88 |
| Comparative Example 7 | | 20 | 110 | 88 |
| Comparative Example 8 | | 30 | 103 | 82 |
| Comparative Example 9 | | 50 | 71 | 57 |
| Example 7 | Polymer compound 17 | 10 | 101 | 96 |
| Example 8 | | 20 | 101 | 96 |
| Example 9 | | 30 | 101 | 96 |
| Example 10 | | 50 | 101 | 96 |
| Comparative Example 10 | | 10 | 103 | 98 |
| Comparative Example 11 | | 20 | 101 | 96 |
| Comparative Example 12 | | 30 | 95 | 90 |
| Comparative Example 13 | | 50 | 64 | 61 |

As shown in Table 2, FIG. 20 and FIG. 21, for the electrodes of Comparative Examples 6-13 in which the electrode active material is present as particles in the positive-electrode active material layer, it can be seen that the charge-discharge capacity percentage decreases as the mixing proportion of the electrode active material in the active material layer is 30 wt % or more, irrespective of the electrode active material. This shows that with electrodes in which a polymer containing a tetrachalcogenofulvalene structure in the repetition unit is used as the electrode active material and in which the electrode active material is present as particles, if the mixing proportion of the electrode active material in the electrode active material layer is 30 wt % or more, the charge-discharge capacity percentage decreases, making it difficult to realize a higher capacity. It is believed that this is because with the positive electrodes of Comparative Examples 6-13, the electrode active material is present as particles, the contact area between the electrode active material and the electrical conductivity assistant is small, and the electron traveling path during oxidation-reduction is not sufficiently ensured, thereby increasing the amount of the electrode active material that is electrically isolated and does not contribute to charging and discharging.

On the other hand, with Examples 3-10, which are electrodes of the present invention, a high charge-discharge capacity percentage can be maintained even if the mixing proportion of the electrode active material in the active material layer is 30 wt % or more. It is believed that this is because with the electrodes of the present invention, the contact area between the electrode active material and the electrical conductivity assistant is large, whereby the electrical conductivity in the active material layer is ensured. This suggests that electrodes of the present invention are also suitable for increasing the capacity of an electrode.

The output power characteristics was evaluated for Example 6, Example 10, Comparative Example 9 and Comparative Example 13. The output power characteristics evaluation was conducted by a large-current charge-discharge capacity evaluation. The large-current charging and discharging was performed via constant-current charging and discharging at an electric current value that corresponds to 1/20 hour rate (20 C rate) so that the charging and discharging hour rates are equal to each other. Specifically, it was 3 mA for Example 6 and Comparative Example 9, and 6 mA for Example 10 and Comparative Example 13. The charge upper limit voltage was 4.0 V, and the charge lower limit voltage was 2.5 V. The downtime after finishing charging and before beginning discharging was zero. The large-current charge-discharge capacity was evaluated based on a value obtained by dividing the capacity during discharge at 20 C rate by the capacity during discharge at 1 C rate, i.e., the capacity retention rate for discharging at 20 C rate with respect to discharging at 1 C rate.

Table 3 shows evaluation of the output power characteristics of Example 6, Example 10, Comparative Example 9 and Comparative Example 13.

TABLE 3

| | Active material | Active material proportion [wt %] | 20 C rate capacity/ 1 C rate capacity [%] |
|---|---|---|---|
| Example 6 | Copolymer compound 39 | 50 | 48 |
| Comparative Example 9 | | | 3 |
| Example 10 | Polymer compound 17 | | 85 |
| Comparative Example 13 | | | 16 |

As shown in Table 3, it was confirmed that the electricity storage devices of Example 6 and Example 10 in which the active material percentage is as high as 50 wt % exhibit a high capacity retention rate even during large-current charging and discharging, as compared with the electricity storage devices of Comparative Example 9 and Comparative Example 13. Thus, it was confirmed that by using an electrode of the present invention, it is possible to realize an electricity storage device with a high capacity and a high output power.

(III) Evaluation of Electrical Conductivity Assistant

Results of producing electrodes using different electrical conductivity assistants and electricity storage devices using the same, and evaluating the characteristics of the electricity storage devices, in order to confirm the effect of the electrical conductivity assistant used in the electrodes of the present invention, will be described.

1. Production of Electrode and Electricity Storage Device

Example 11

A positive electrode was produced in a glow box of an argon atmosphere having a gas purifier, using copolymer compound 39 synthesized by a method similar to Example 1.

First, a mixture with copolymer compound 39 dissolved therein was produced. In a mortar, 200 mg of copolymer compound 39 was crushed, and 600 mg of NMP (manufactured by Wako Pure Chemical Industries, Ltd.) was added thereto as an aprotic solvent and mixed in the mortar, to dissolve copolymer compound 39 in the aprotic polar solvent. The grain size distribution of copolymer compound 39 within NMP was measured by a laser diffraction-scattering method, using SALD-7000 manufactured by Shimadzu Corporation. The measurement conditions were as follows: the measurement was conducted while setting the measured grain size range to 0.015 µm to 500 µm, the measurement interval to 2 seconds, and while agitating in the solvent using the attached agitation plate. As a result of the measurement, the diffraction/scattering intensity was not observed, and it was confirmed that there was no grains of 0.015 µm or more in NMP. A UV-vis measurement was conducted, and an absorption peak associated with the tetrathiafulvalene structure was confirmed near 300 to 320 nm, thereby confirming that copolymer compound 39 was present in NMP.

To the NMP with copolymer compound 39 dissolved therein, 160 mg of acetylene black (Denka Black manufactured by Denki Kagaku Kogyo Kabushiki Kaisha; BET specific surface: 68 m$^2$/g) as an electrical conductivity assistant, 40 mg of polyvinylidene fluoride which is a binder agent, and 2.3 g of NMP were added, and mixed, thus producing a mixture.

Next, the resultant mixture was applied onto a current collector. An aluminum foil having a thickness of 20 μm was used as the current collector. The application of the mixture onto the aluminum foil was conducted by using a coater. The application was conducted while setting the gap width to 300 μm, and the scanning speed to 7 mm/sec.

Next, NMP, which was an aprotic solvent, was removed. The mixture applied onto the aluminum foil was placed in a thermostat oven, and dried for 1 hour at a temperature of 80° C., thereby removing the aprotic solvent. Moreover, it was cut by stamping into a disk shape with a diameter of 13.5 mm, thus producing a positive electrode. The application weight of the positive-electrode active material was 0.2 mg/cm$^2$ per electrode plate area.

The thickness of the positive-electrode active material layer of the produced positive electrode, as measured by a scanning electron microscope (SEM), was 90 μm. As in Example 1, it was confirmed that there were no electrode active material particles of 1 μm or more and that the electrode active material was covering the electrical conductivity assistant.

(2) Production of Electricity Storage Device

A coin-type battery 202 having a structure shown in FIG. 8 was produced. The electrode described above was used as the positive electrode 31, composed of the positive current collector 22 and the positive-electrode active material layer 23, and the positive electrode was placed in the case 21 so that the positive current collector plate 22 is in contact with the inner surface of the case 21, with the separator 24 made of a porous polyethylene sheet provided thereon. Then, a nonaqueous electrolyte was injected into a case 28. As the nonaqueous solvent electrolyte, an electrolyte solution in which a lithium hexafluorophosphate had been dissolved, at a 1 mol concentration, in a mixed solvent containing ethylene carbonate and ethyl methyl carbonate at a weight ratio of 1:3, was used. On the other hand, the negative current collector 27 and the negative-electrode active material layer 26 were crimped in this order onto the inner surface of a sealing plate 25. The positive electrode 31, the negative electrode 32 and the electrolyte solution 28 were accommodated in a case of a coin-type battery shown in FIG. 8; an opening of the case was pinched with a sealing plate having a gasket mounted thereon; and this was crimp sealed by a press machine, whereby a coin-type electricity storage device was obtained.

Note that a graphite electrode having a thickness of 40 μm applied on the negative current collector 27 made of a copper foil having a thickness of 20 μm was used as the negative-electrode active material layer 26. The graphite negative electrode 32 was cut by stamping into a disk shape with a diameter of 13.5 mm for use.

Note that for the graphite electrode, a Li metal counter electrode was used, and preliminary charging and discharging was performed over three cycles with an electric current value of 0.4 mA/cm$^2$ between the lower limit of 0 V and the upper limit of 1.5 V (the lithium reference potential), thereby confirming that it has a reversible capacity of 1.6 mAh/cm$^2$ per unit area and it can be charged and discharged reversibly. For the graphite electrode, one that had been charged to 70% of the reversible capacity, i.e., in a state where it is pre-doped with lithium, was used. For confirming the charging and discharging of the graphite electrode and for the pre-doping of lithium, the same electrolyte solution as that used in the electricity storage device and a separator made of a porous polyethylene sheet were used.

Example 12

(1) Production of Positive Electrode

A positive electrode was produced in a similar manner to Example 11, except that a carbon black having a large specific surface (Ketjen black ECP300J manufactured by Lion Corporation; BET specific surface: 800 m$^2$/g) was used as an electrical conductivity assistant.

As the distribution of the electrode active material was measured in a similar manner to Example 11, it was confirmed that the electrode active material was covering the electrical conductivity assistant in a similar manner to Example 1.

(2) Production of Electricity Storage Device

An electricity storage device was produced in a similar manner to Example 11, except that the positive electrode described above was used as the positive electrode.

Example 13

(1) Production of Positive Electrode

A positive-electrode plate was produced in a similar manner to Example 10, except that a carbon black having a large specific surface (Ketjen black ECP300J manufactured by Lion Corporation; BET specific surface: 800 m$^2$/g) was used as a conductive agent.

(2) Production of Electricity Storage Device

An electricity storage device was produced in a similar manner to Example 11, except that the positive-electrode plate described above was used as the positive electrode.

2. Evaluation of Characteristics of Electricity Storage Device

[Evaluation of Characteristics of Electricity Storage Device]

Charge-discharge capacity evaluation and output power evaluation were conducted for electricity storage devices of Examples 10-13 produced for evaluating the mixing proportion of the electrode active material in the active material layer. For the charge-discharge capacity evaluation of the electricity storage device, charging and discharging was conducted over three cycles at a constant current in the voltage range of the lower limit potential of 2.5 V to the upper limit potential of 4.0 V. The downtime after finishing charging and before beginning discharging was zero. The electric current value of charging and discharging was 0.3 mA/cm$^2$. The discharge capacity during the third cycle, when stabilized capacities are obtained with little variations, was obtained as the charge-discharge capacity of the electricity storage device.

The output power evaluation of the electricity storage device was evaluated based on the discharge capacity when charging and discharging was conducted with a large electric current. The output power evaluation of the electricity storage device was performed via constant-current charging and discharging over three cycles in the voltage range of the lower limit potential of 2.5 V to the upper limit potential of 4.0 V. The downtime after finishing charging and before beginning discharging was zero. The electric current value of charging and discharging was 10 mA/cm². From the discharge capacity during the third cycle, when stabilized capacities are obtained with little variations, the evaluation was made based on a value obtained by dividing the capacity during discharging at an electric current value of 10 mA/cm² by the discharge capacity at an electric current value of 0.3 mA/cm², i.e., the retention rate with respect to the small-current charge-discharge capacity.

Table 4 shows the results of the charge-discharge capacity evaluation and the results of the output power characteristics evaluation for Examples 10-13.

TABLE 4

| | Electrode active material | Electrical conductivity assistant specific surface [m²/g] | Charge-discharge capacity evaluation | | Output power characteristics evaluation 10 mA capacity/ 0.3 mA capacity [%] |
| --- | --- | --- | --- | --- | --- |
| | | | 0.3 mA charge-discharge capacity [mAh/g] | Charge-discharge capacity percentage [% VS stoichiometric capacity] | |
| Example 11 | Copolymer compound 39 | 68 | 115 | 92 | 33 |
| Example 12 | | 800 | 123 | 99 | 50 |
| Example 10 | Polymer compound 17 | 68 | 101 | 96 | 80 |
| Example 13 | | 800 | 103 | 98 | 88 |

As shown in Table 4, it was confirmed that the output power characteristics improve by using a carbon black having a large specific surface of 800 m²/g or more. Using a carbon black having a large specific surface of 800 m²/g or more increases the specific surface of the electrical conductivity assistant covered by the electrode active material, and makes the thickness of the covering electrode active material sufficiently small. Therefore, it is believed that anions traveled more smoothly during oxidation-reduction reactions, realizing the effects of the present invention in a pronounced manner.

(IV) Evaluation of Current Collector

Results of producing electrodes using different current collectors and electricity storage devices using the same, and evaluating the characteristics of the electricity storage devices, in order to confirm the effect of the current collector used in the electrodes of the present invention, will be described.

1. Production of Electrode and Electricity Storage Device

Example 14

(1) Production of Positive Electrode

Copolymer compound 39 was synthesized by a method similar to Example 1. A positive electrode was produced in a glow box of an argon atmosphere having a gas purifier, using copolymer compound 39 synthesized.

First, a mixture with copolymer compound 39 dissolved therein was produced. In a mortar, 50 mg of copolymer compound 39 was crushed, and 500 mg of NMP (manufactured by Wako Pure Chemical Industries, Ltd.) was added thereto as an aprotic solvent and mixed in the mortar, to dissolve copolymer compound 39 in the aprotic polar solvent. It was confirmed that copolymer compound 39 had been dissolved in the NMP because particles of 0.015 μm or more were not detected in a grain size distribution evaluation for the NMP solution with copolymer compound 39 dissolved therein and because an absorption associated with the TTF structure was confirmed from a UV measurement of the NMP solution.

To the NMP with copolymer compound 39 dissolved therein, 627 mg of acetylene black which is an electrical conductivity assistant, 157 mg of polyvinylidene fluoride which is a binder agent, and 9900 mg of NMP were added, and mixed, thus producing a mixture.

Next, an electrically conductive support was produced by using an electrolytically-etched aluminum foil. Using an aluminum foil having a purity of 99.9 wt % or more and a thickness of 30 μm, the aluminum foil was etched with an alternating current of 35 Hz in an aqueous hydrochloric acid solution, at a temperature of 45° C. and a current density of 0.4 A/cm², and then etched with an alternating current of 25 Hz at a temperature of 25° C. and a current density of 0.3 A/cm². The thickness of the resultant electrically conductive support was 29 μm. The thickness of the electrolytically-etched aluminum layer was 2.5 μm, and the average aperture diameter of the etching aperture was 0.1 μm.

The resultant mixture was applied onto the electrolytically-etched aluminum layer of the electrically conductive support, and the aprotic polar solvent was removed through vacuum drying, whereby an electrode was obtained. The thickness of the active material layer of the positive electrode obtained in this manner was 40 μm. The mixing proportion in the active material layer was: 6 wt % of the active material, 75 wt % of the electrical conductivity assistant, and 19 wt % of the binder agent. The obtained positive electrode was cut by stamping into a disk shape with a diameter of 13.5 mm for use.

Figure 22:
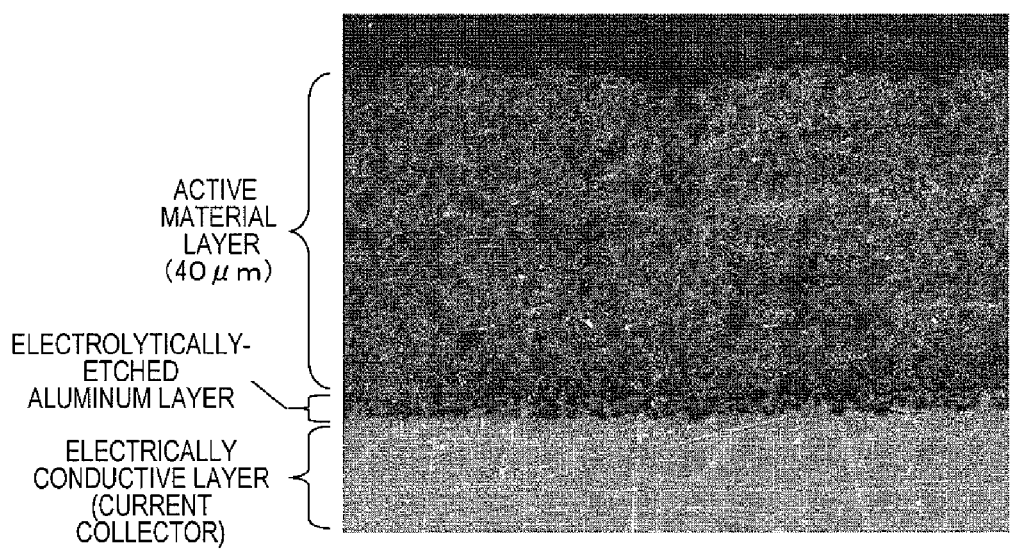
FIG. 22 An SEM image showing a cross section of an electrode of Example 14.

FIG. 22 shows an cross-sectional SEM (electron microscope) image of the obtained positive electrode. It was confirmed that the active material layer was formed on the electrolytically-etched aluminum layer of the electrically conductive support. It was also confirmed that the electrolytically-etched aluminum layer had minute etching apertures (vacancies) through which it is impregnated with the electrolyte solution.

(2) Production of Electricity Storage Device

A coin-type battery 203 having a structure shown in FIG. 12 was produced. The electrode described above was used as the positive electrode 31, composed of the positive current collector 22 and the positive-electrode active material layer 23, and the positive electrode was placed in the case 21 so that the positive current collector plate 22 is in contact with the inner surface of the case 21, with the separator 24 made of a porous polyethylene sheet provided thereon. Then, a nonaqueous electrolyte was injected into a case 28. As the nonaqueous solvent electrolyte, an electrolyte solution in which a lithium hexafluorophosphate had been dissolved, at a 1 mol concentration, in a mixed solvent containing ethylene carbonate and ethyl methyl carbonate at a weight ratio of 1:3, was used. On the other hand, the negative current collector 27 and the negative-electrode active material layer 26 were crimped in this order onto the inner surface of a sealing plate 25. The positive electrode 31, the negative electrode 32, and the electrolyte solution 28 were accommodated in a case of a coin-type battery shown in FIG. 12; an opening of the case was pinched with a sealing plate having a gasket mounted thereon; and this was crimp sealed by a press machine, whereby a coin-type electricity storage device was obtained.

Note that a graphite electrode having a thickness of 40 µm applied on the negative current collector 27 made of a copper foil having a thickness of 20 µm was used as the negative-electrode active material layer 26. The graphite negative electrode 32 was cut by stamping into a disk shape with a diameter of 13.5 mm for use.

Note that for the graphite electrode, a Li metal counter electrode was used, and preliminary charging and discharging was performed over three cycles with an electric current value of 0.4 mA/cm$^2$ between the lower limit of 0 V and the upper limit of 1.5 V (the lithium reference potential), thereby confirming that it has a reversible capacity of 1.6 mAh/cm$^2$ per unit area and it can be charged and discharged reversibly. For the graphite electrode, one that had been charged to 70% of the reversible capacity, i.e., in a state where it is pre-doped with lithium, was used. For confirming the charging and discharging of the graphite electrode and for the pre-doping of lithium, the same electrolyte solution as that used in the electricity storage device and a separator made of a porous polyethylene sheet were used.

Example 15

In Example 15, the same electricity storage device as Example 14 was produced, except that the mixing proportion of the electrode active material, the conductive agent and the binder agent in the positive electrode used was different.

(1) Production of Positive Electrode

The positive electrode was produced as follows. First, a mixture with copolymer compound 39 dissolved therein was produced. In a mortar, 50 mg of copolymer compound 39 was crushed, and 500 mg of NMP (manufactured by Wako Pure Chemical Industries, Ltd.) was added thereto as an aprotic polar solvent and mixed in the mortar, to dissolve copolymer compound 39 in the aprotic polar solvent.

It was confirmed that copolymer compound 39 had been dissolved in the NMP because particles of 0.015 µm or more were not detected in a grain size distribution evaluation for the NMP solution with copolymer compound 39 dissolved therein and because an absorption associated with the TTF structure was confirmed from a UV measurement of the NMP solution.

To the NMP with copolymer compound 39 dissolved therein, 160 mg of acetylene black which is an electrical conductivity assistant, 40 mg of polyvinylidene fluoride which is a binder agent, and 2600 mg of NMP were added, and mixed, thus producing a mixture.

Using an electrolytically-etched aluminum foil produced by the same method as Example 14 as a current collector film, the resultant mixture was applied onto the current collector film, and the aprotic polar solvent was removed through vacuum drying, whereby an electrode was obtained.

The thickness of the mixture layer of the positive electrode obtained in this manner was 40 µm. The mixing proportion in the active material layer was: 20 wt % of the active material, 64 wt % of the electrical conductivity assistant, and 16 wt % of the binder agent. The obtained positive electrode was cut by stamping into a disk shape with a diameter of 13.5 mm for use.

(2) Production of Electricity Storage Device

An electricity storage device was produced in a similar manner to Example 14, using the positive electrode described above.

Example 16

In Example 16, the same electricity storage device as Example 14 was constructed, except that the mixing proportion of the active material, the conductive agent and the binder agent in the positive electrode was different. The positive electrode was produced as follows.

(1) Production of Positive Electrode

First, a mixture with copolymer compound 39 dissolved therein was produced. In a mortar, 50 mg of copolymer compound 39 was crushed, and 500 mg of NMP (manufactured by Wako Pure Chemical Industries, Ltd.) was added thereto as an aprotic polar solvent and mixed in the mortar, to dissolve copolymer compound 39 in the aprotic polar solvent.

It was confirmed that copolymer compound 39 had been dissolved in the NMP because particles of 0.015 µm or more were not detected in a grain size distribution evaluation for the NMP solution with copolymer compound 39 dissolved therein and because an absorption associated with the TTF structure was confirmed from a UV measurement of the NMP solution.

To the NMP with copolymer compound 39 dissolved therein, 93 mg of acetylene black which is an electrical conductivity assistant, 23 mg of polyvinylidene fluoride which is a binder agent, and 1580 mg of NMP were added, and mixed, thus producing a mixture.

Using an electrolytically-etched aluminum foil produced by the same method as Example 14 as the electrically conductive support, the resultant mixture was applied onto the current collector film, and the aprotic polar solvent was removed through vacuum drying, whereby an electrode was obtained.

The thickness of the mixture layer of the positive electrode obtained in this manner was 40 µm. The mixing proportion in the active material layer was: 30 wt % of the active material, 56 wt % of the electrical conductivity assistant, and 14 wt % of the binder agent. The obtained positive electrode was cut by stamping into a disk shape with a diameter of 13.5 mm for use.

(2) Production of Electricity Storage Device

An electricity storage device was produced in a similar manner to Example 14, using the positive electrode described above.

Example 17

In Example 17, the same electricity storage device as Example 14 was constructed, except that the mixing proportion of the active material, the conductive agent and the binder agent in the positive electrode was different. The positive electrode was produced as follows.

(1) Production of Positive Electrode

First, a mixture with copolymer compound 39 dissolved therein was produced. In a mortar, 50 mg of copolymer compound 39 was crushed, and 500 mg of NMP (manufactured by Wako Pure Chemical Industries, Ltd.) was added thereto as an aprotic polar solvent and mixed in the mortar, to dissolve copolymer compound 39 in the aprotic polar solvent.

It was confirmed that copolymer compound 39 had been dissolved in the NMP because particles of 0.015 μm or more were not detected in a grain size distribution evaluation for the NMP solution with copolymer compound 39 dissolved therein and because an absorption associated with the TTF structure was confirmed from a UV measurement of the NMP solution.

To the NMP with copolymer compound 39 dissolved therein, 40 mg of acetylene black which is an electrical conductivity assistant, 10 mg of polyvinylidene fluoride which is a binder agent, and 750 mg of NMP were added, and mixed, thus producing a mixture.

Using an electrolytically-etched aluminum foil produced by the same method as Example 1 as the electrically conductive support, the resultant mixture was applied onto the current collector film, and the aprotic polar solvent was removed through vacuum drying, whereby an electrode was obtained.

The thickness of the mixture layer of the positive electrode obtained in this manner was 40 μm. The mixing proportion in the active material layer was: 50 wt % of the active material, 46 wt % of the electrical conductivity assistant, and 10 wt % of the binder agent. The obtained positive electrode was cut by stamping into a disk shape with a diameter of 13.5 mm for use.

(2) Production of Electricity Storage Device

An electricity storage device was produced in a similar manner to Example 14, using the positive electrode described above.

Example 18

(1) Production of Positive Electrode

A positive electrode was produced in a similar manner to Example 10, except that an electrolytically-etched aluminum foil was used as the current collector.

(2) Production of Electricity Storage Device

An electricity storage device was produced in a similar manner to Example 10, except that the positive-electrode plate described above was used as the positive electrode.

2. Evaluation of Characteristics of Electricity Storage Device

Charge-discharge capacity evaluation and output power characteristics evaluation were conducted for electricity storage devices of Examples 3-6, Example 10 and Examples 14-18. The charge-discharge capacity of the electricity storage device was evaluated based on the charge-discharge capacity during the third charge-discharge cycle, when the capacity is stabilized. The charging and discharging was performed via constant-current charging and discharging at an electric current value that corresponds to 1 hour rate (1 C rate) so that the charging and discharging hour rates are equal to each other. Specifically, it was 0.015 mA for Example 3 and Example 14, 0.06 mA for Example 4 and Example 15, 0.09 mA for Example 5 and Example 16, 0.15 mA for Example 6 and Example 17, and 0.3 mA for Example 10 and Example 18. The charging and discharging conditions were as follows: the charge upper limit voltage was 4.0 V and the charge lower limit voltage was 2.5 V. The downtime after finishing charging and before beginning discharging was zero.

The output power characteristics evaluation was conducted by a large-current charge-discharge capacity evaluation. The charging and discharging was performed via constant-current charging and discharging at an electric current value that corresponds to 1/50 hour rate (50 C rate) so that the charging and discharging hour rates are equal to each other. Specifically, it was 0.75 mA for Example 3 and Example 14, 3 mA for Example 4 and Example 15, 4.5 mA for Example 5 and Example 16, 7.5 mA for Example 6 and Example 17, and 15 mA for Example 10 and Example 18. The charging and discharging conditions were as follows: the charge upper limit voltage was 4.0 V and the charge lower limit voltage was 2.5 V. The downtime after finishing charging and before beginning discharging was zero. The large-current charge-discharge capacity was evaluated based on a value obtained by dividing the capacity during discharge at 50 C rate by the capacity during discharge at 1 C rate, i.e., the capacity retention rate for discharging at 50 C rate with respect to discharging at 1 C rate.

Table 5 shows the charge-discharge capacity evaluation and the output power characteristics evaluation for electricity storage devices of Examples 3-6, Example 10 and Examples 14-18.

TABLE 5

| | Electrode active material | Active material proportion [wt %] | Current collector | Charge-discharge capacity evaluation Charge-discharge capacity [mAh/g] | Output power characteristics evaluation 50 C rate capacity/ 1 C rate capacity [%] |
|---|---|---|---|---|---|
| Example 14 | Copolymer compound 39 | 6 | Electrolytically-etched | 115 | 85 |
| Example 3 | | | Plane | 115 | 86 |
| Example 15 | | 20 | Electrolytically-etched | 116 | 84 |
| Example 4 | | | Plane | 116 | 83 |
| Example 16 | | 30 | Electrolytically-etched | 115 | 72 |

TABLE 5-continued

| Electrode active material | Active material proportion [wt %] | Current collector | Charge-discharge capacity evaluation Charge-discharge capacity [mAh/g] | Output power characteristics evaluation 50 C rate capacity/ 1 C rate capacity [%] |
|---|---|---|---|---|
| Example 5 | | Plane | 115 | 41 |
| Example 17 | | 50 | Electrolytically-etched | 115 | 70 |
| Example 6 | | Plane | 115 | 40 |
| Example 18 | Polymer compound | 50 | Electrolytically-etched | 101 | 88 |
| Example 10 | 17 | | Plane | 101 | 83 |

As shown in Table 5, it can be seen that with electrodes whose active material percentage is 30 wt % or more, it is possible to obtain the effect of maintaining high output power characteristics if an electrolytically-etched aluminum foil is used as the current collector.

From the results above, it was confirmed that it is possible to realize an electricity storage device with an excellent reversibility, a high capacity and a high output power, by using an electrode of the present invention.

(V) Evaluation of Solubility of Electrode Active Material (1) Evaluation of Solubility of Copolymer Compound Containing Tetrachalcogenofulvalene Structure in Side Chain In order to implement an electrode of the present invention, it is necessary to dissolve a polymer having a tetrachalcogenofulvalene structure in the repetition unit in an aprotic solvent. However, as can be seen from Comparative Examples 3-5, etc., described above, when a tetrachalcogenofulvalene structure is contained in the side chain, a polymer compound that does not include second units but is composed only of first units including oxidation-reduction sites has a low solvent affinity for various solvents and is difficult to be dissolved.

In order to confirm that the solubility of a copolymer compound containing a tetrachalcogenofulvalene structure in the side chain is increased by the second unit, the solubility for solvents was evaluated for copolymer compound 39 used in Example 1, polymer compound 40 used in Comparative Examples 2 and 3, and polymethyl methacrylate (PMMA) (manufactured by Aldrich Co., Mw=120000). PMMA is a polymer compound composed only of the second unit of copolymer compound 39 used in Example 1.

The solvent solubility was evaluated by adding 10 mg of the compound in 20 g of the solvent, performing an ultrasonic agitation for 5 minutes, and thereafter measuring the grain size distribution within the solvent. In the grain size distribution measurement, dissolution was established when no diffraction/scattering intensity was observed and no grains of 0.015 µm or more existed in the solvent, and dissolution was not established (not dissolved) when grains of 0.015 µm or more existed. When dissolution was established, a UV-vis measurement was performed to confirm that the compound existed in the solvent.

Table 6 shows the evaluation results when NMP, tetrahydrofuran (THF) (manufactured by KANTO CHEMICAL CO.) and ethanol (manufactured by KANTO CHEMICAL CO.) were used as solvents.

TABLE 6

| | Evaluation results | | |
|---|---|---|---|
| | NMP | THF | ethanol |
| Polymer compound 40 | Not dissolved | Not dissolved | Not dissolved |
| Copolymer compound 39 | Dissolved | Dissolved | Not dissolved |
| PMMA | Dissolved | Dissolved | Not dissolved |

As shown in Table 6, the results were that copolymer compound 39 was also dissolved in NMP and THF, in which PMMA was dissolved. This is due to the fact that the second unit of copolymer compound 39 is the same as the repetition unit of PMMA, and has a high affinity with NMP and THF. That is, it means that the solvent affinity of copolymer compound 39 as a whole improved by copolymerize the second unit having a high affinity with a solvent with the first unit. Based on this result, it is believed that copolymer compound 39 is a compound having an affinity with each of the solvents of the first unit and the second unit, and it is possible to control the solvent affinity of copolymer compound 39 by changing the structure and the copolymerization proportion of the second unit to be copolymerized.

Moreover, a study was conducted on structures that can be used as the second unit, and solvents having a high affinity with the structures. The solubility for solvents was evaluated for polymethylacrylate (PMA) (manufactured by Aldrich Co., Mw=40000) having an ester group in the side chain, polyvinylacetate (PVAc) (manufactured by Aldrich Co., Mw=83000), polystyrene (PS) (manufactured by Aldrich Co., Mw=290000) having a functional group composed of carbon, and polyacrylonitrile (PAN) (manufactured by Aldrich Co., Mw=150000) having a nitrile group which is a nitrogen-containing group, each as a polymer compound composed only of the second unit. NMP, THF, N,N-dimethylformamide (DMF) (manufactured by Wako Pure Chemical Industries, Ltd.), dimethyl sulfoxide (DMSO) (manufactured by Wako Pure Chemical Industries, Ltd.), and toluene (manufactured by Aldrich Co.) were used as solvents. The results are shown in Table 7.

TABLE 7

|  | PMA | PVAc | PS | PAN |
|---|---|---|---|---|
| Solvents for which dissolution was confirmed | NMP THF DMSO | NMP THF DMSO | NMP toluene | DMF DMSO |

As shown in Table 7, PMA and PVAc dissolved in NMP, THF and DMSO. Similarly, PS easily dissolved in NMP and toluene, and PAN dissolved in DMF and DMSO. From these results, it can be seen that the copolymer compound can be dissolved by using such solvents as shown in Table 7 if the second unit is a constituent unit of PMA, PVAc, PS or PAN.

Moreover, from the above, it can be seen that an ester group, an ether group, and a carbonyl group, which are oxygen-containing functional groups; a cyano group, a nitro group, and a nitroxyl group, which are nitrogen-containing functional groups; an alkyl group and a phenyl group, which are functional groups composed of carbon; and an alkylthio group, a sulfone group, and a sulfoxide group, which are sulfur-containing functional groups, are suitable as the structure of the side chain portion of the second unit of the copolymer compound.

(2) Evaluation of Solubility of Polymer Compound Containing Tetrachalcogenofulvalene Structure in Main Chain In order to confirm the difference in affinity for an aprotic solvent due to a polymer compound containing the tetrachalcogenofulvalene structure in the main chain, the solubility was evaluated for polymer 17 used in Example 2, polymer 41, used in Comparative Example 2, and polymers represented by chemical formula (5), chemical formula (12) to chemical formula (16), and chemical formula (23) to chemical formula (28). Hereinafter, the polymers represented by chemical formula (5), chemical formulae (12) to (17), chemical formulae (23) to (28), and chemical formula (41) will be denoted as polymer 5, polymers 12 to 17, polymers 23 to 28 and polymer 41, respectively.

Polymer 5 is a polymer in which tetrachalcogenofulvalene structures are directly bound to each other. A compound in which tetrachalcogenofulvalene structures are directly bound to each other can be synthesized by a dehalogenation polycondensation method using a diiodide of tetrathiafulvalene and an Ni(0) complex as shown in reaction formula (R9) below. Herein, in the formula, x denotes a sulfur or oxygen atom, cod denotes 1,5-cyclooctadiene, and by denotes 2,2'-bipyridine.

[FORMULA 68]

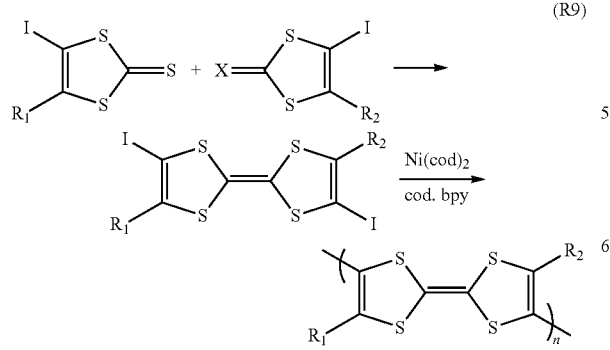

(R9)

Polymer 23 to polymer 28 are polymers in which tetrachalcogenofulvalene structures are bound to each other with at least a thiophene structure interposed therebetween. These compounds can be synthesized through a still coupling reaction from a trimethylstannylide of tetrathiafulvalene and an iodide of a thiophene structure, using a Pd catalyst, as shown in reaction formula (R10) below. It can similarly be synthesized through a still coupling reaction also by using an iodide of tetrathiafulvalene and a trimethylstannylide of a thiophene structure.

[FORMULA 69]

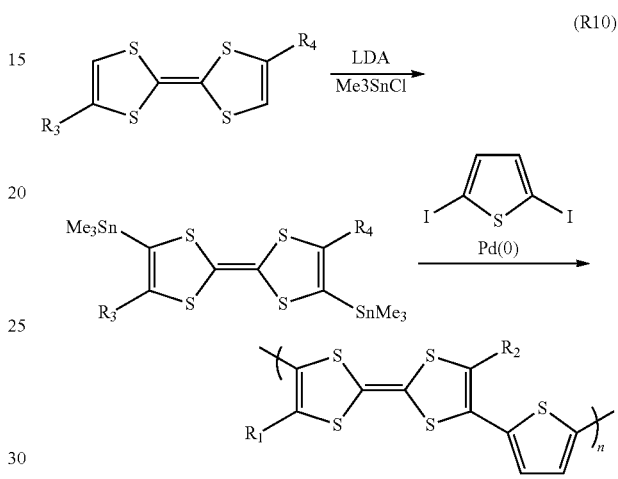

(R10)

Polymer 12 to polymer 17 are polymers in which tetrachalcogenofulvalene structures are bound to each other with triple bond/aromatic compound/triple bond interposed therebetween. These compounds can be synthesized using a Sonogashira reaction between a diiodide of tetrathiafulvalene and a compound having a triple bond site, as shown in reaction formula (R11) below. As can be seen from reaction formula C, tetrachalcogenofulvalene structures can be bound to each other with no particular limitation as long as it is a compound having a triple bond site. While the linker site includes a thiophene structure in reaction formula C, the linker site may be any site as long as it is an aromatic compound, and a polymer in which tetrachalcogenofulvalene structures are bound to each other with triple bond/aromatic compound/triple bond interposed therebetween can be synthesized through a similar reaction even with a benzene ring instead of thiophene, for example.

[FORMULA 70]

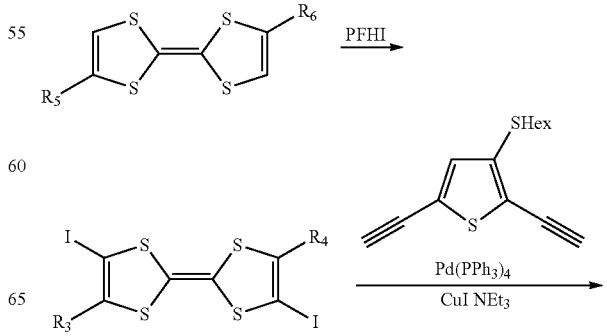

-continued

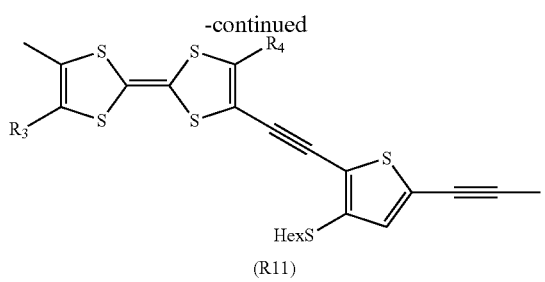

(R11)

The solvent solubility was evaluated by adding 10 mg of the polymer in 20 g of the solvent, performing an ultrasonic agitation for 5 minutes, and thereafter measuring the grain size distribution within the solvent. In the grain size distribution measurement, dissolution was established when no diffraction/scattering intensity was observed and no grains of 0.015 μm or more existed in the solvent, and dissolution was not established (not dissolved) when grains of 0.015 μm or more existed. When dissolution was established, an IR measurement was performed to confirm that the compound existed in the solvent.

Table 8 shows the evaluation results when NMP, tetrahydrofuran (THF) (manufactured by KANTO CHEMICAL CO.) and chloroform (manufactured by KANTO CHEMICAL CO.) were used as solvents.

TABLE 8

| | Evaluation results | | |
|---|---|---|---|
| | NMP | THF | CHCl$_3$ |
| Polymer 5 | Dissolved | Dissolved | Dissolved |
| Polymer 12 | Dissolved | Dissolved | Dissolved |
| Polymer 13 | Dissolved | Not dissolved | Dissolved |
| Polymer 14 | Dissolved | Dissolved | Dissolved |
| Polymer 15 | Dissolved | Dissolved | Dissolved |
| Polymer 16 | Dissolved | Dissolved | Dissolved |
| Polymer 17 | Dissolved | Dissolved | Dissolved |
| Polymer 23 | Dissolved | Dissolved | Dissolved |
| Polymer 24 | Dissolved | Dissolved | Dissolved |
| Polymer 25 | Dissolved | Not dissolved | Not dissolved |
| Polymer 26 | Dissolved | Dissolved | Dissolved |
| Polymer 27 | Dissolved | Not dissolved | Not dissolved |
| Polymer 28 | Dissolved | Dissolved | Dissolved |
| Polymer 41 | Not dissolved | Not dissolved | Not dissolved |

As shown in Table 8, the solubility for an aprotic solvent changes depending on the molecular structure of the polymer. It can be seen that polymer 5, polymer 12 to polymer 17 and polymers 23 to 28 dissolve in one of NMP, THF and CHCl$_3$. If the polymer dissolves in an aprotic solvent, it is possible to realize an electrode structure similar to Example 1, and it is possible to obtain effects similar to those of Example 2.

INDUSTRIAL APPLICABILITY

The electrode of the present invention has a light weight, and is capable of stably allowing for reversible oxidation-reduction reactions with an energy density. The resistance of the electrode is small, and is capable of providing an electricity storage device that can produce a high output power. Therefore, an electricity storage device conforming to the desired characteristics is realized. Such an electricity storage device has a high output power, a large capacity, and excellent cyclic characteristics. Therefore, it can be suitably used for various portable devices, transportation apparatuses, uninterruptible power supplies, and the like. Moreover, it is suitably used for various electrochemical elements such polymer actuators and electrochromic display elements.

REFERENCE SIGNS LIST

21 Coin-type case
22 Positive current collector
23 Positive-electrode active material layer
24 Separator
25 Sealing plate
26 Negative-electrode active material layer
27 Negative current collector
28 Gasket
29 Electrolyte solution
31 Positive electrode
32 Negative electrode
101, 102, 103 Electrode
201, 202, 203 Electricity storage device

The invention claimed is:

1. An electrode comprising:
an electrically conductive support; and
an active material layer provided on the electrically conductive support, containing an electrode active material and an electrical conductivity assistant, wherein:
the electrode active material includes a polymer compound which is a copolymer between a first unit which has the tetrachalcogenofulvalene structure in a side chain and a second unit which does not have the tetrachalcogenofulvalene structure in the side chain; and
in the active material layer, the electrode active material does not form particles but covers at least a portion of a surface of the electrical conductivity assistant.

2. The electrode according to claim 1, wherein:
the tetrachalcogenofulvalene structure in the polymer compound is represented by general formula (A) below; and
in general formula (A), four X's are, independently, an oxygen atom, a sulfur atom, a selenium atom or a tellurium atom; one selected from R1 to R4 represents a bonding hand for a main chain of the polymer compound; the other three are, independently, at least one kind selected from the group consisting of an acyclic saturated hydrocarbon group, an acyclic unsaturated hydrocarbon group, a cyclic saturated hydrocarbon group, a cyclic unsaturated hydrocarbon group, a phenyl group, a hydrogen atom, a hydroxyl group, a cyano group, an amino group, a nitro group, a nitroso group and an alkylthio group; and the acyclic saturated hydrocarbon group, the acyclic unsaturated hydrocarbon group, the cyclic saturated hydrocarbon group and the cyclic unsaturated hydrocarbon group each include at least one kind selected from the group consisting of a carbon atom, an oxygen atom, a nitrogen atom, a sulfur atom, a silicon atom, a phosphorus atom and a boron atom:

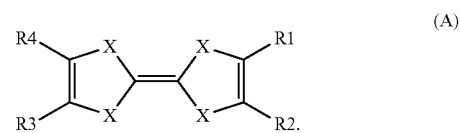

(A)

3. The electrode according to claim 1, wherein in the active material layer, a weight percentage of the electrode active material included in the active material layer is 30 wt % or more.

4. The electrode according to claim 1, wherein the electrical conductivity assistant is carbon black.

5. The electrode according to claim 4, wherein a specific surface of the electrical conductivity assistant is 800 $m^2/g$ or more.

6. The electrode according to claim 3, wherein:
the electrically conductive support includes a surface layer having a surface in contact with the active material layer; and
a surface of the surface layer has surface irregularities.

7. The electrode according to claim 6, wherein the surface layer is an electrolytically-etched aluminum layer.

8. The electrode according to claim 1, wherein the polymer compound has a degree of polymerization of four or more.

9. The electrode according to claim 1, wherein:
the polymer compound includes, in the second unit which does not have the tetrachalcogenofulvalene structure in the side chain, at least one selected from the group consisting of an ester group, an ether group, a carbonyl group, a cyano group, a nitro group, a nitroxyl group, an alkyl group, a phenyl group, an alkylthio group, a sulfone group and a sulfoxide group.

10. The electrode according to claim 2, wherein:
the polymer compound has a structure represented by general formula (E) below;
in general formula (E), R31 and R32 constitute a main chain of the polymer compound; R31 and R32 are trivalent residues containing, independently, at least one selected from the group consisting of a carbon atom, an oxygen atom, a nitrogen atom and a sulfur atom; and at least one substituent selected from the group consisting of saturated aliphatic group and unsaturated aliphatic groups having a carbon number of 1 to 10 or at least one hydrogen atom;
L1 is an ester group, an ether group, a carbonyl group, a cyano group, a nitro group, a nitroxyl group, an alkyl group, a phenyl group, an alkylthio group, a sulfone group or a sulfoxide group that is bound to R31;
R33 is a divalent residue including at least one selected from the group consisting of a substituted or unsubstituted alkylene, alkenylene, arylene, ester, amide, and ether having a carbon number of 1 to 4 that are bound to R32 and M1;
M1 is general formula (A), and is bound to R33 via the aforementioned bonding hand, where n and m are integers representing the numbers of times of repeating the monomer units; and
a constituent ratio m/n of the number m of the second units with respect to the number n of the first units of the polymer compound is greater than zero and five or less:

$$*\!-\!(R31)_m\!-\!*\quad *\!-\!(R32)_n\!-\!*.$$
$$\quad\quad\;\;|\quad\quad\quad\quad\quad\;\;|$$
$$\quad\quad\;\;L1\quad\quad\quad\quad\;R33$$
$$\quad\quad\quad\quad\quad\quad\quad\quad\quad|$$
$$\quad\quad\quad\quad\quad\quad\quad\quad\;M1$$

(E)

11. The electrode according to claim 10, wherein L1 includes at least one selected from an ester group, an ether group and a carbonyl group.

12. The electrode according to claim 1, wherein the active material layer is formed by applying a mixture, which contains an aprotic solvent with the electrode active material dissolved therein and the electrical conductivity assistant, onto the electrically conductive support, and removing the aprotic solvent therefrom.

13. The electrode according to claim 12, wherein the aprotic solvent is N-methylpyrrolidone, 1,3-dimethyl-2-imidazolidinone, toluene, dimethylacetamide, dimethylformamide, dimethyl sulfoxide, tetrahydrofuran, or chloroform.

14. An electricity storage device comprising:
a positive electrode which is the electrode according to claim 1;
a negative electrode containing a negative-electrode active material capable of occluding and releasing lithium ions; and
an electrolyte solution containing a salt of lithium ions and anions, the electrolyte solution filling between the positive electrode and the negative electrode.

15. A manufacturing method for the electrode according to claim 1, comprising the steps of:
preparing a mixture of an aprotic solvent with an electrode active material dissolved therein, and an electrical conductivity assistant; and
removing the aprotic solvent from the mixture.

16. The electrode according to claim 1, wherein the electrode active material forms a cover film, and the cover film is present in the form of a continuous body that conforms to a shape of the surface of the electrical conductivity assistant and is in contact with the electrical conductivity assistant.

17. The electricity storage device according to claim 14, wherein the electrode active material is insoluble to the electrolyte but soluble to an aprotic solvent other than the electrolyte.

18. The electrode according to claim 10, wherein the polymer compound is represented by formula (38) below; in general formula (38), R36 is a divalent residue including at least one selected from the group consisting of a substituted or unsubstituted alkylene, alkenylene, arylene, ester, amide, and ether having a carbon number from 1 to 4; R34 and R35 are, independently, one selected from the group consisting of a saturated aliphatic group having a carbon number of 1 to 4 and a phenyl group, or a hydrogen atom; and R37 to R39 are, independently, an acyclic aliphatic group, a cyclic aliphatic group, a hydrogen atom, a hydroxyl group, a cyano group, an amino group, a nitro group, a nitroso group, or an alkylthio group, wherein R38 and R39 may bind to each other to form a ring, L1 is an ester group, an ether group, a carbonyl group, a cyano group, a nitro group, a nitroxyl group, an alkyl group, a phenyl group, an alkylthio group, a sulfone group, or a sulfoxide group; and n and m are integers representing a number of times of repeating monomer units:

(38)
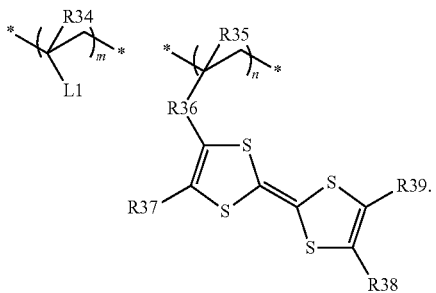
19. The electrode according to claim 18, wherein L1 includes at least one kind selected from the group consisting of an ester group, an ether group, and a carbonyl group.
20. The electrode according to claim 19, wherein the polymer compound has a structure represented by formula (39) below, and in formula (39), n and m are integers representing a number of times of repeating monomer units:
(39)
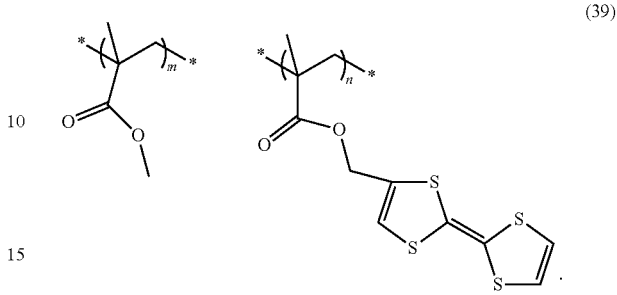
* * * * *